US012066606B2

United States Patent
Yeh et al.

(10) Patent No.: US 12,066,606 B2
(45) Date of Patent: Aug. 20, 2024

(54) IMAGE LENS ASSEMBLY, ZOOM IMAGE CAPTURING UNIT AND ELECTRONIC DEVICE

(71) Applicant: LARGAN PRECISION CO., LTD., Taichung (TW)

(72) Inventors: Kuan-Ting Yeh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 390 days.

(21) Appl. No.: 17/074,372

(22) Filed: Oct. 19, 2020

(65) Prior Publication Data

US 2022/0035141 A1   Feb. 3, 2022

Related U.S. Application Data

(60) Provisional application No. 63/059,804, filed on Jul. 31, 2020.

(51) Int. Cl.
*G02B 15/14* (2006.01)
*G02B 13/18* (2006.01)

(52) U.S. Cl.
CPC ............ *G02B 15/144* (2019.08); *G02B 13/18* (2013.01)

(58) Field of Classification Search
CPC .. G02B 15/144; G02B 13/18; G02B 13/0045; G02B 13/009; G02B 13/02; G02B 13/22;

(Continued)

(56) References Cited

U.S. PATENT DOCUMENTS 5,237,456 A * 8/1993 Yoshioka .................. G02B 9/62
359/713
6,538,825 B1   3/2003 Sun
(Continued)

FOREIGN PATENT DOCUMENTS

| JP | 2000-162500 A | 6/2000 |
|----|---------------|--------|
| JP | 2011-150036 A | 8/2011 |

(Continued)

OTHER PUBLICATIONS

IN Office Action dated Feb. 15, 2022 as received in Application No. 202134000734.

*Primary Examiner* — Thomas K Pham
*Assistant Examiner* — Kuei-Jen L Edenfield
(74) *Attorney, Agent, or Firm* — Maschoff Brennan

(57) ABSTRACT

An image lens assembly includes four lens groups: a first lens group, a second lens group, a third lens group and a fourth lens group along an optical path. The four lens groups include nine lens elements: a first lens element with positive refractive power, a second lens element with negative refractive power, a third lens element, a fourth lens element, a fifth lens element, a sixth lens element, a seventh lens element, an eighth lens element and a ninth lens element along the optical path. At least one lens element of the image lens assembly has at least one inflection point. At least five lens elements of the image lens assembly are made of plastic material. When focusing or zooming, the first lens group and the fourth lens group stay stationary, while the second lens group and the third lens group move along an optical axis.

30 Claims, 58 Drawing Sheets

(58) Field of Classification Search
CPC .......... G02B 13/06; G02B 5/208; G02B 3/04;
G02B 5/04; G02B 15/16; G02B 15/1441;
G02B 15/1445; G02B 15/144501; G02B
15/144503; G02B 15/144505; G02B
15/144507; G02B 15/144509; G02B
15/144511; G02B 15/144513; G02B
15/144515; G02B 15/14; G02B 13/00;
H04N 5/23238; G03B 2205/0046
USPC ..... 359/676, 678, 680, 681, 6, 84, 686, 725,
359/728, 739, 740
See application file for complete search history.

(56) References Cited

U.S. PATENT DOCUMENTS

| | | |
|---|---|---|
| 8,982,484 B2 | 3/2015 | Morooka |
| 9,709,782 B2 | 7/2017 | Yamada |
| 2013/0155312 A1 | 6/2013 | Matsui |
| 2014/0085732 A1* | 3/2014 | Shibata ................ G02B 15/177 359/680 |
| 2014/0184887 A1* | 7/2014 | Yonetani ............ G02B 13/0015 359/557 |
| 2015/0153550 A1* | 6/2015 | Yamaguchi .... G02B 15/144113 359/557 |
| 2016/0025954 A1* | 1/2016 | Sakai ..................... G03B 21/14 353/97 |
| 2019/0018229 A1* | 1/2019 | Miyagawa ......... G02B 15/1461 |
| 2019/0086638 A1* | 3/2019 | Lee ........................ G02B 9/60 |
| 2020/0209593 A1* | 7/2020 | Hirano .................... G02B 9/64 |

FOREIGN PATENT DOCUMENTS

| | | |
|---|---|---|
| JP | 2014-048359 A | 3/2014 |
| JP | 2015-210413 A | 11/2015 |
| WO | 2021215807 A1 | 10/2021 |

* cited by examiner

IMAGE LENS ASSEMBLY, ZOOM IMAGE CAPTURING UNIT AND ELECTRONIC DEVICE

RELATED APPLICATIONS

This application claims priority to U.S. Provisional Application 63/059,804, filed on Jul. 31, 2020, which is incorporated by reference herein in its entirety.

BACKGROUND

Technical Field

The present disclosure relates to an image lens assembly, a zoom image capturing unit and an electronic device, more particularly to an image lens assembly and a zoom image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, the functionality requirements for the optical systems have been increasing, and therefore electronic devices, such as smart electronics, car devices, identification system, entertainment devices, sports devices and smart home assistance system, equipped with optical systems are trending towards multi-functionality for various applications.

In addition, in order to satisfy the requirement of optical zoom function, electronic devices equipped with optical systems of different fields of view are also popular on the market nowadays.

However, it is difficult for a conventional optical system to obtain a balance among requirements such as high image quality, low sensitivity, a proper aperture size, miniaturization and a desirable field of view.

SUMMARY

According to one aspect of the present disclosure, an image lens assembly includes four lens groups. The four lens groups are, in order from an object side to an image side along an optical path, a first lens group, a second lens group, a third lens group and a fourth lens group. The four lens groups include nine lens elements. The nine lens elements are, in order from the object side to the image side along the optical path, a first lens element, a second lens element, a third lens element, a fourth lens element, a fifth lens element, a sixth lens element, a seventh lens element, an eighth lens element and a ninth lens element. The first lens group includes the first lens element and the second lens element. The second lens group includes the third lens element, the fourth lens element and the fifth lens element. The third lens group includes the sixth lens element and the seventh lens element. The fourth lens group includes the eighth lens element and the ninth lens element.

The first lens element has positive refractive power. The second lens element has negative refractive power. At least one of an object-side surface and an image-side surface of at least one lens element of the image lens assembly has at least one inflection point in an off-axis region thereof. At least five lens elements of the image lens assembly are made of plastic material.

When the image lens assembly is focusing or zooming, an axial distance between the first lens group and the fourth lens group remains a constant, an axial distance between the fourth lens group and an image surface remains a constant, while the second lens group and the third lens group move along an optical axis.

When a maximum value among maximum fields of view of the image lens assembly within a zoom range is FOV_max, and a minimum value among maximum fields of view of the image lens assembly within the zoom range is FOV_min, the following conditions are satisfied:

$$FOV\_max<50[deg.]; \text{ and}$$

$$1.25<FOV\_max/FOV\_min<6.0.$$

According to another aspect of the present disclosure, a zoom image capturing unit includes the aforementioned image lens assembly and an image sensor, wherein the image sensor is disposed on the image surface of the image lens assembly.

According to another aspect of the present disclosure, an electronic device includes the aforementioned zoom image capturing unit and at least one fixed-focus image capturing unit. The zoom image capturing unit and the at least one fixed-focus image capturing unit face the same side of the electronic device. The at least one fixed-focus image capturing unit includes an optical axis perpendicular to the optical axis of the zoom image capturing unit.

When a maximum value among maximum fields of view of the at least one fixed-focus image capturing unit is DFOV, and the maximum value among maximum fields of view of the image lens assembly within the zoom range is FOV_max, the following condition is satisfied:

$$40[deg.]<DFOV-FOV\_max.$$

According to another aspect of the present disclosure, an electronic device includes a zoom image capturing unit and at least one fixed-focus image capturing unit. The zoom image capturing unit and the at least one fixed-focus image capturing unit face the same side of the electronic device. The zoom image capturing unit includes an image lens assembly. The zoom image capturing unit includes an optical axis perpendicular to an optical axis of the at least one fixed-focus image capturing unit.

The image lens assembly includes four lens groups. The four lens groups are, in order from an object side to an image side along an optical path, a first lens group, a second lens group, a third lens group and a fourth lens group. The four lens groups include nine lens elements. The nine lens elements are, in order from the object side to the image side along the optical path, a first lens element, a second lens element, a third lens element, a fourth lens element, a fifth lens element, a sixth lens element, a seventh lens element, an eighth lens element and a ninth lens element. The first lens group includes the first lens element and the second lens element, the second lens group includes at least one lens element, the third lens group includes at least one lens element, and the fourth lens group includes the eighth lens element and the ninth lens element.

The first lens element has positive refractive power. The second lens element has negative refractive power. At least one of an object-side surface and an image-side surface of at least one lens element of the image lens assembly has at least one inflection point in an off-axis region thereof. At least five lens elements of the image lens assembly are made of plastic material.

When the image lens assembly is focusing or zooming, an axial distance between the first lens group and the fourth lens group remains a constant, an axial distance between the fourth lens group and an image surface remains a constant, while the second lens group and the third lens group move along the optical axis.

When a maximum value among maximum fields of view of the image lens assembly within a zoom range is FOV_max, a minimum value among maximum fields of view of the image lens assembly within the zoom range is FOV_min, and a maximum value among maximum fields of view of the at least one fixed-focus image capturing unit is DFOV, the following conditions are satisfied:

1.25<FOV_max/FOV_min<5.0; and

40[deg.]<DFOV−FOV_max.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
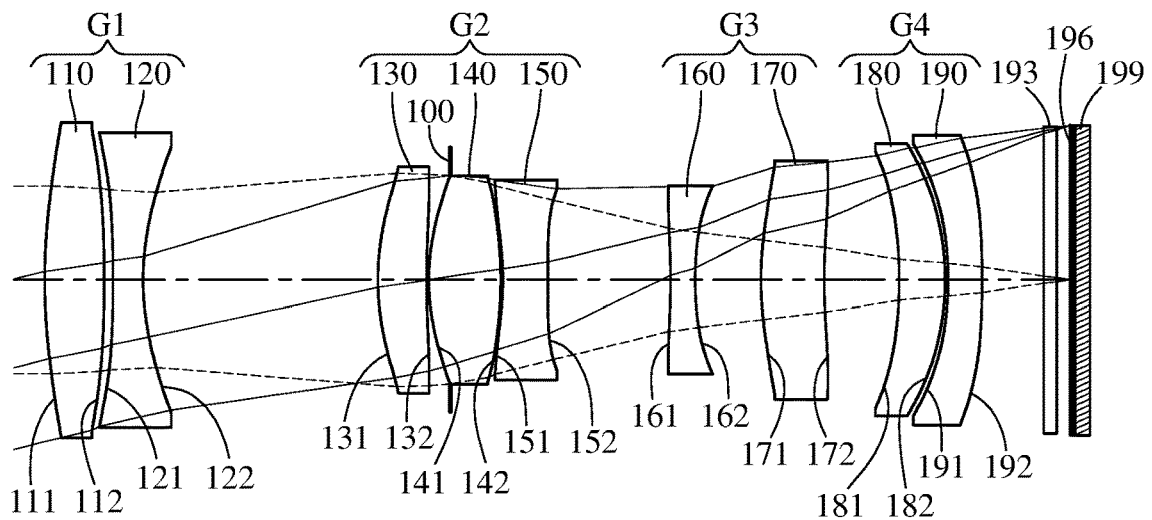
FIG. 1 is a schematic view of a zoom image capturing unit in the first zooming state according to the 1st embodiment of the present disclosure.
Figure 2:
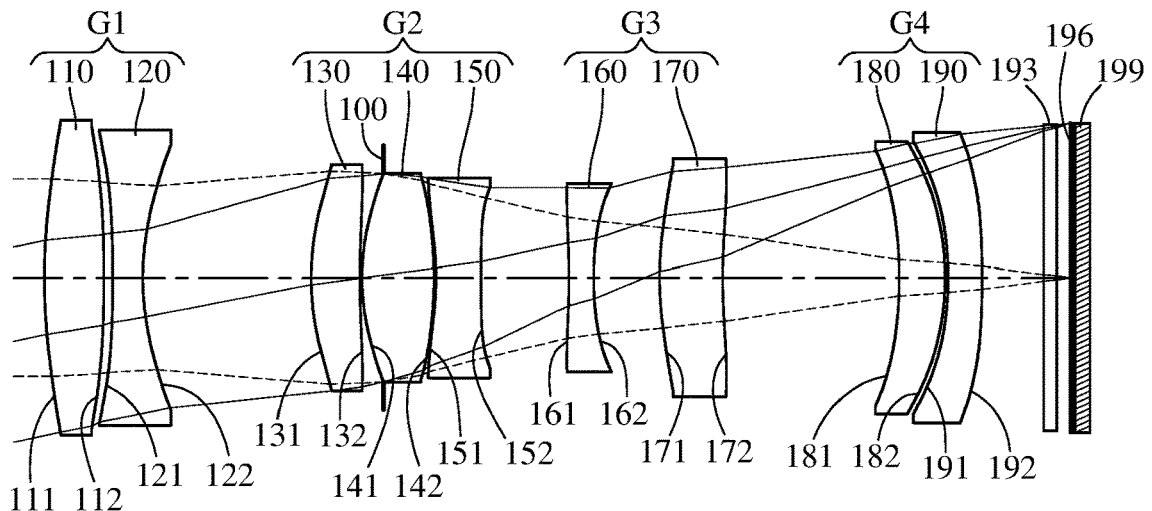
FIG. 2 is a schematic view of the zoom image capturing unit in the second zooming state according to the 1st embodiment of the present disclosure.
Figure 3:
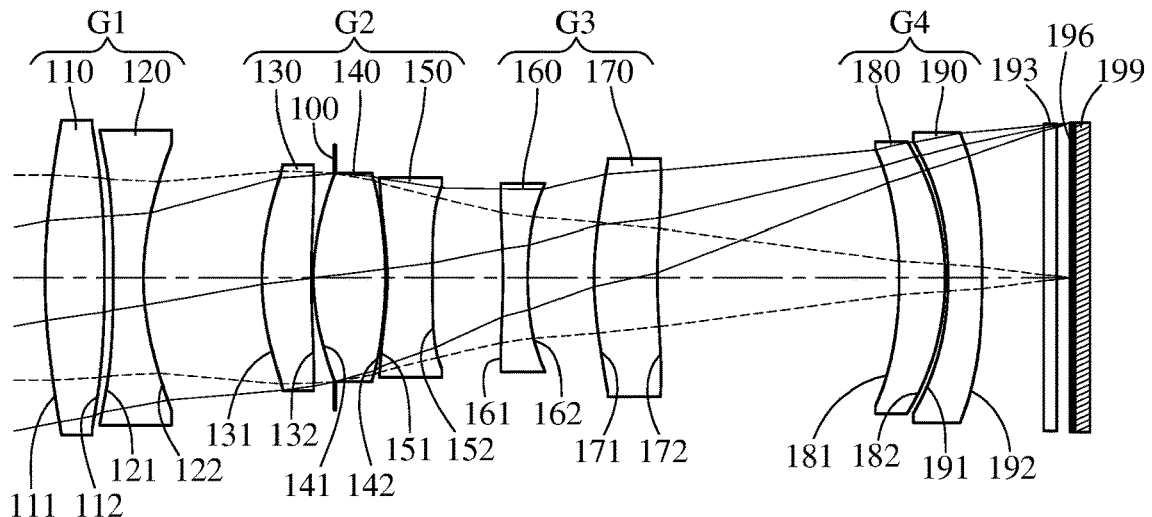
FIG. 3 is a schematic view of the zoom image capturing unit in the third zooming state according to the 1st embodiment of the present disclosure.
Figure 4:
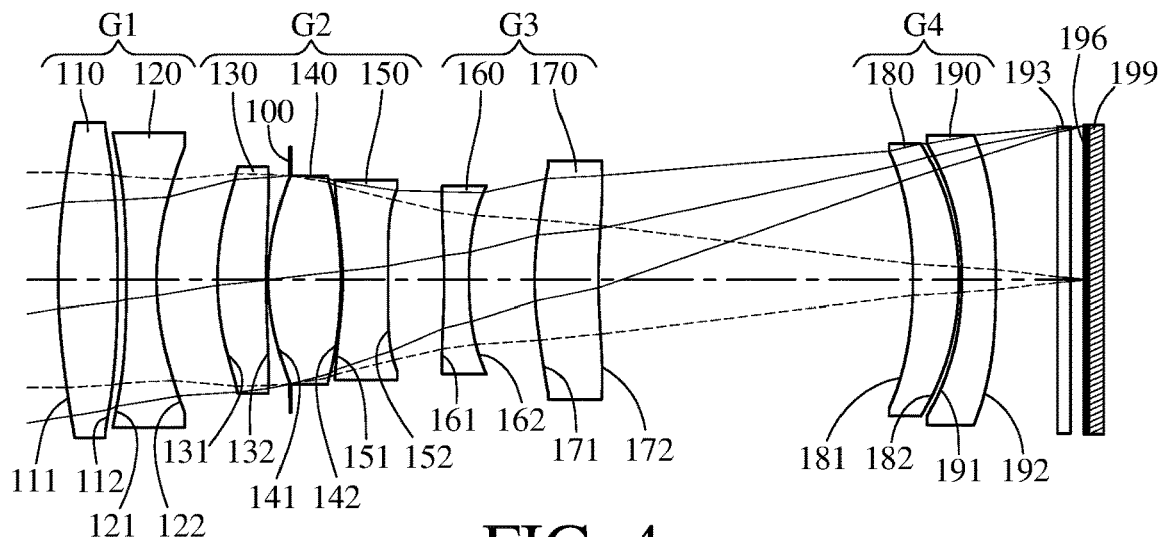
FIG. 4 is a schematic view of the zoom image capturing unit in the fourth zooming state according to the 1st embodiment of the present disclosure.
Figure 5:
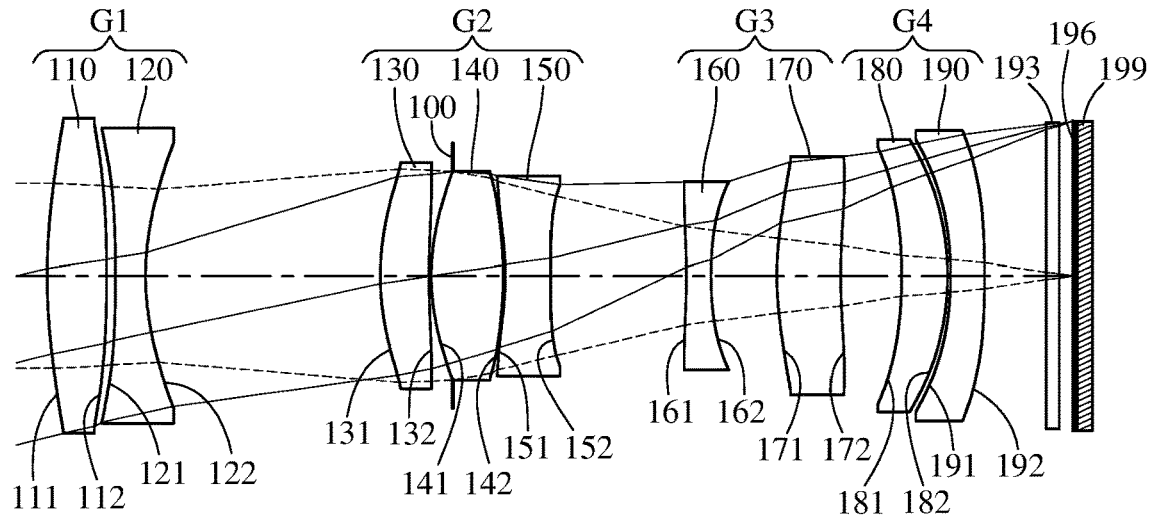
FIG. 5 is a schematic view of the zoom image capturing unit in the fifth zooming state according to the 1st embodiment of the present disclosure.
Figure 6:
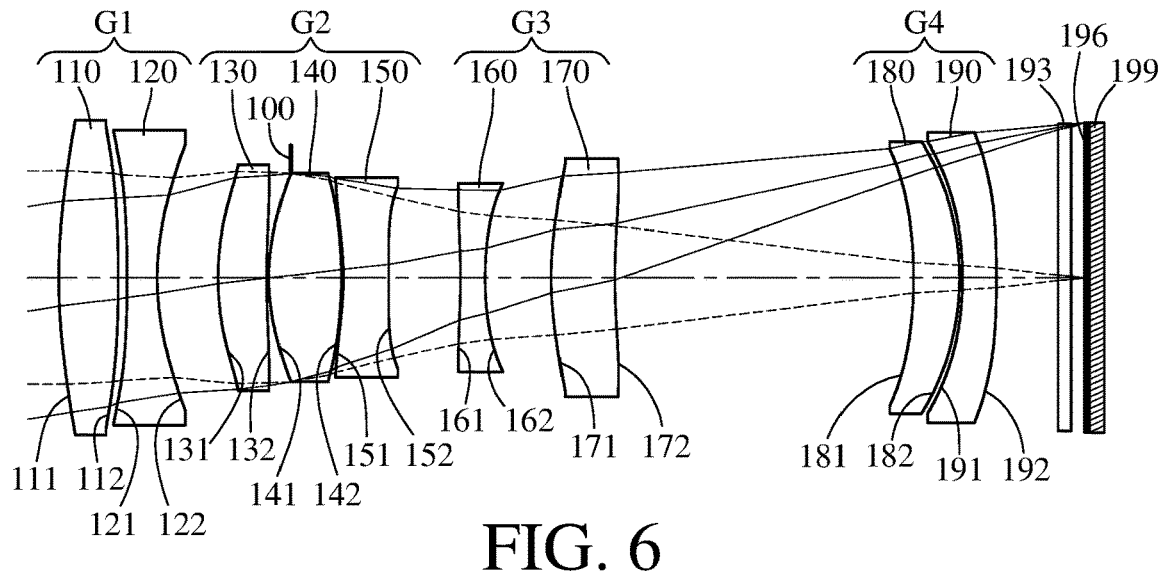
FIG. 6 is a schematic view of the zoom image capturing unit in the sixth zooming state according to the 1st embodiment of the present disclosure.
Figure 7:
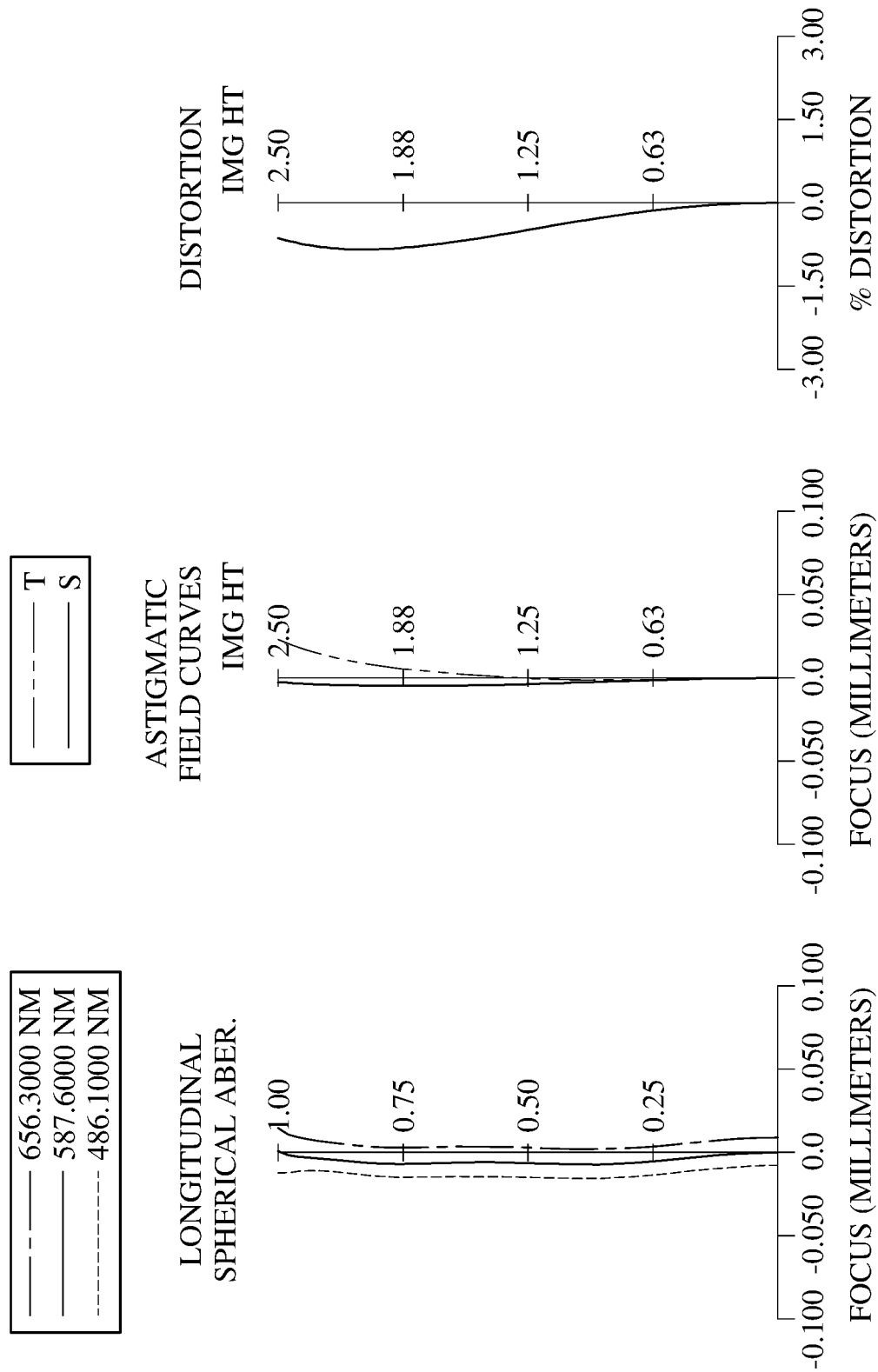
FIG. 7 shows spherical aberration curves, astigmatic field curves and a distortion curve of the zoom image capturing unit in the first zooming state according to the 1st embodiment.
Figure 8:
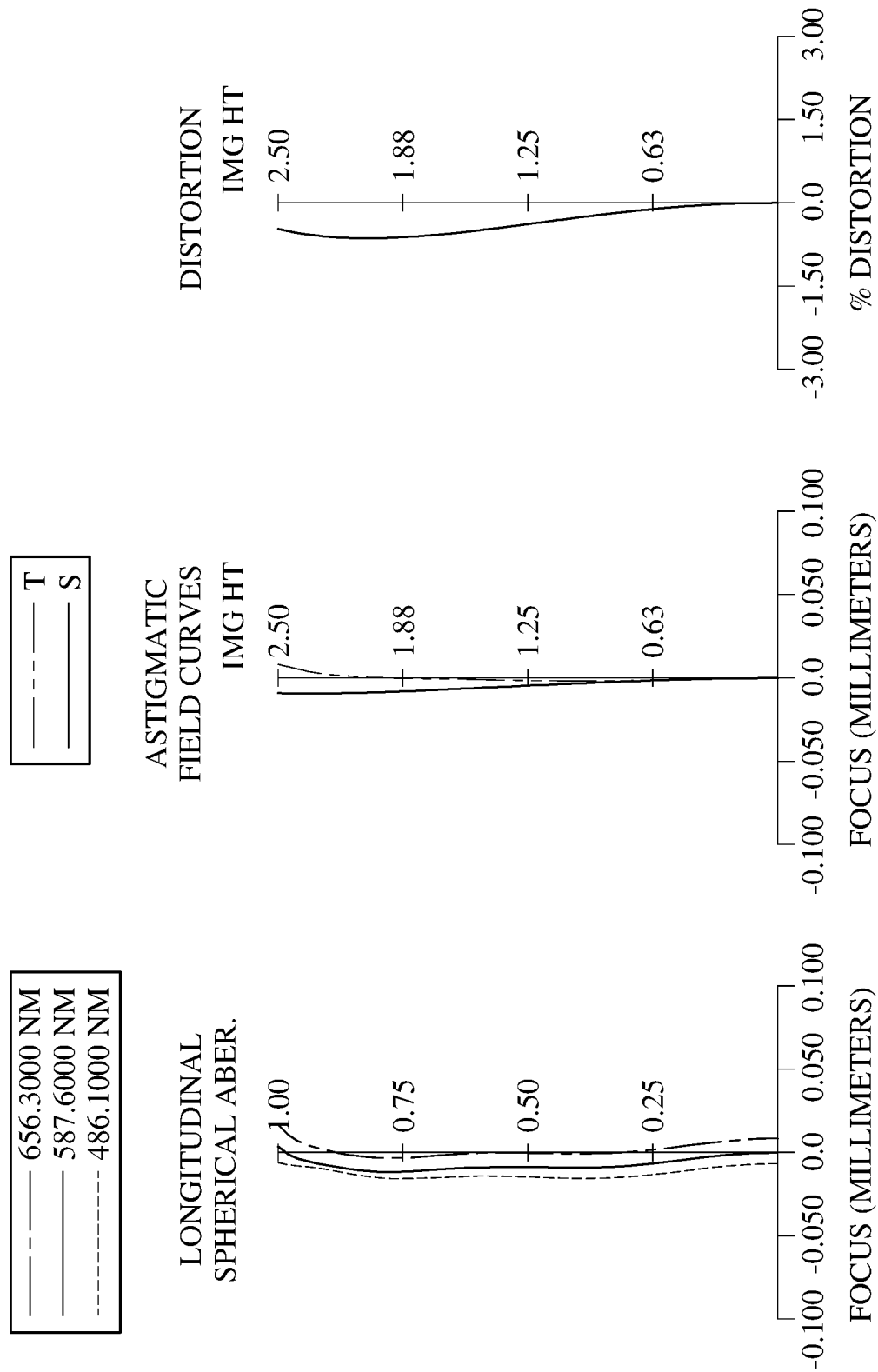
FIG. 8 shows spherical aberration curves, astigmatic field curves and a distortion curve of the zoom image capturing unit in the second zooming state according to the 1st embodiment.
Figure 9:
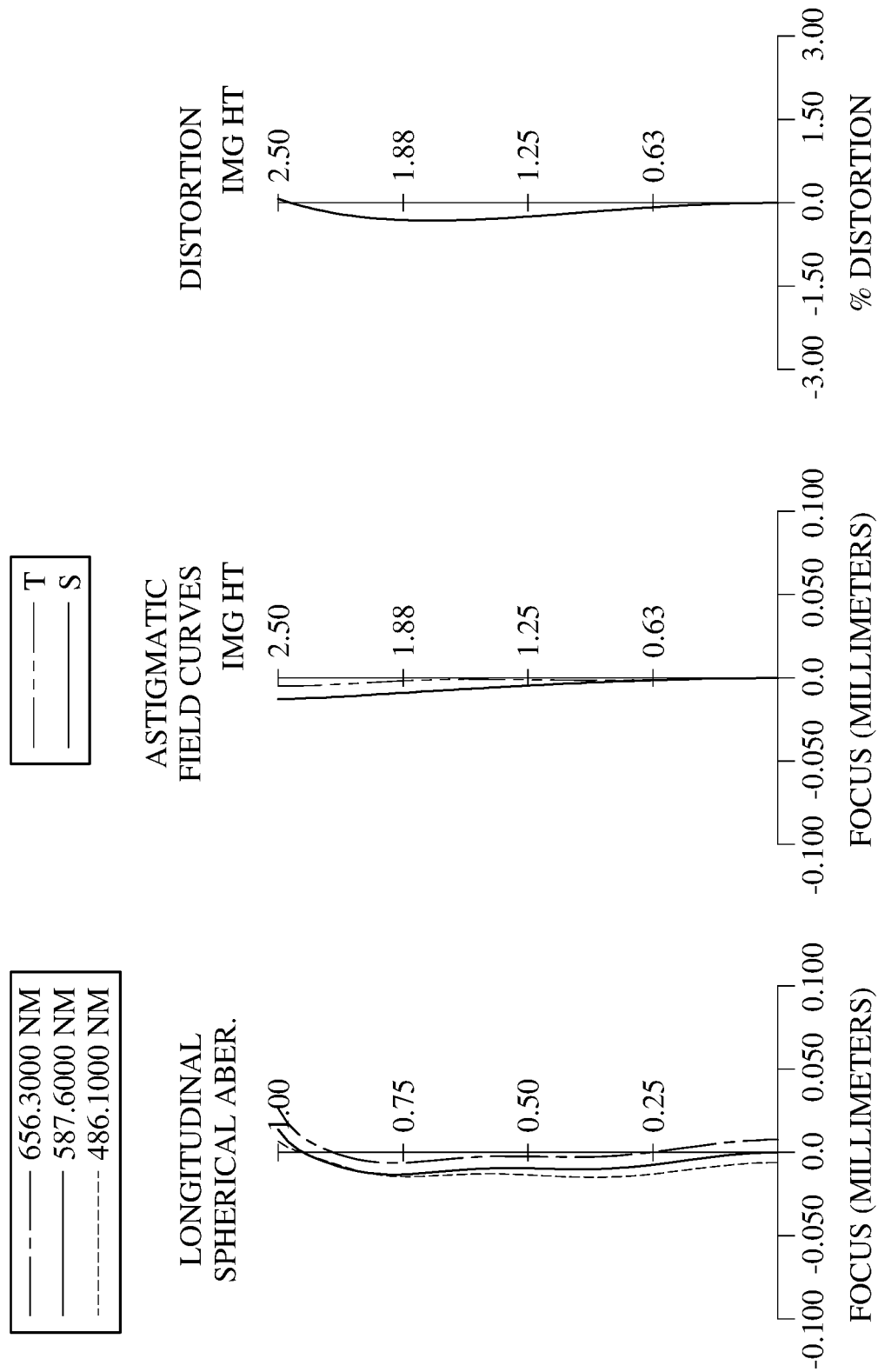
FIG. 9 shows spherical aberration curves, astigmatic field curves and a distortion curve of the zoom image capturing unit in the third zooming state according to the 1st embodiment.
Figure 10:
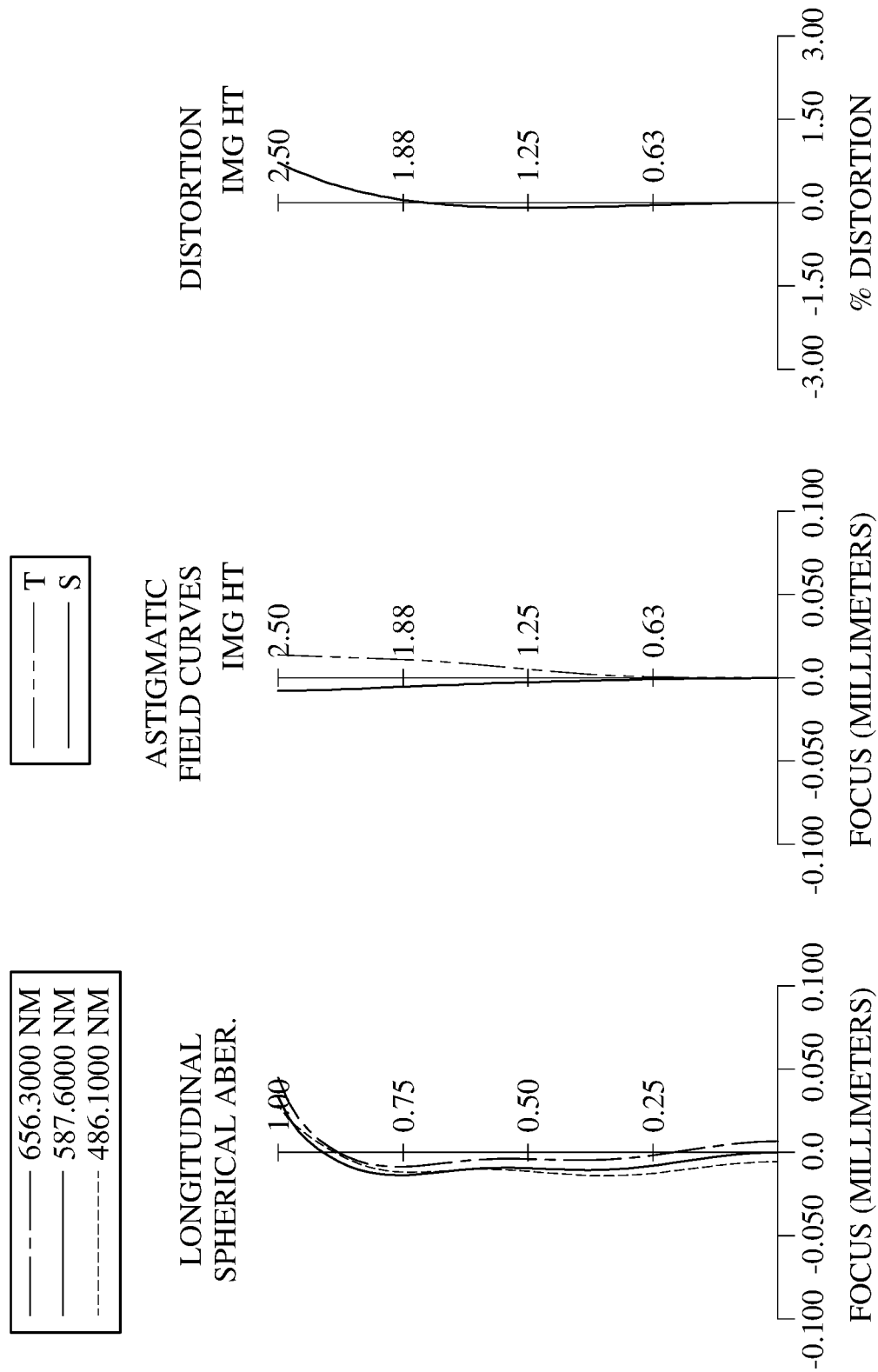
FIG. 10 shows spherical aberration curves, astigmatic field curves and a distortion curve of the zoom image capturing unit in the fourth zooming state according to the 1st embodiment.
Figure 11:
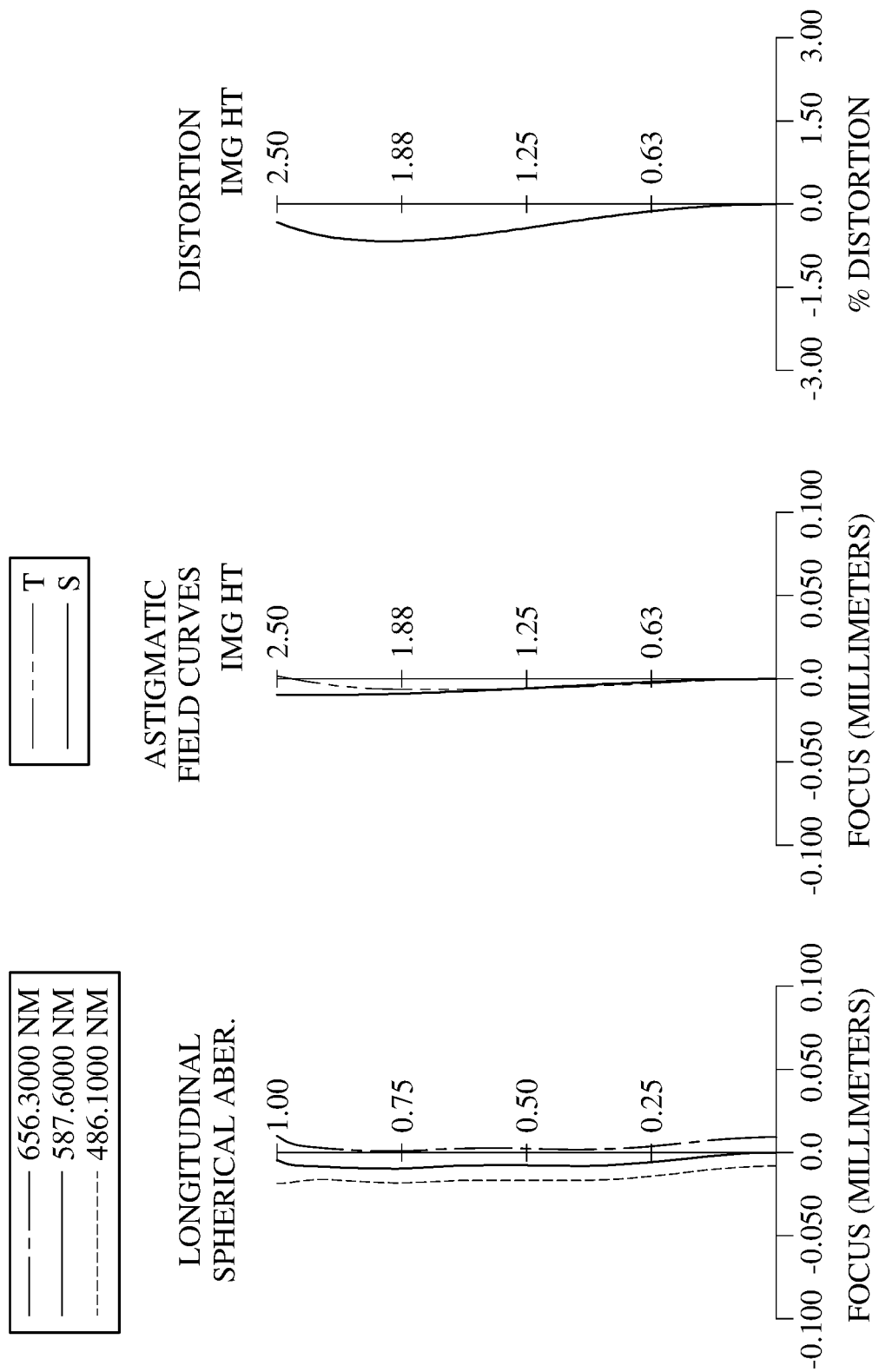
FIG. 11 shows spherical aberration curves, astigmatic field curves and a distortion curve of the zoom image capturing unit in the fifth zooming state according to the 1st embodiment.
Figure 12:
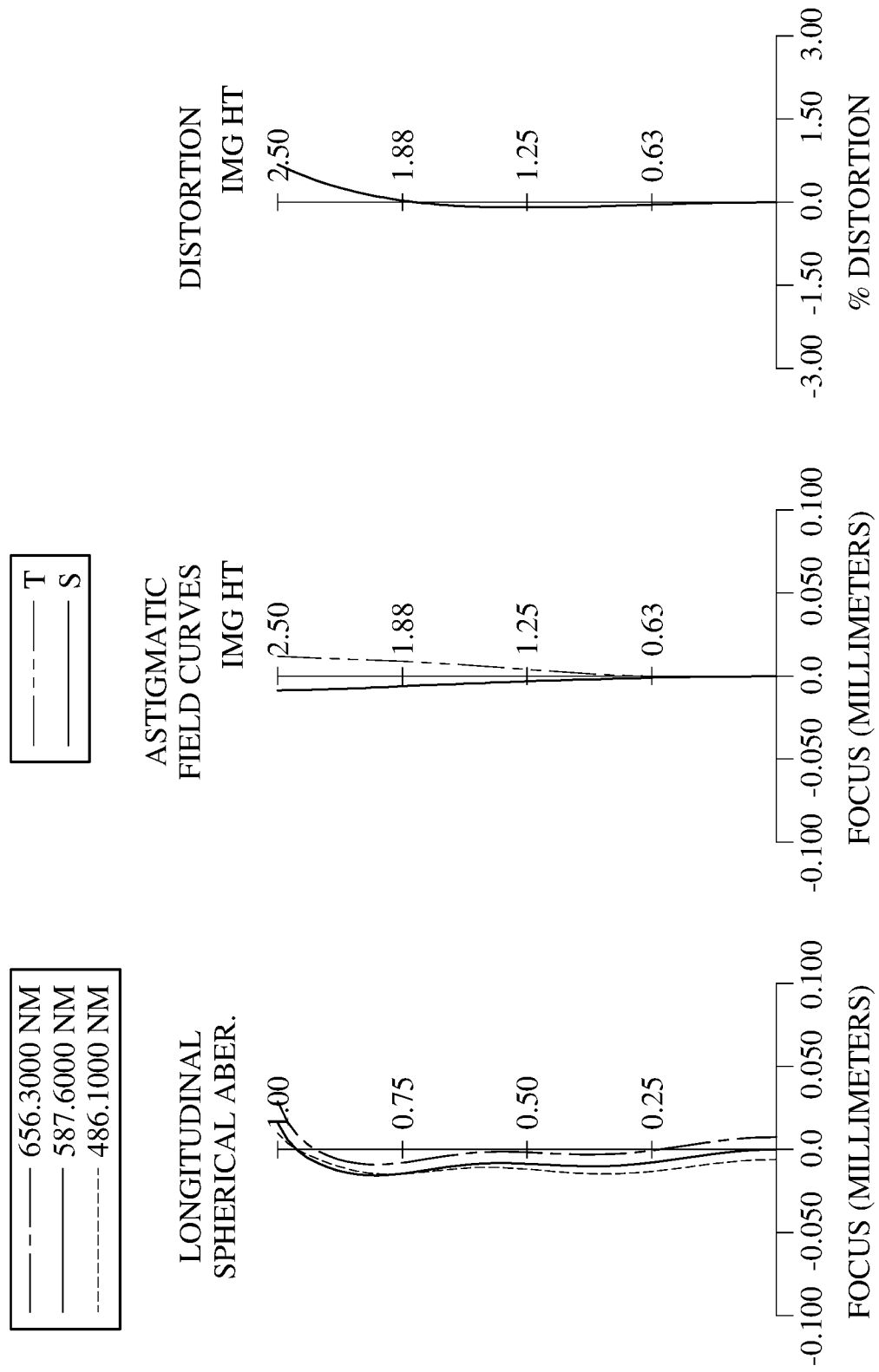
FIG. 12 shows spherical aberration curves, astigmatic field curves and a distortion curve of the zoom image capturing unit in the sixth zooming state according to the 1st embodiment.
Figure 13:
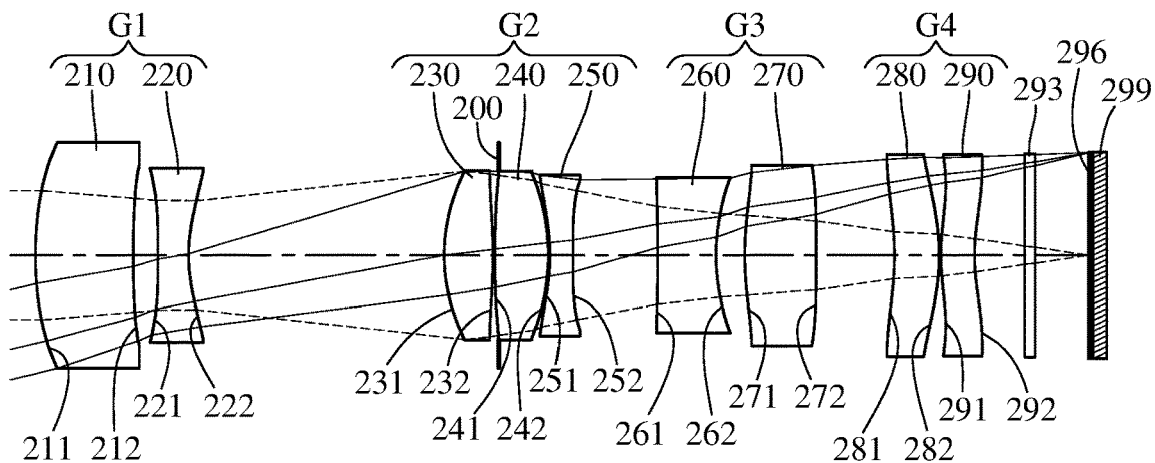
FIG. 13 is a schematic view of a zoom image capturing unit in the first zooming state according to the 2nd embodiment of the present disclosure.
Figure 14:
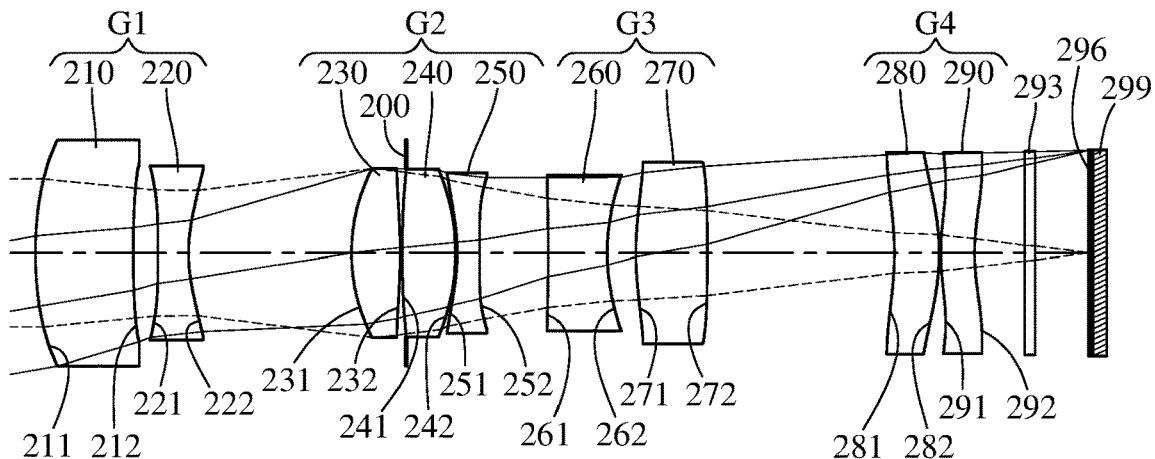
FIG. 14 is a schematic view of the zoom image capturing unit in the second zooming state according to the 2nd embodiment of the present disclosure.
Figure 15:
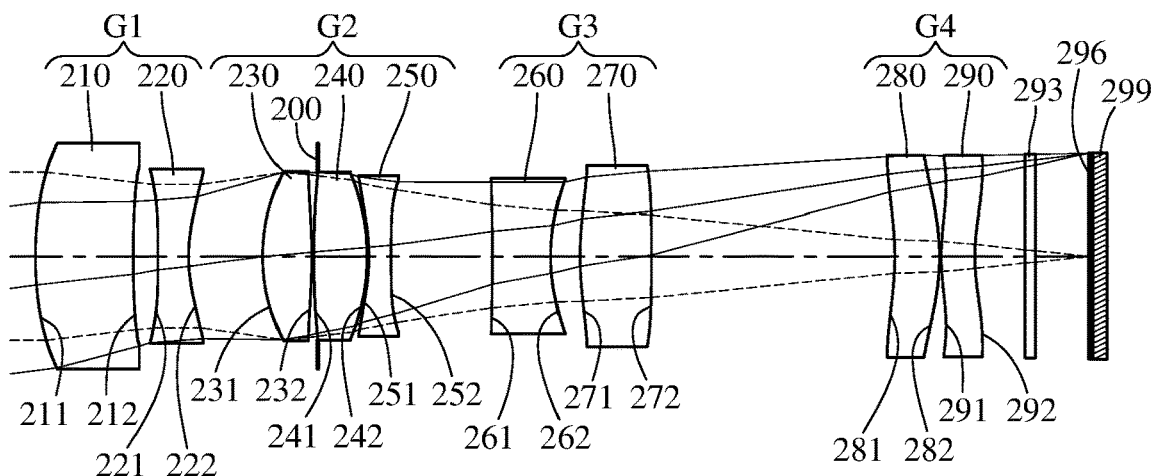
FIG. 15 is a schematic view of the zoom image capturing unit in the third zooming state according to the 2nd embodiment of the present disclosure.
Figure 16:
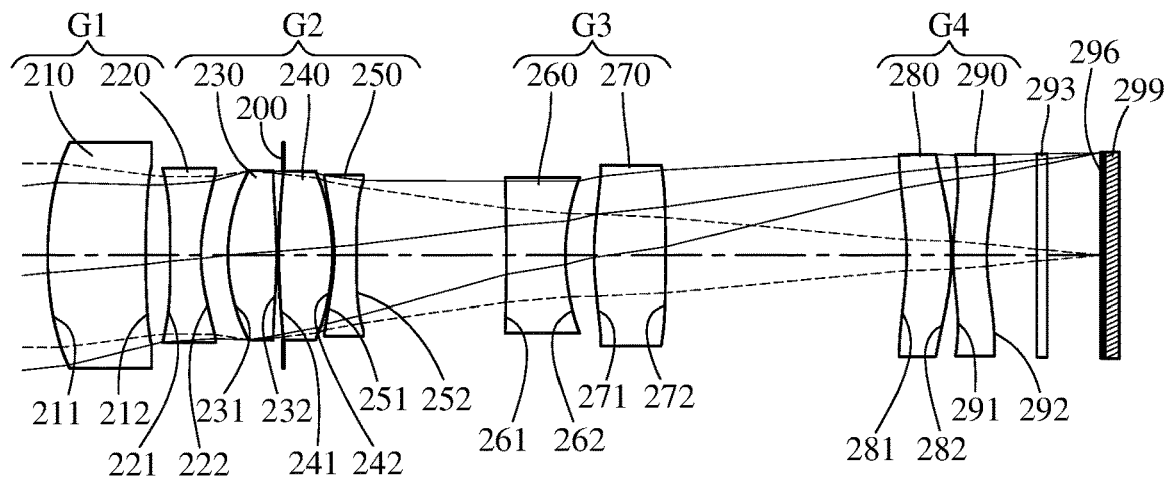
FIG. 16 is a schematic view of the zoom image capturing unit in the fourth zooming state according to the 2nd embodiment of the present disclosure.
Figure 17:
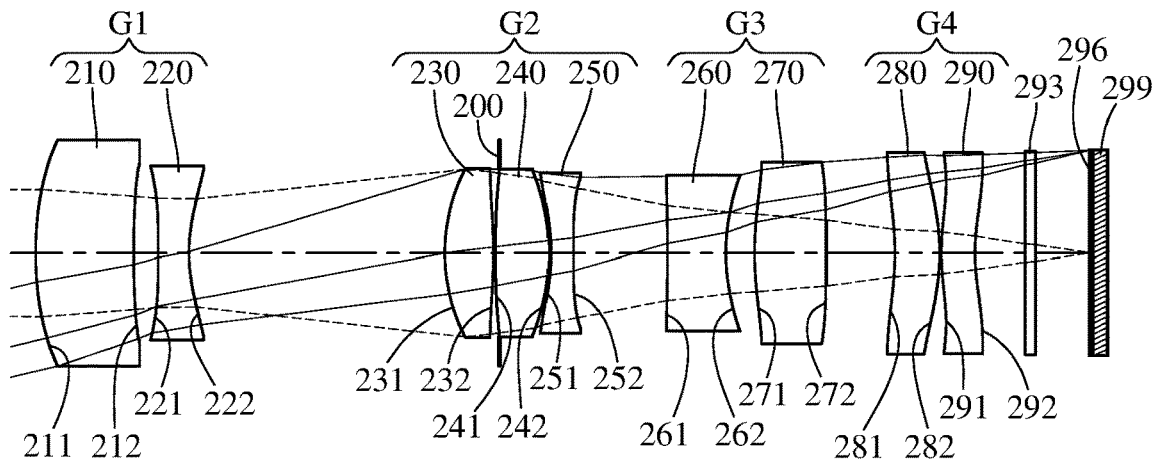
FIG. 17 is a schematic view of the zoom image capturing unit in the fifth zooming state according to the 2nd embodiment of the present disclosure.
Figure 18:
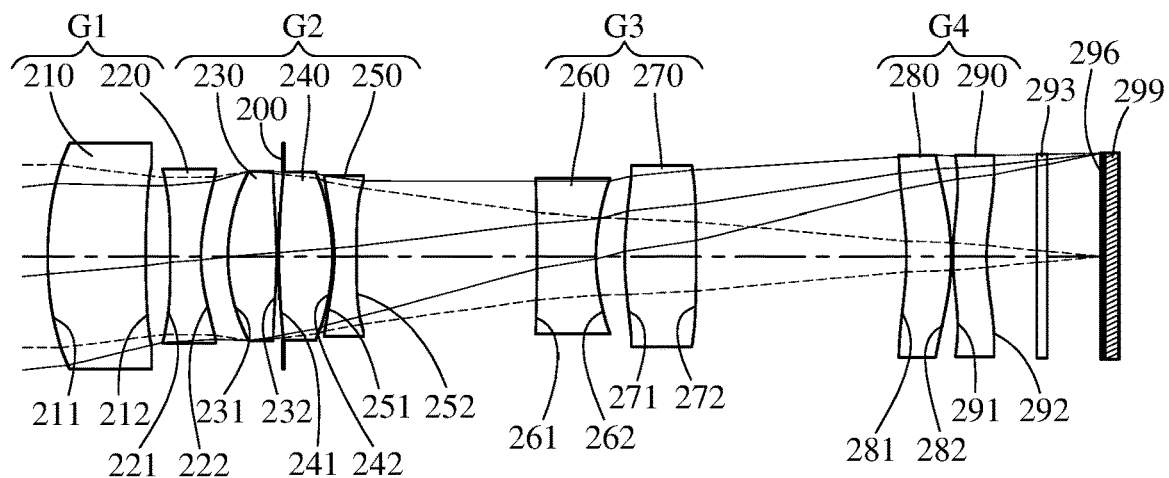
FIG. 18 is a schematic view of the zoom image capturing unit in the sixth zooming state according to the 2nd embodiment of the present disclosure.
Figure 19:
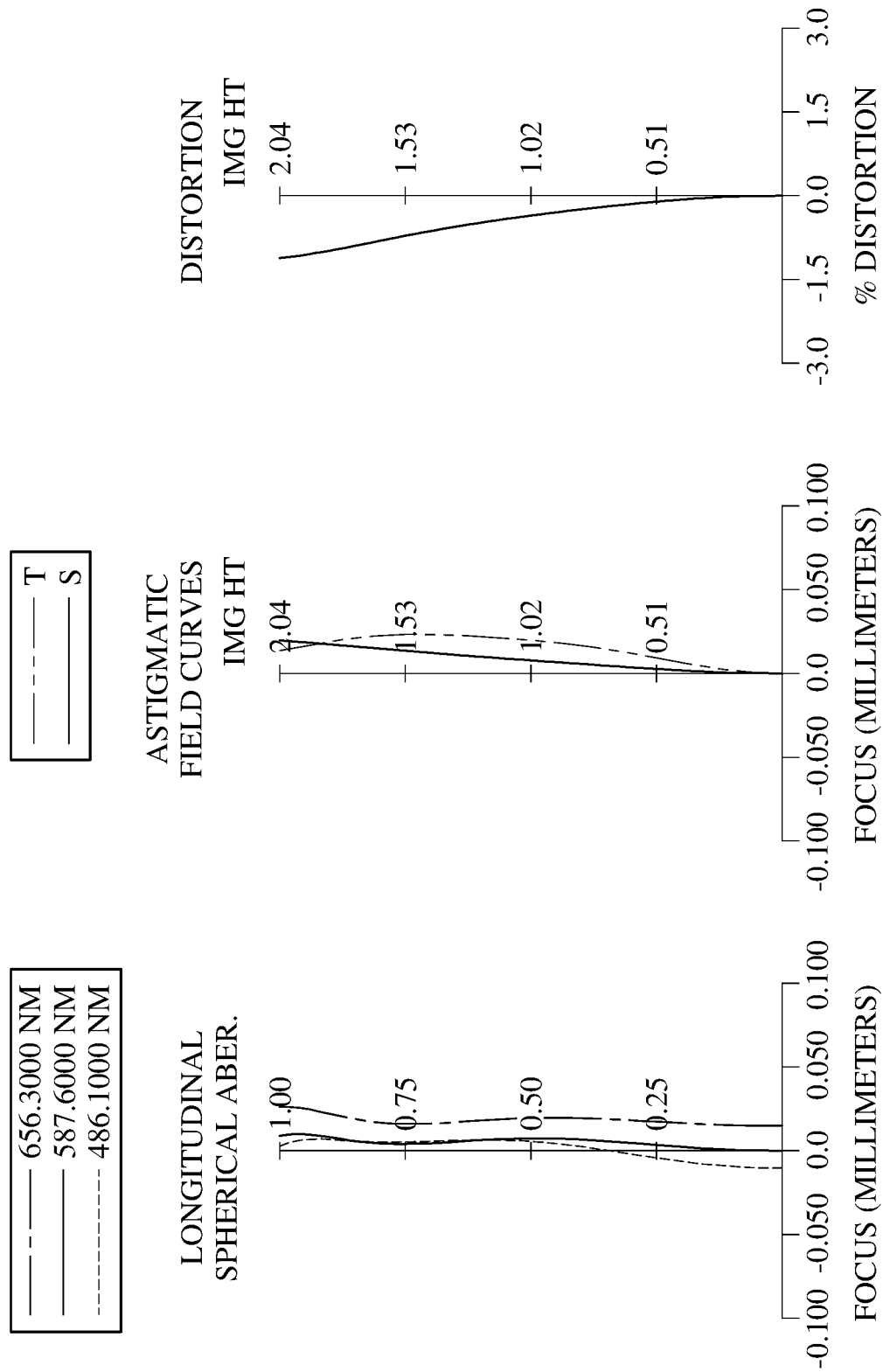
FIG. 19 shows spherical aberration curves, astigmatic field curves and a distortion curve of the zoom image capturing unit in the first zooming state according to the 2nd embodiment.
Figure 20:
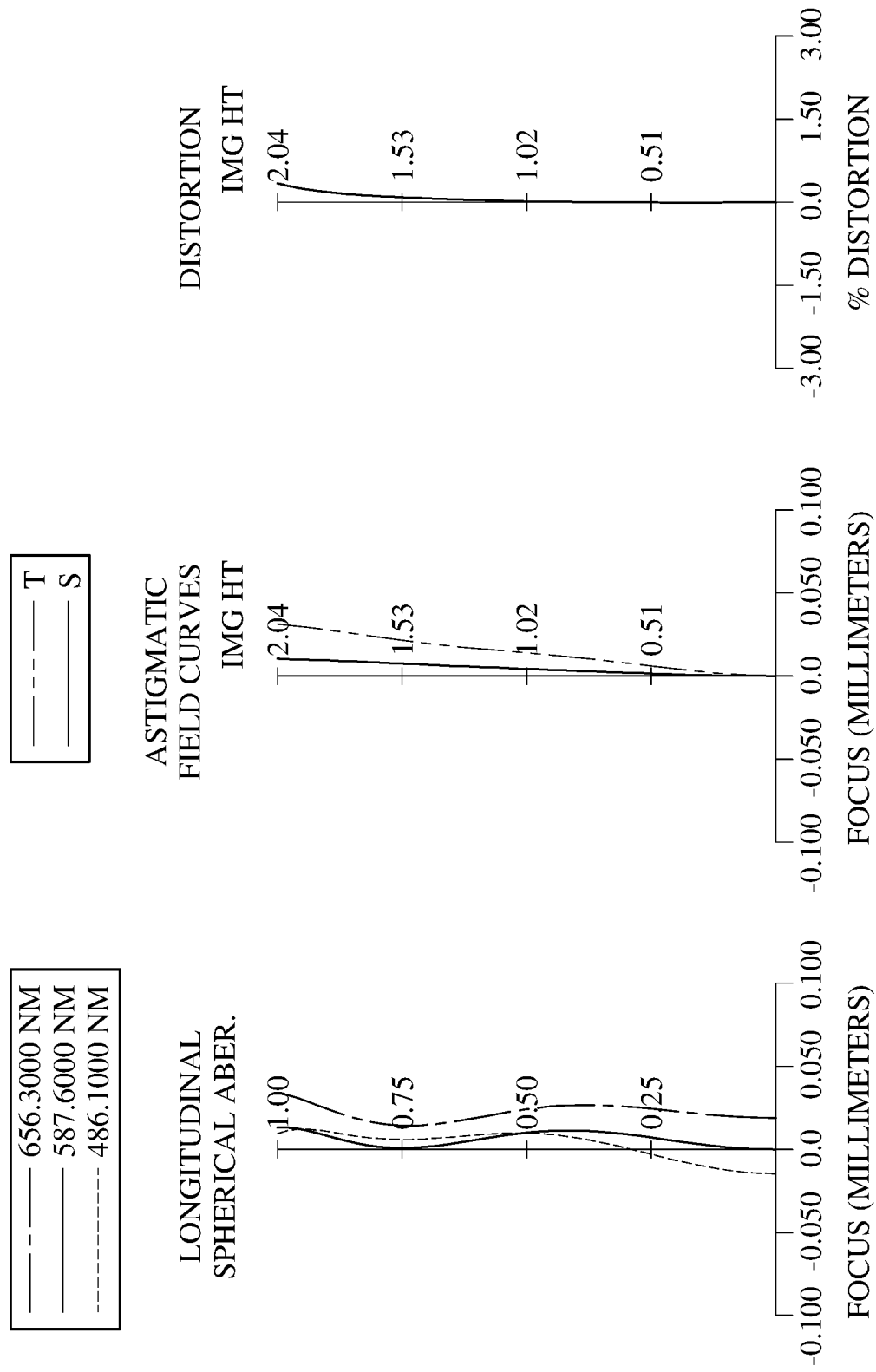
FIG. 20 shows spherical aberration curves, astigmatic field curves and a distortion curve of the zoom image capturing unit in the second zooming state according to the 2nd embodiment.
Figure 21:
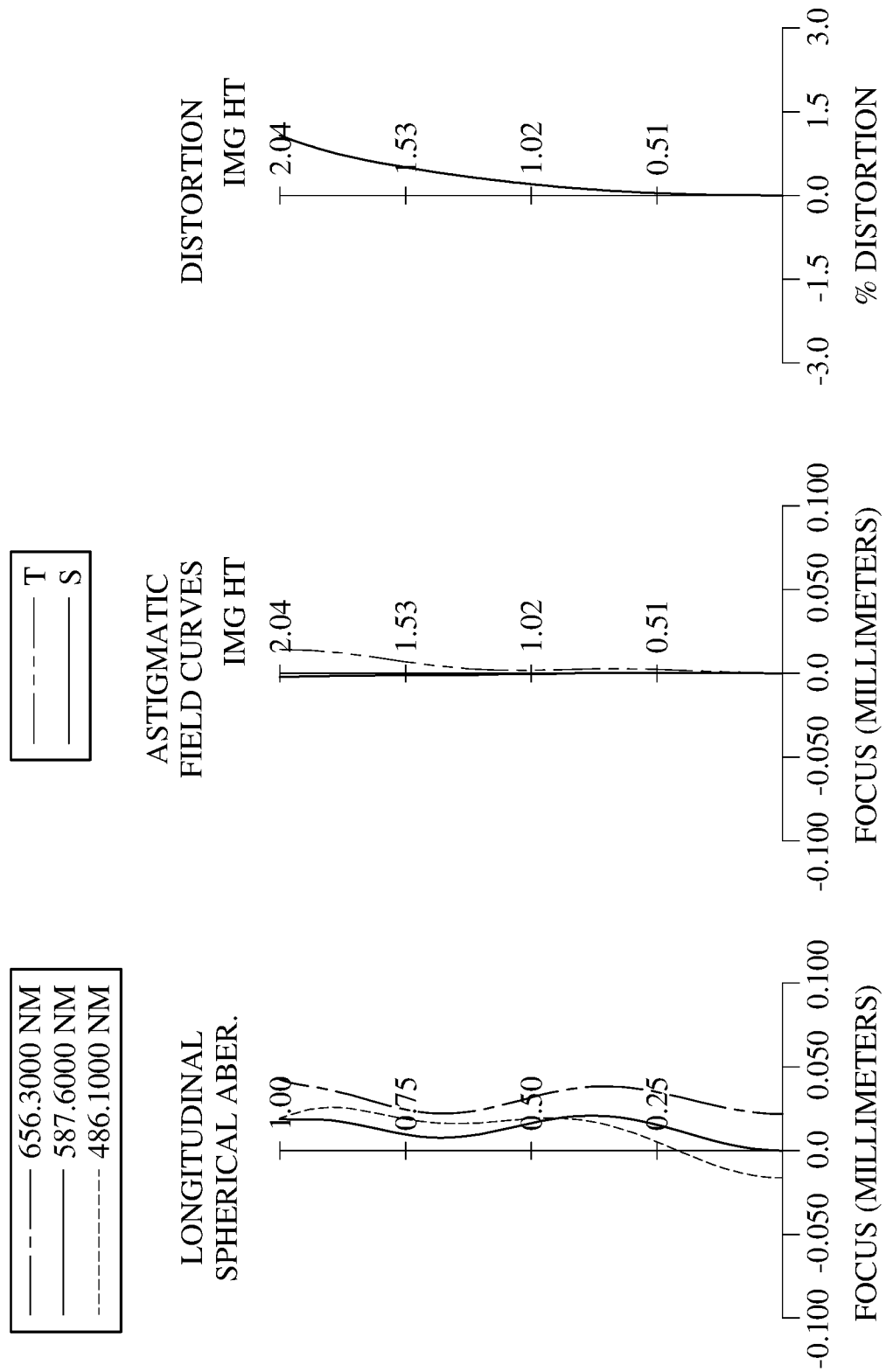
FIG. 21 shows spherical aberration curves, astigmatic field curves and a distortion curve of the zoom image capturing unit in the third zooming state according to the 2nd embodiment.
Figure 22:
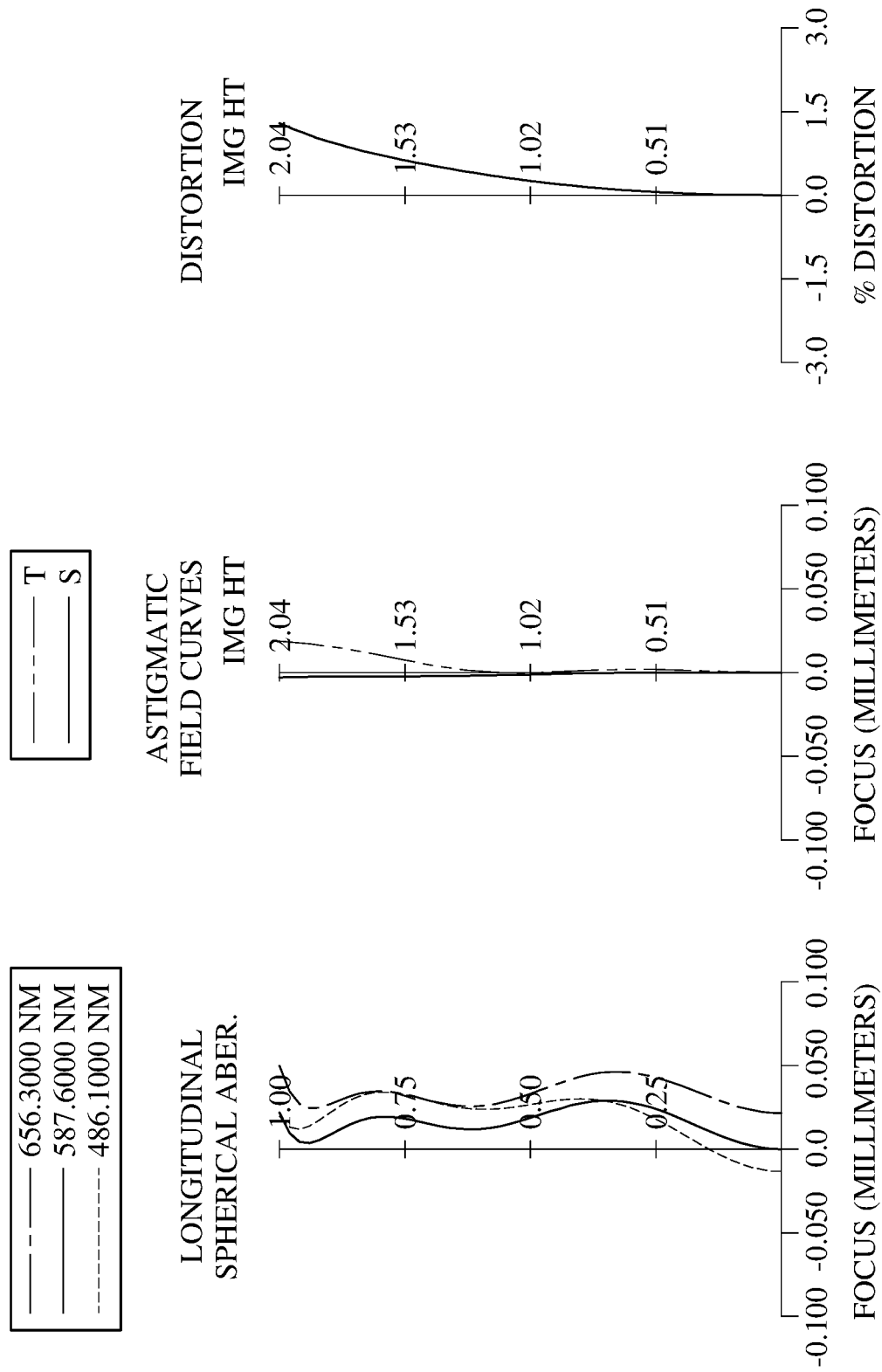
FIG. 22 shows spherical aberration curves, astigmatic field curves and a distortion curve of the zoom image capturing unit in the fourth zooming state according to the 2nd embodiment.
Figure 23:
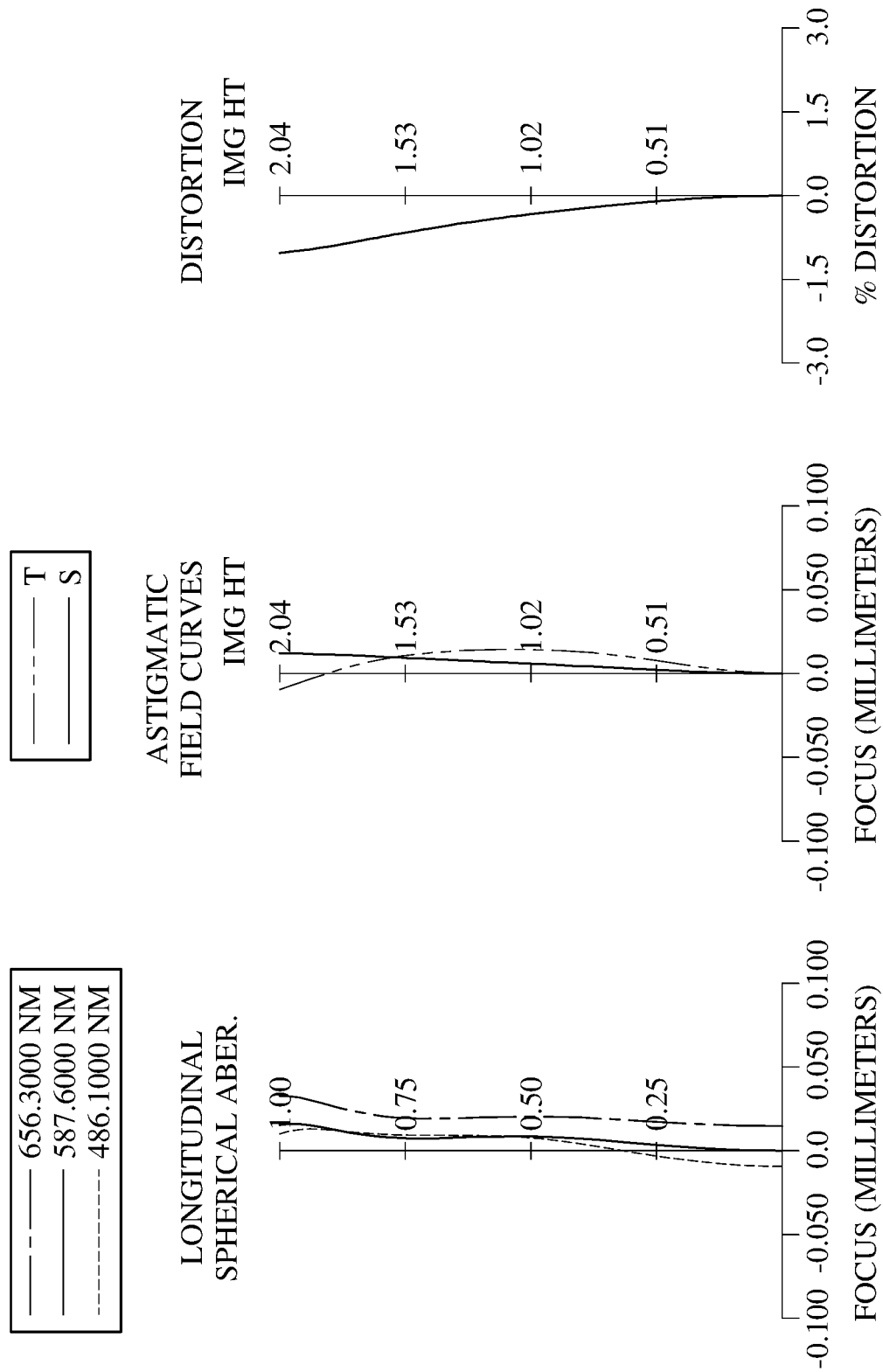
FIG. 23 shows spherical aberration curves, astigmatic field curves and a distortion curve of the zoom image capturing unit in the fifth zooming state according to the 2nd embodiment.
Figure 24:
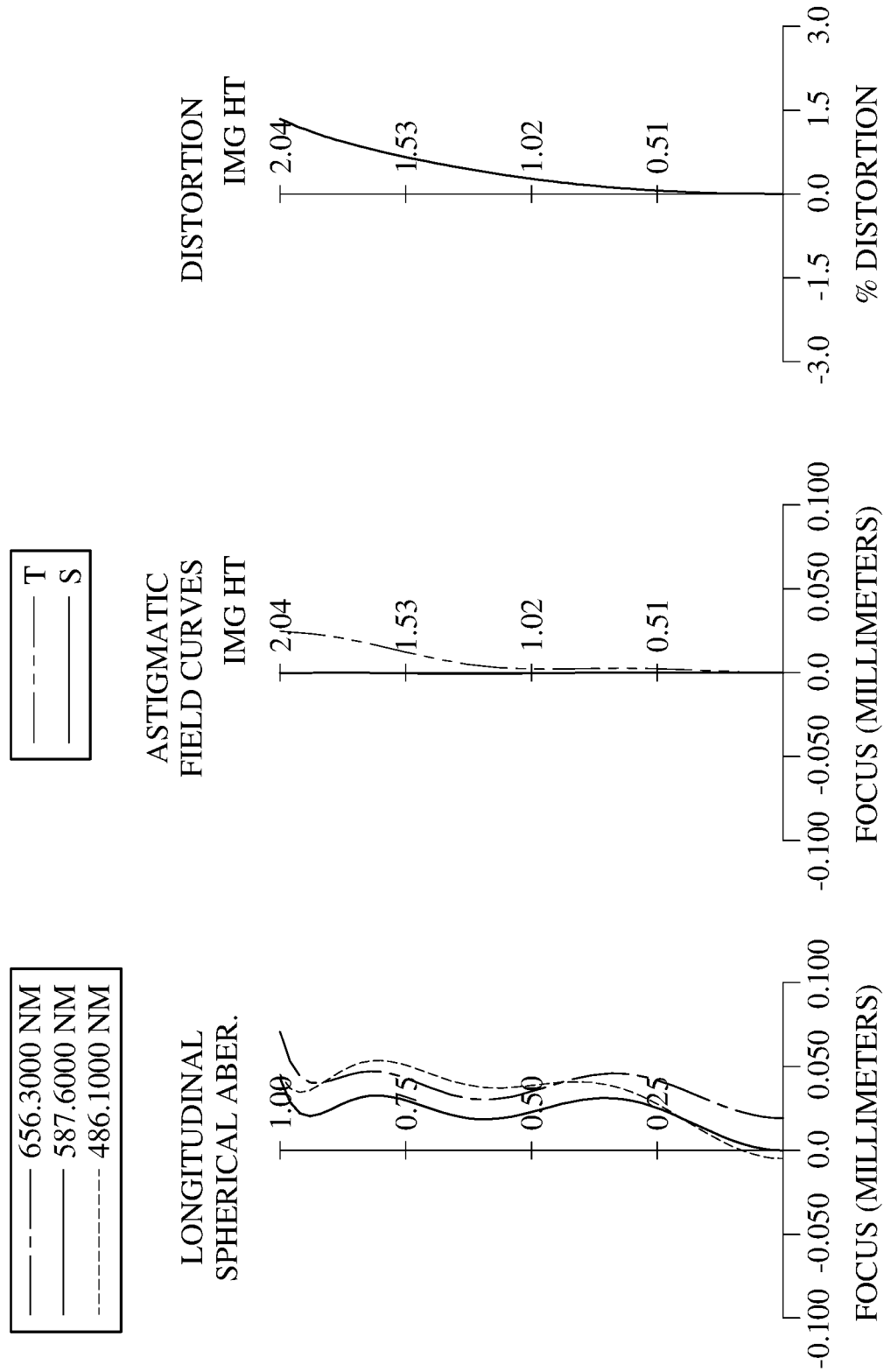
FIG. 24 shows spherical aberration curves, astigmatic field curves and a distortion curve of the zoom image capturing unit in the sixth zooming state according to the 2nd embodiment.
Figure 25:
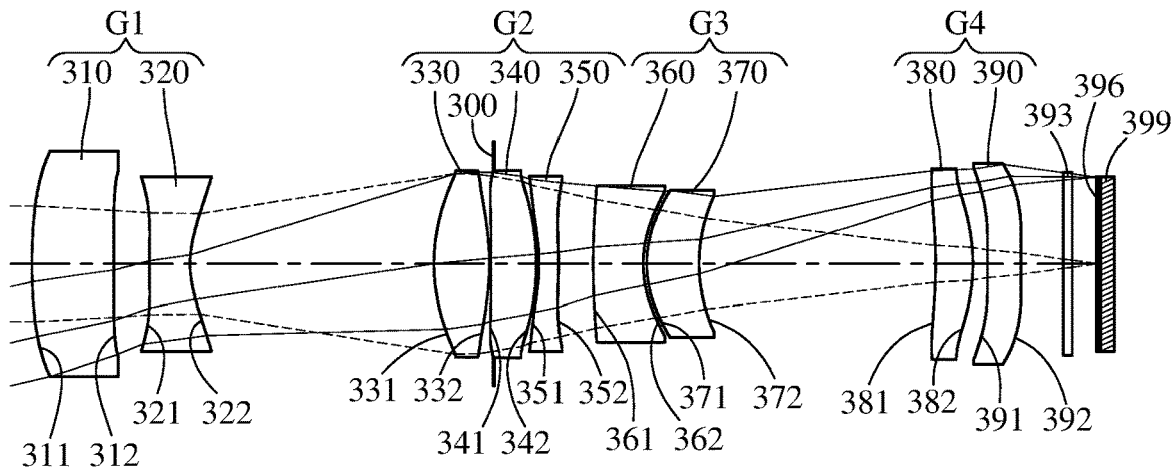
FIG. 25 is a schematic view of a zoom image capturing unit in the first zooming state according to the 3rd embodiment of the present disclosure.
Figure 26:
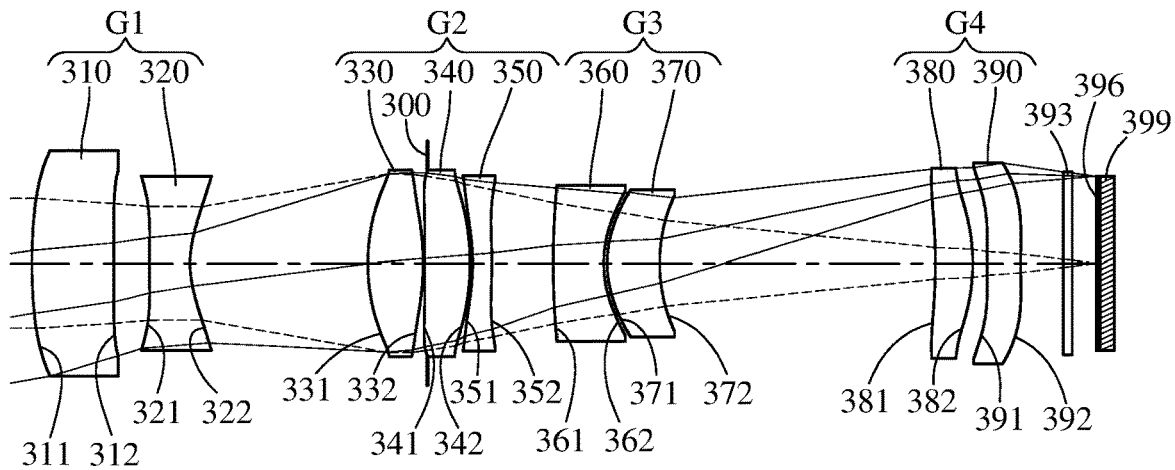
FIG. 26 is a schematic view of the zoom image capturing unit in the second zooming state according to the 3rd embodiment of the present disclosure.
Figure 27:
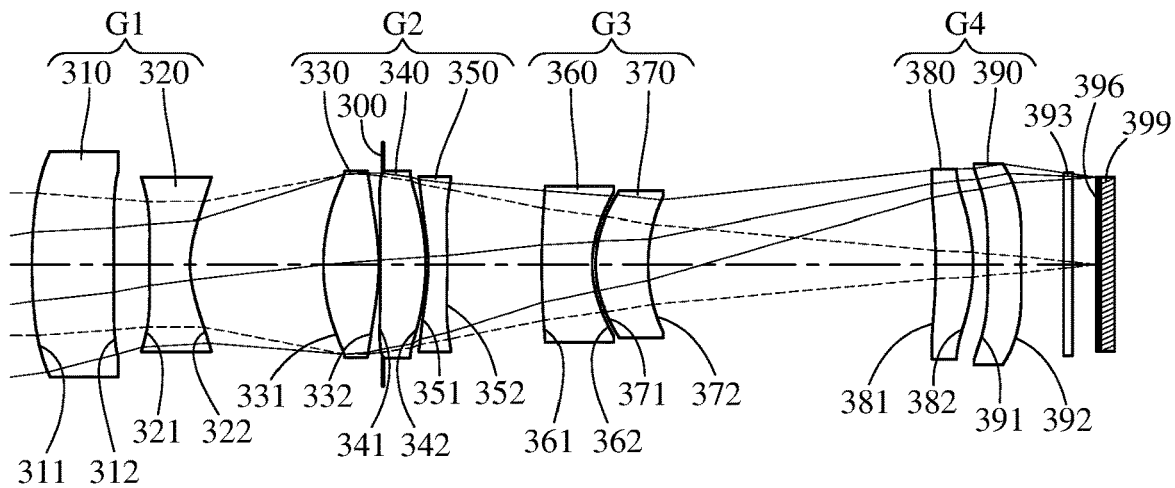
FIG. 27 is a schematic view of the zoom image capturing unit in the third zooming state according to the 3rd embodiment of the present disclosure.
Figure 28:
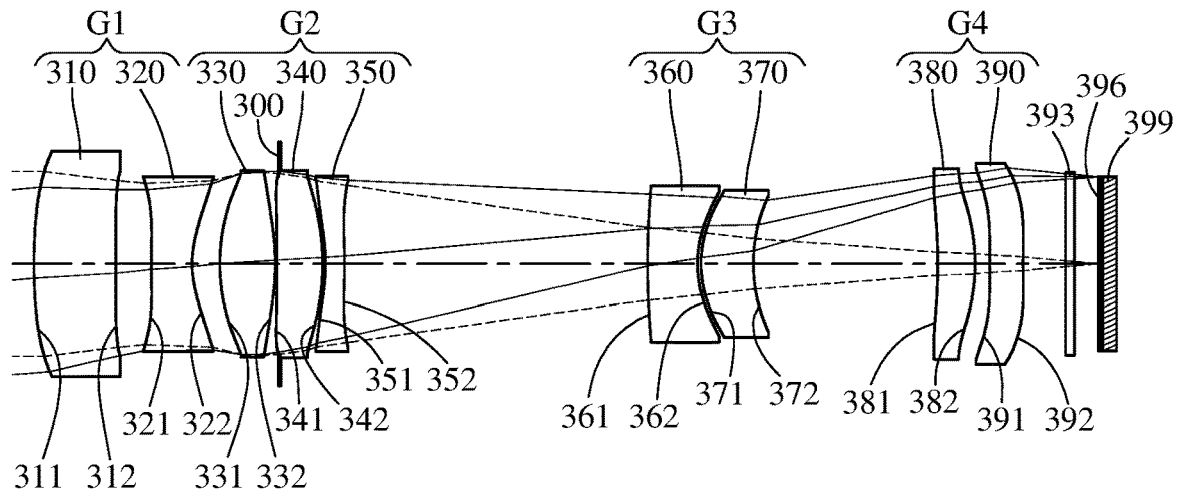
FIG. 28 is a schematic view of the zoom image capturing unit in the fourth zooming state according to the 3rd embodiment of the present disclosure.
Figure 29:
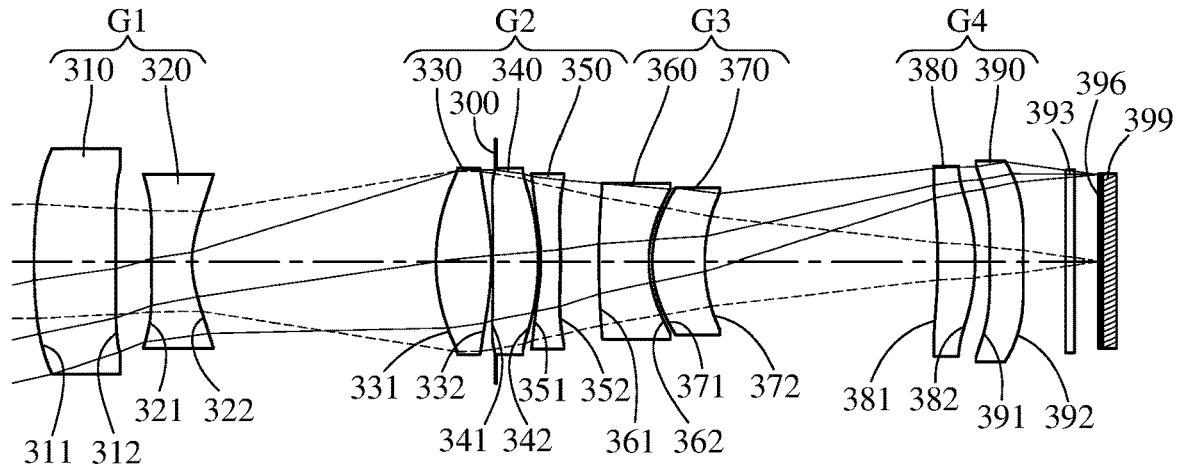
FIG. 29 is a schematic view of the zoom image capturing unit in the fifth zooming state according to the 3rd embodiment of the present disclosure.
Figure 30:
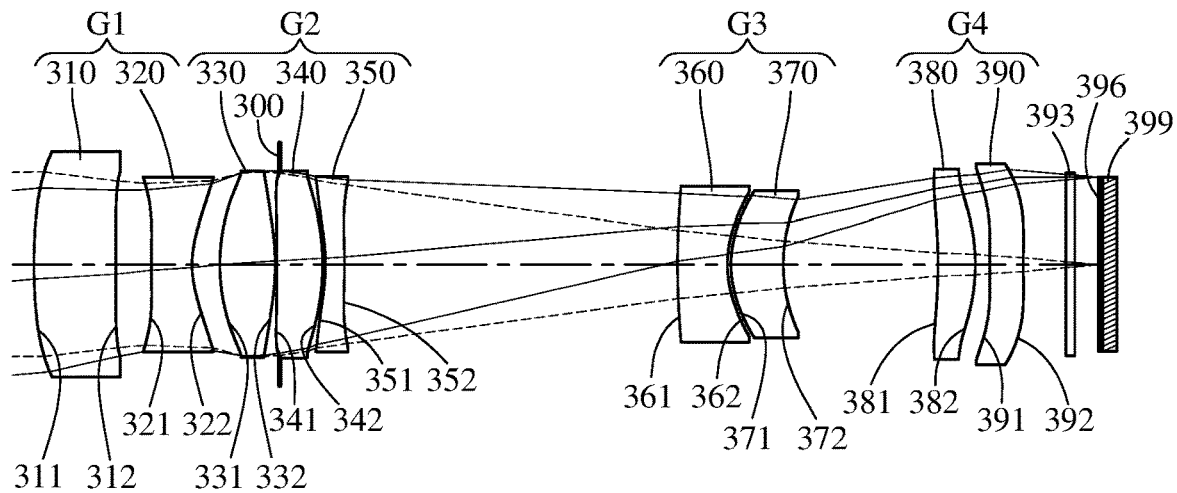
FIG. 30 is a schematic view of the zoom image capturing unit in the sixth zooming state according to the 3rd embodiment of the present disclosure.
Figure 31:
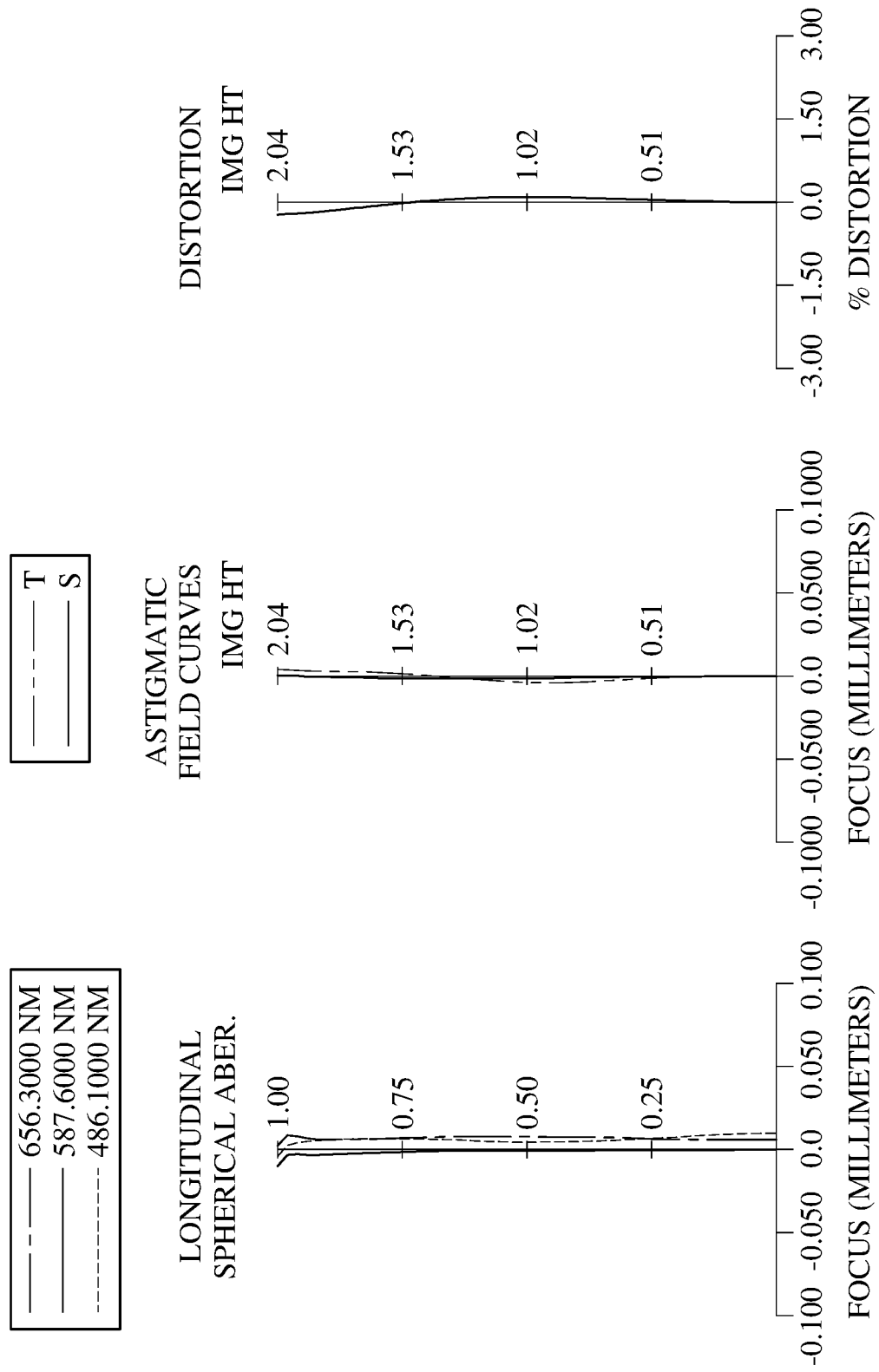
FIG. 31 shows spherical aberration curves, astigmatic field curves and a distortion curve of the zoom image capturing unit in the first zooming state according to the 3rd embodiment.
Figure 32:
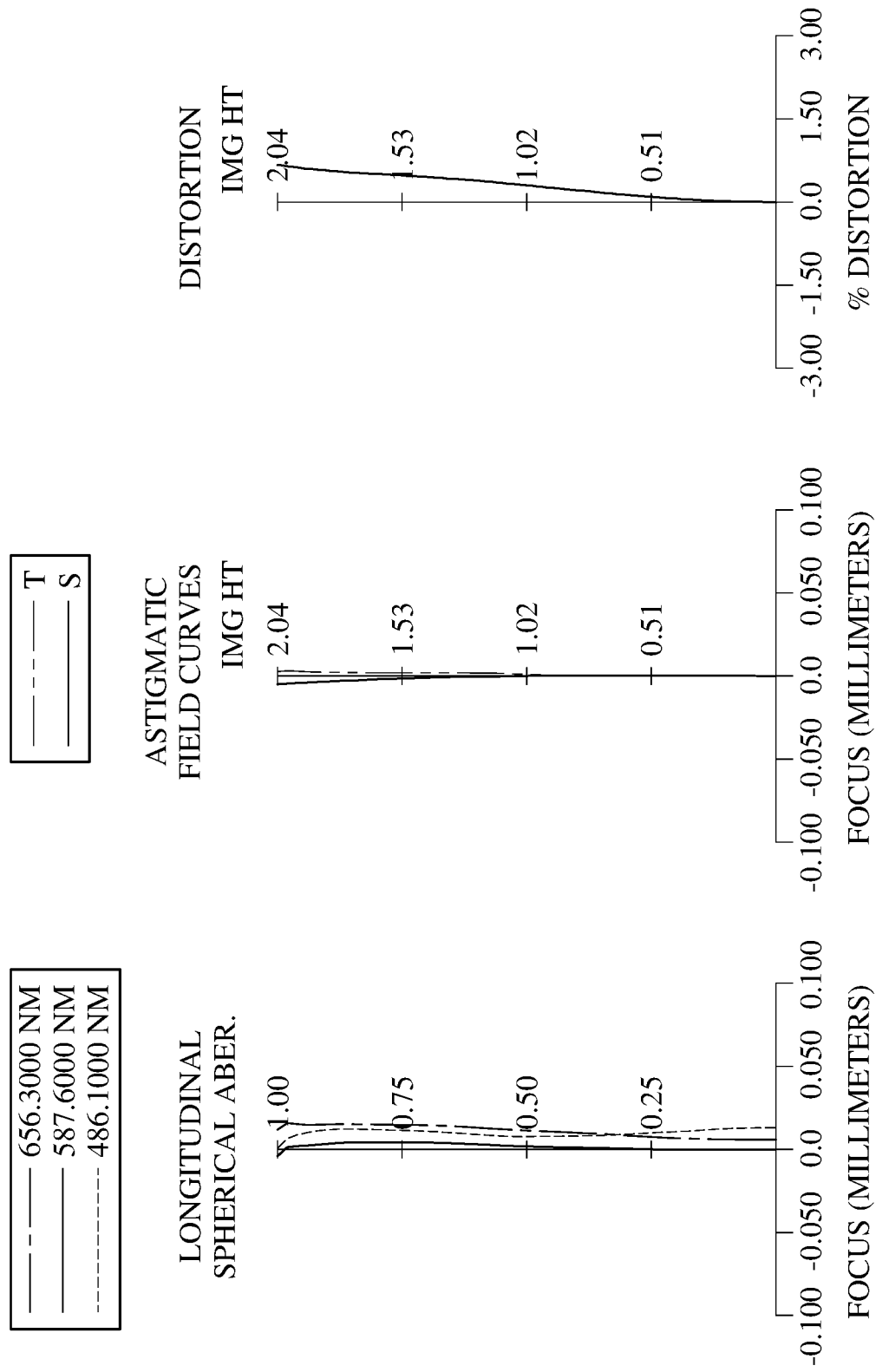
FIG. 32 shows spherical aberration curves, astigmatic field curves and a distortion curve of the zoom image capturing unit in the second zooming state according to the 3rd embodiment.
Figure 33:
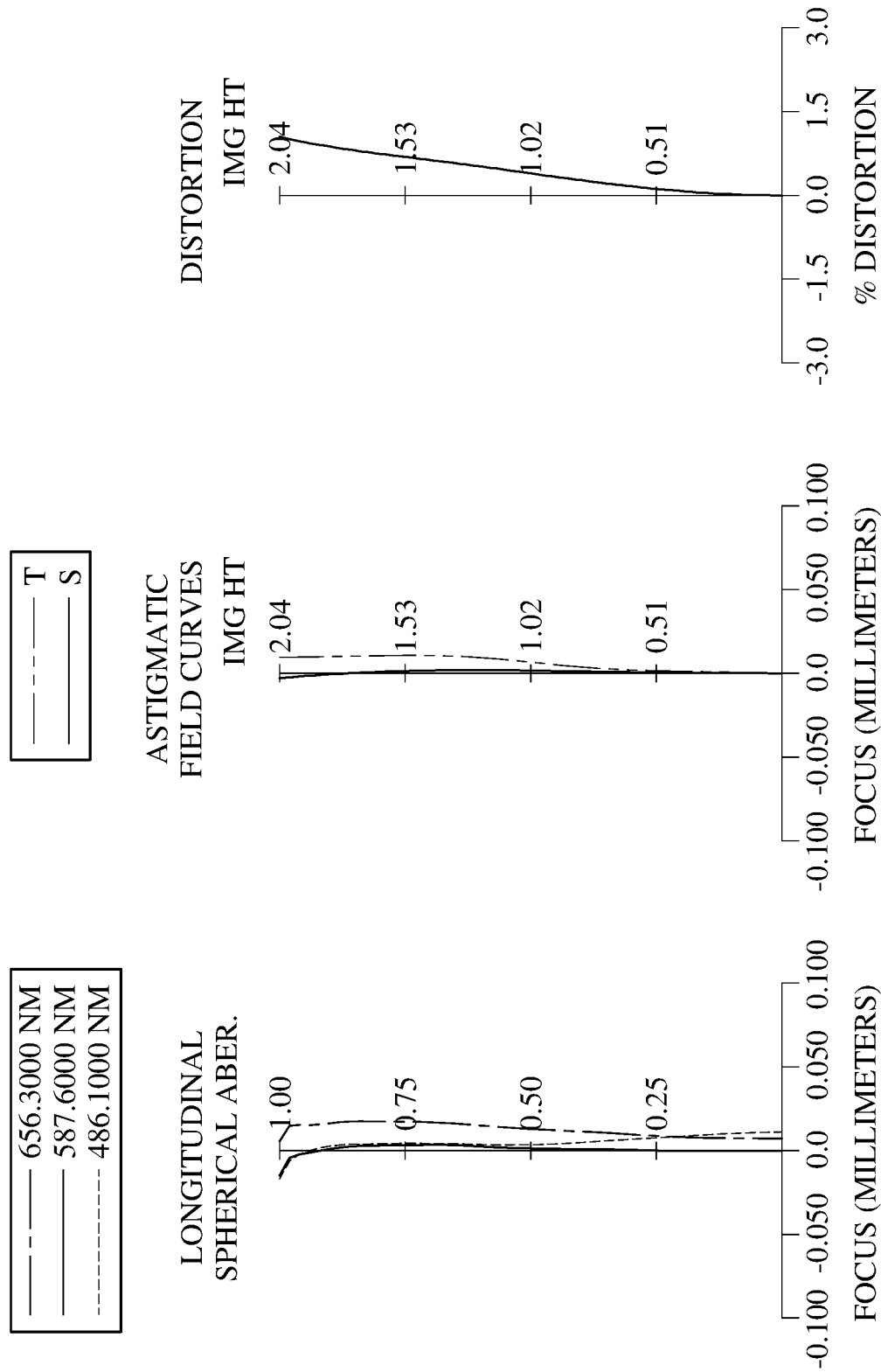
FIG. 33 shows spherical aberration curves, astigmatic field curves and a distortion curve of the zoom image capturing unit in the third zooming state according to the 3rd embodiment.
Figure 34:
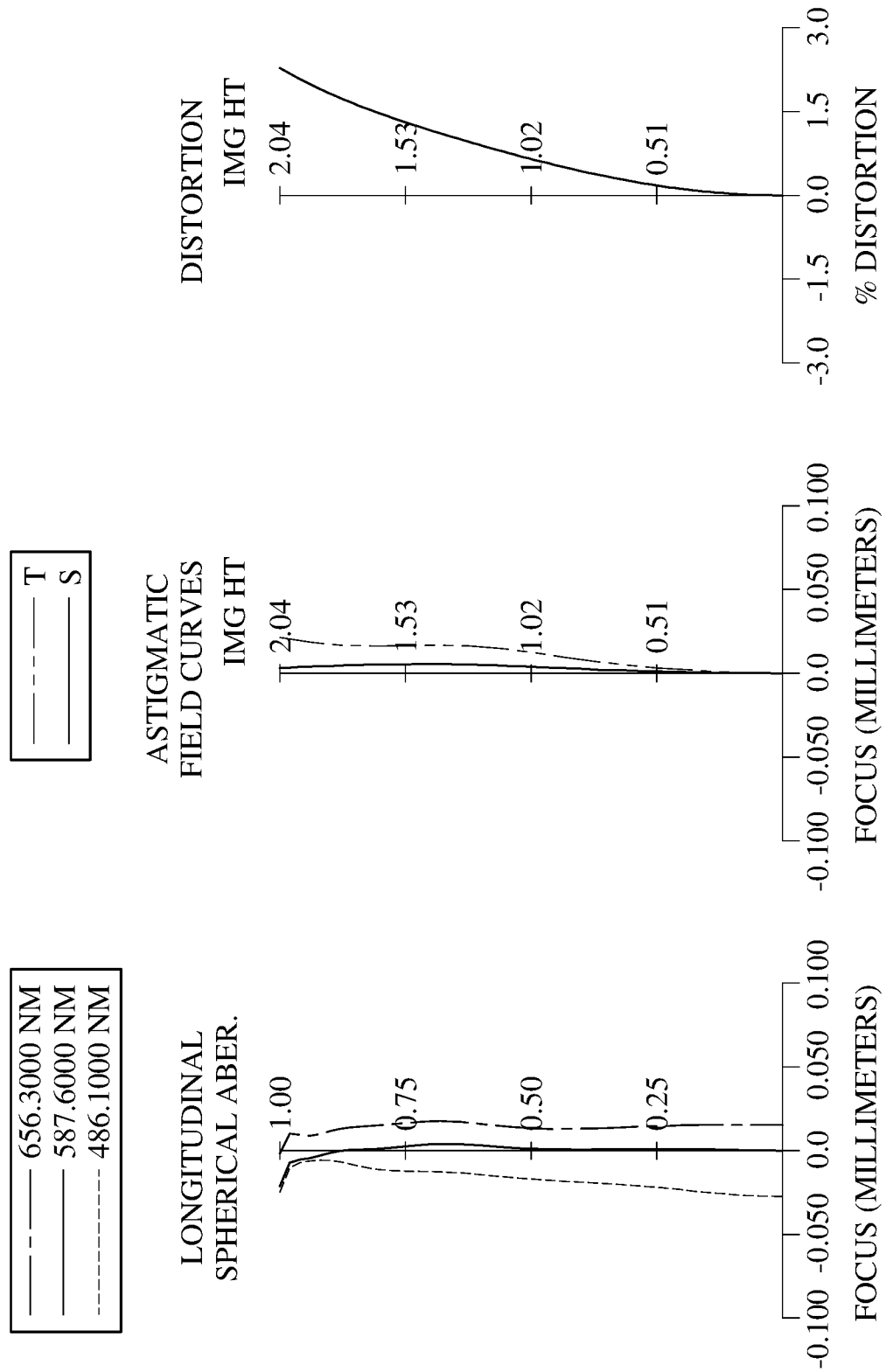
FIG. 34 shows spherical aberration curves, astigmatic field curves and a distortion curve of the zoom image capturing unit in the fourth zooming state according to the 3rd embodiment.
Figure 35:
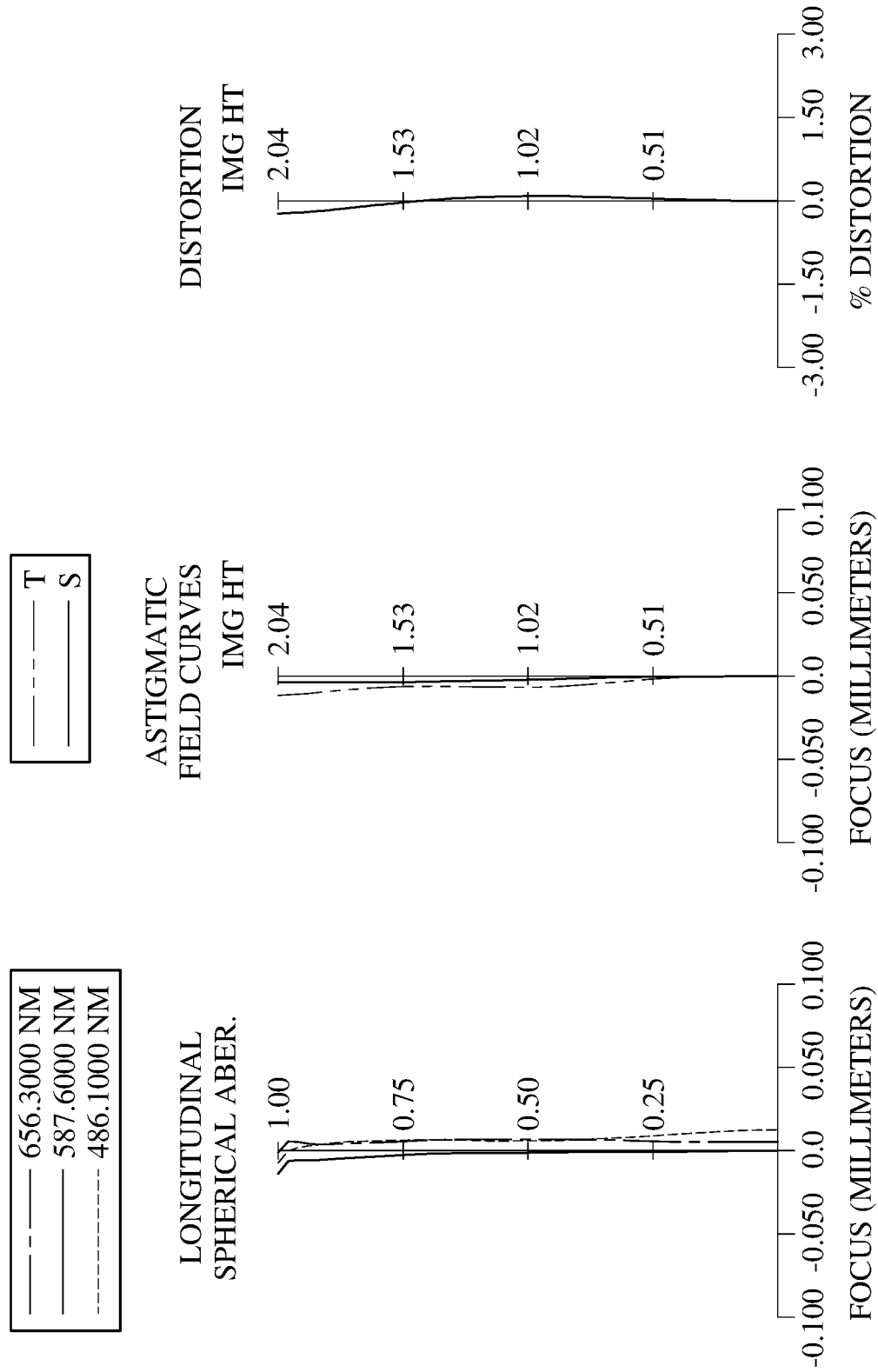
FIG. 35 shows spherical aberration curves, astigmatic field curves and a distortion curve of the zoom image capturing unit in the fifth zooming state according to the 3rd embodiment.
Figure 36:
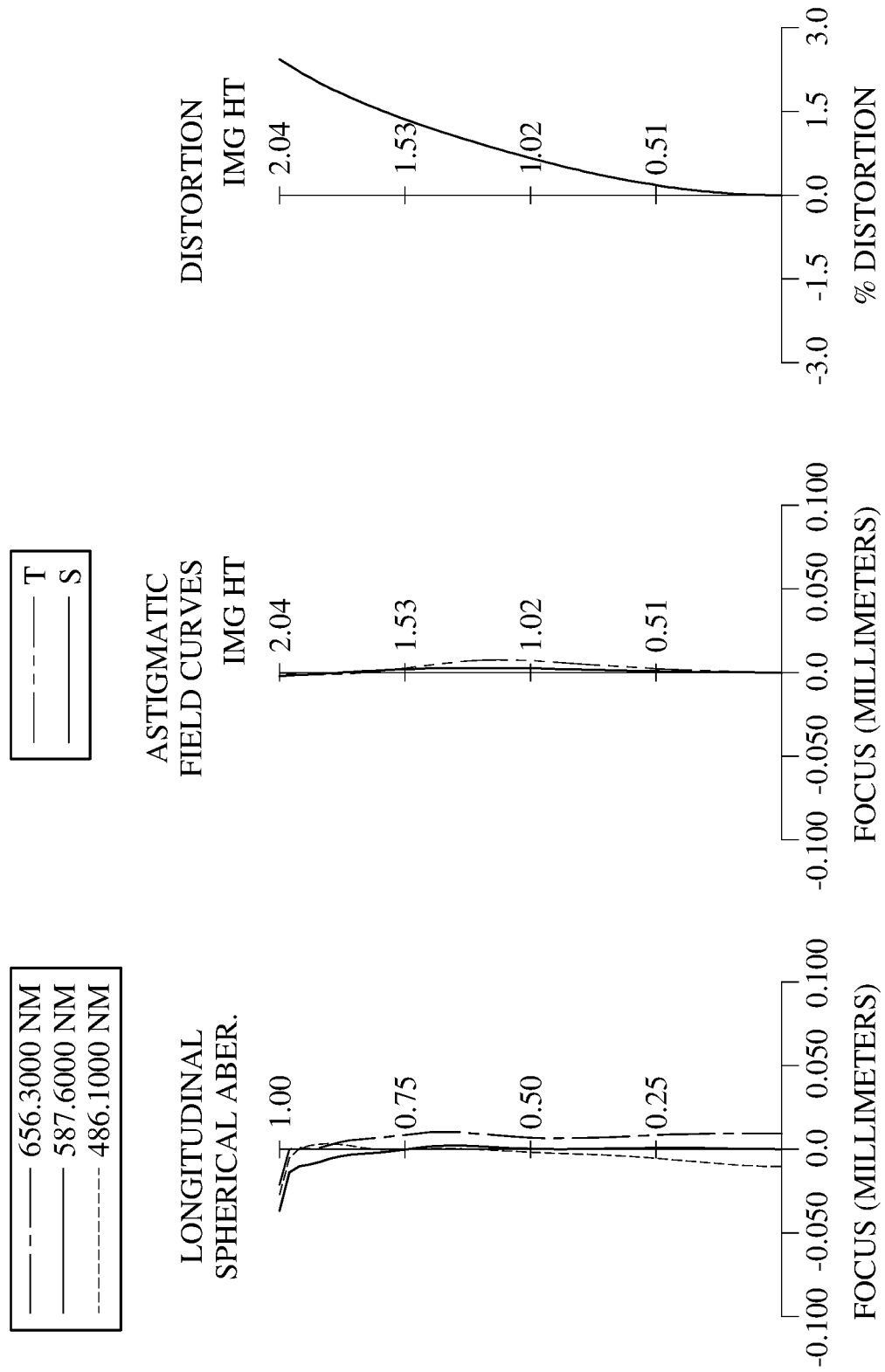
FIG. 36 shows spherical aberration curves, astigmatic field curves and a distortion curve of the zoom image capturing unit in the sixth zooming state according to the 3rd embodiment.
Figure 37:
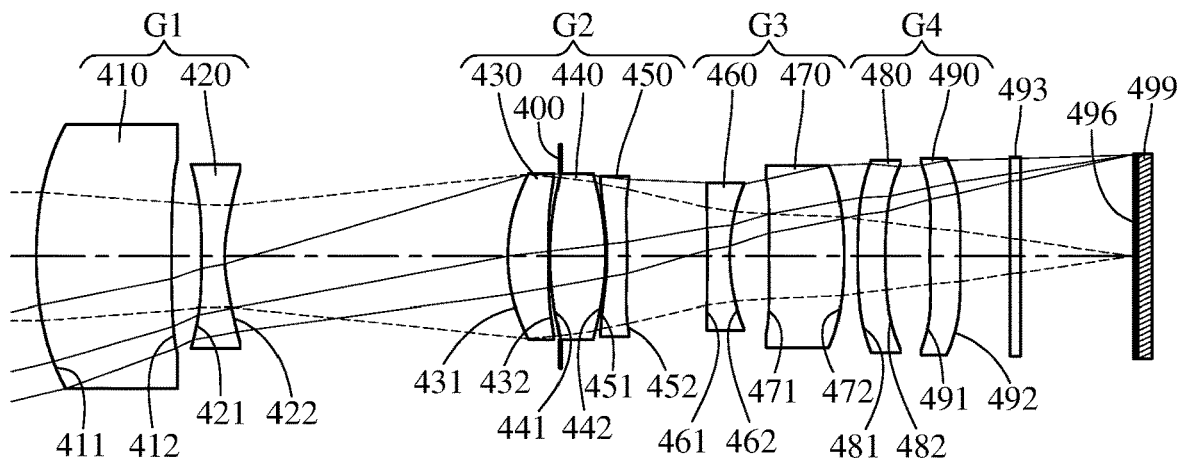
FIG. 37 is a schematic view of a zoom image capturing unit in the first zooming state according to the 4th embodiment of the present disclosure.
Figure 38:
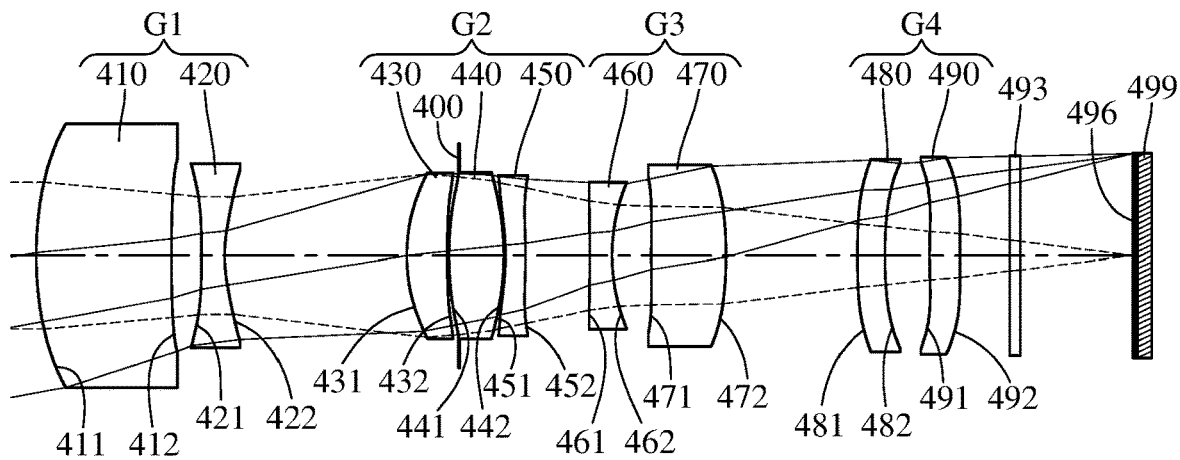
FIG. 38 is a schematic view of the zoom image capturing unit in the second zooming state according to the 4th embodiment of the present disclosure.
Figure 39:
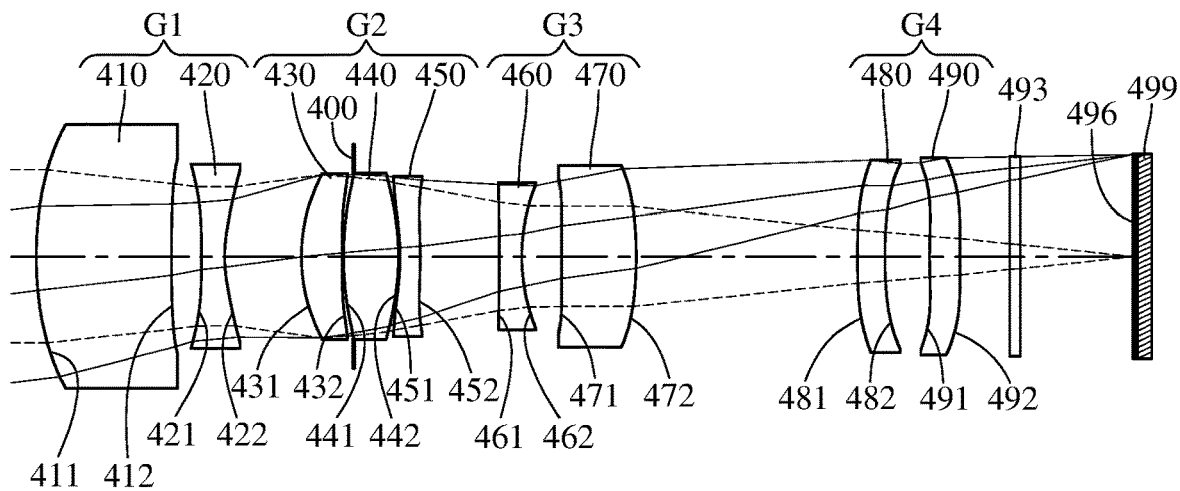
FIG. 39 is a schematic view of the zoom image capturing unit in the third zooming state according to the 4th embodiment of the present disclosure.
Figure 40:
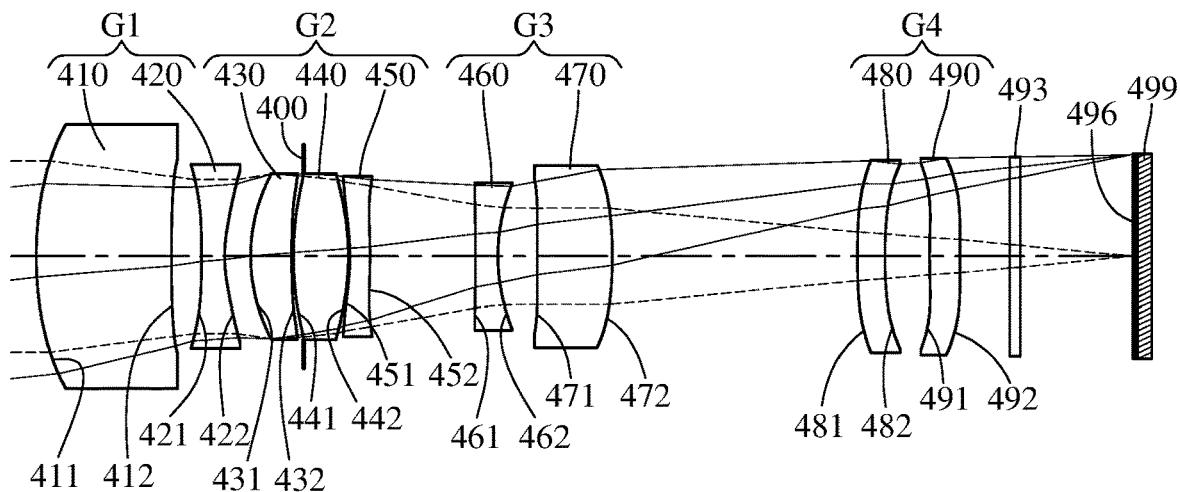
FIG. 40 is a schematic view of the zoom image capturing unit in the fourth zooming state according to the 4th embodiment of the present disclosure.
Figure 41:
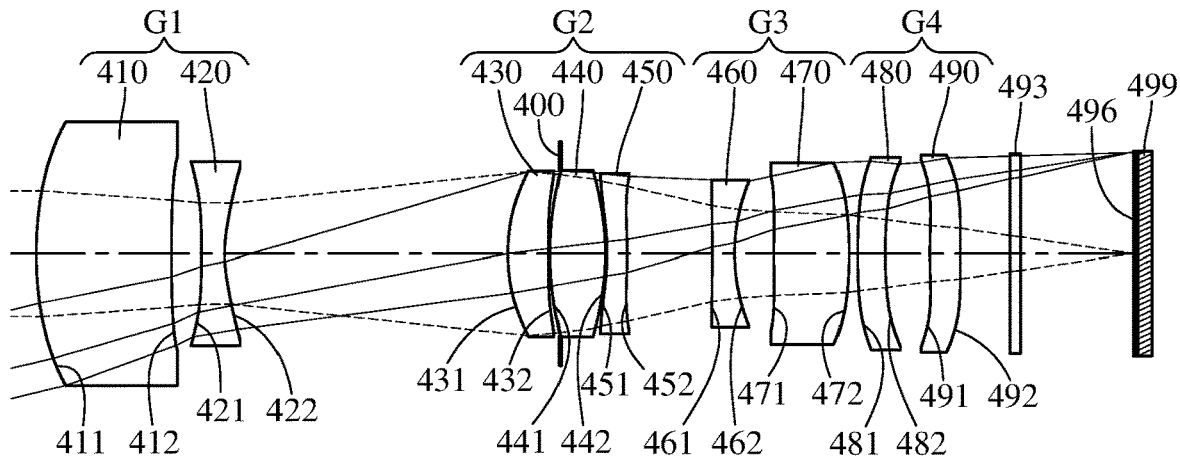
FIG. 41 is a schematic view of the zoom image capturing unit in the fifth zooming state according to the 4th embodiment of the present disclosure.
Figure 42:
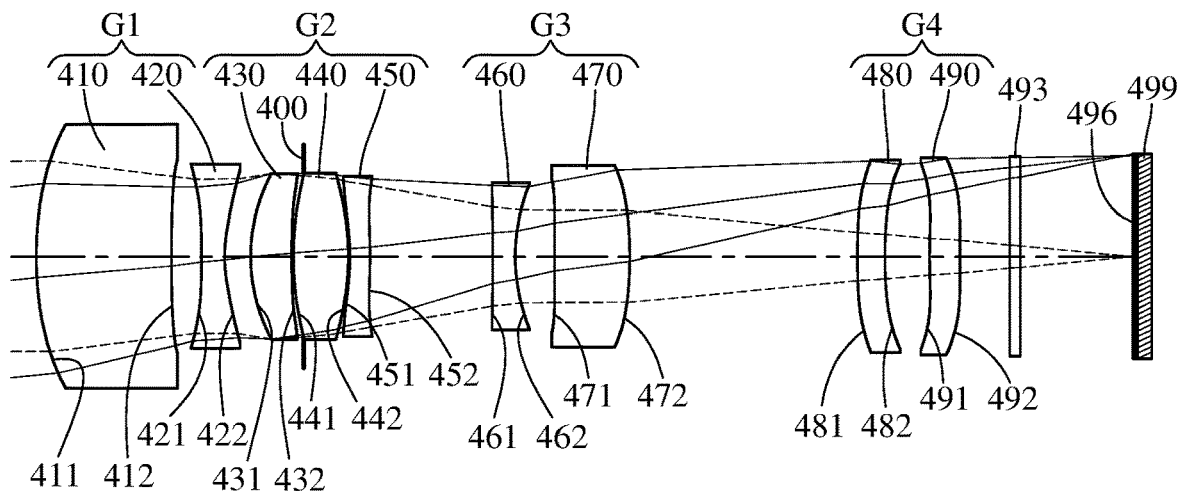
FIG. 42 is a schematic view of the zoom image capturing unit in the sixth zooming state according to the 4th embodiment of the present disclosure.
Figure 43:
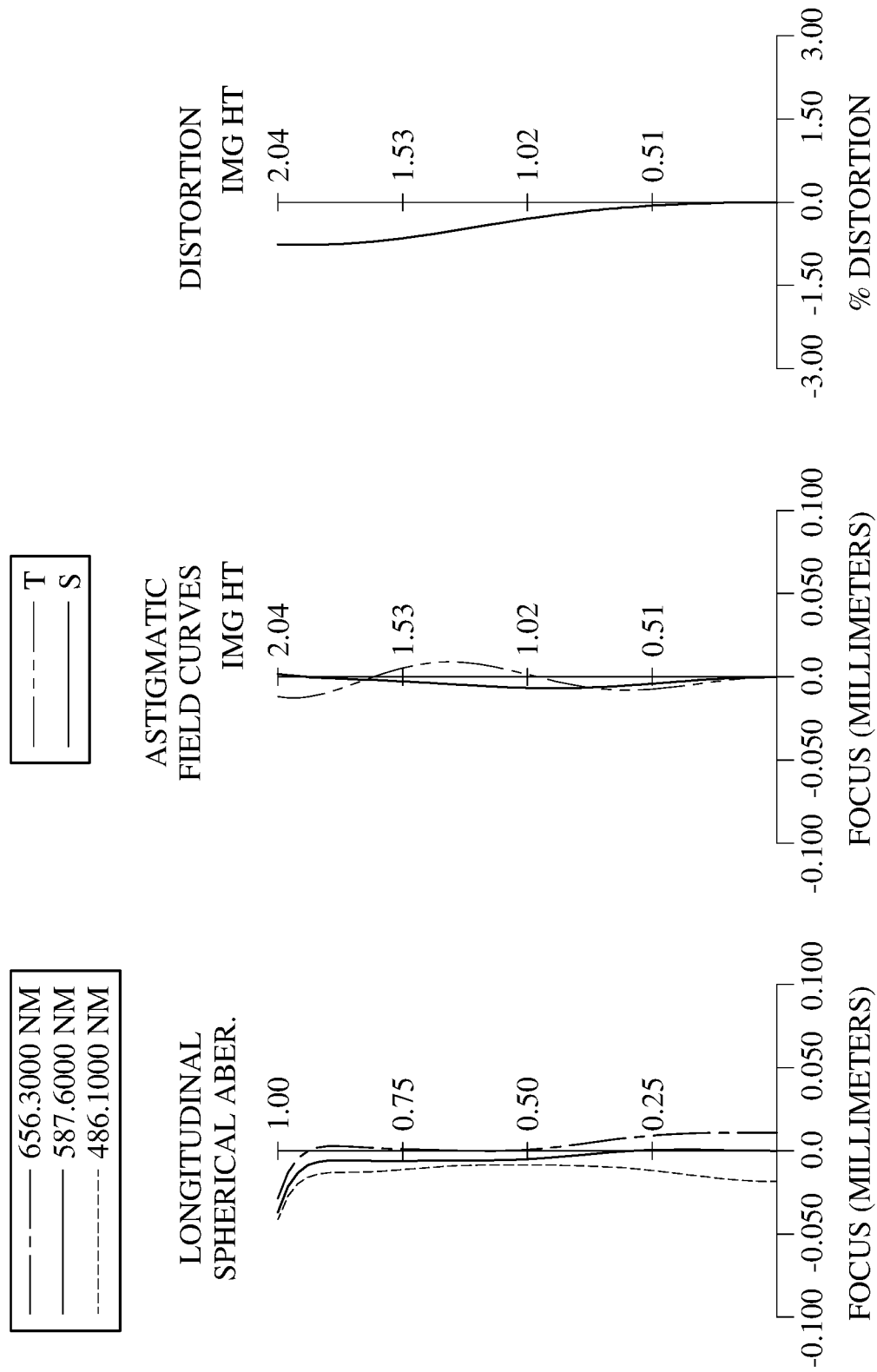
FIG. 43 shows spherical aberration curves, astigmatic field curves and a distortion curve of the zoom image capturing unit in the first zooming state according to the 4th embodiment.
Figure 44:
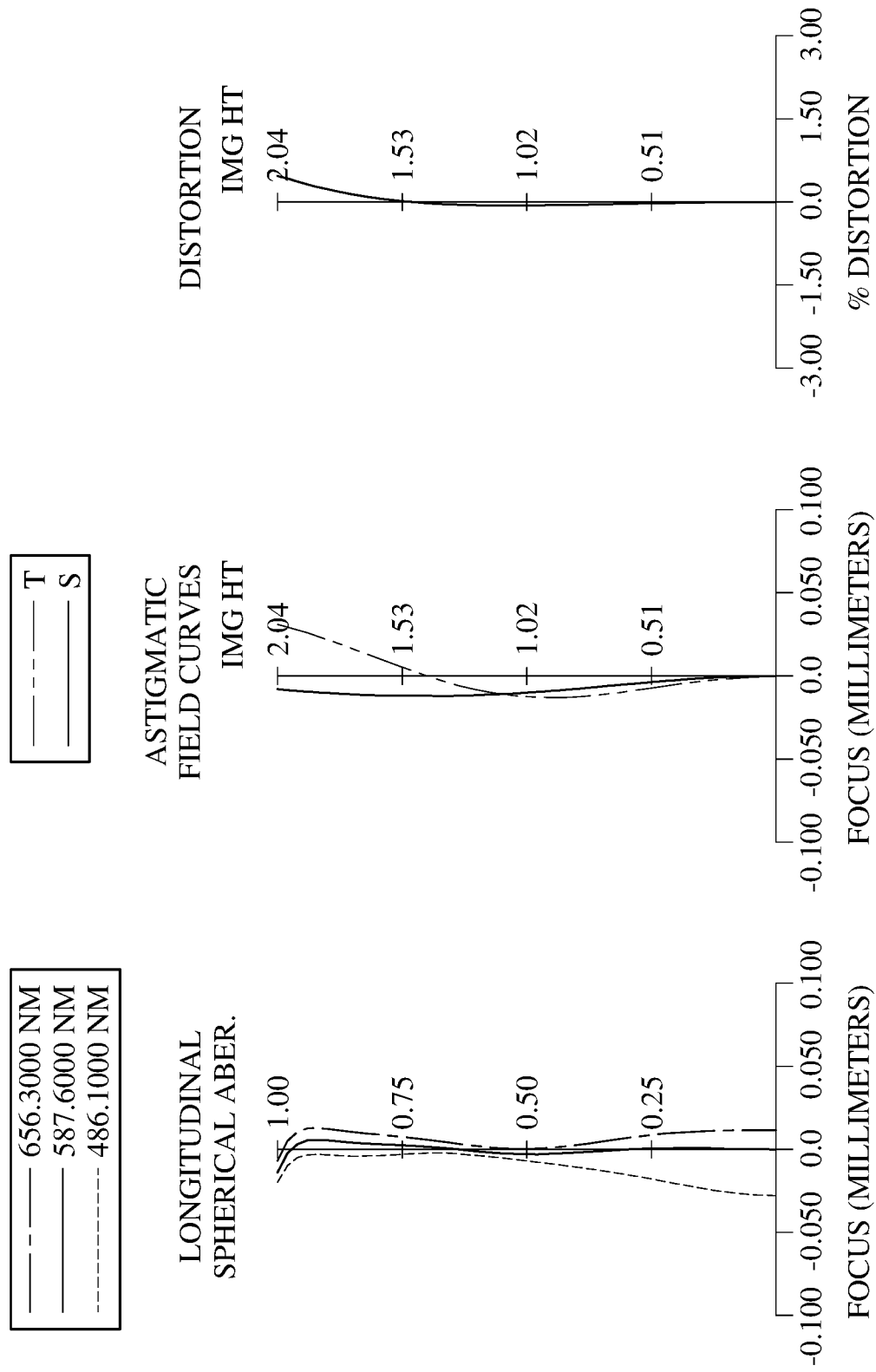
FIG. 44 shows spherical aberration curves, astigmatic field curves and a distortion curve of the zoom image capturing unit in the second zooming state according to the 4th embodiment.
Figure 45:
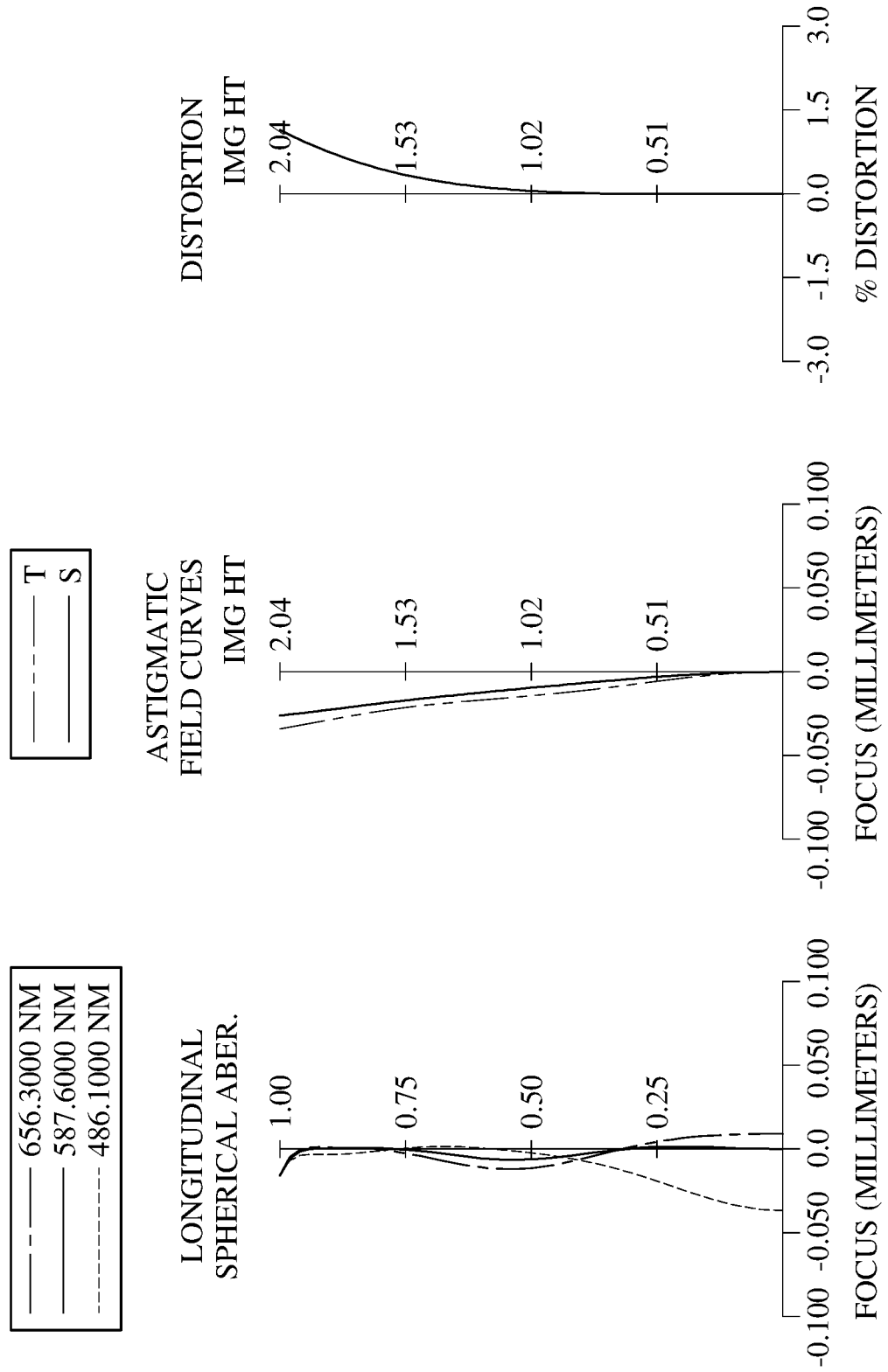
FIG. 45 shows spherical aberration curves, astigmatic field curves and a distortion curve of the zoom image capturing unit in the third zooming state according to the 4th embodiment.
Figure 46:
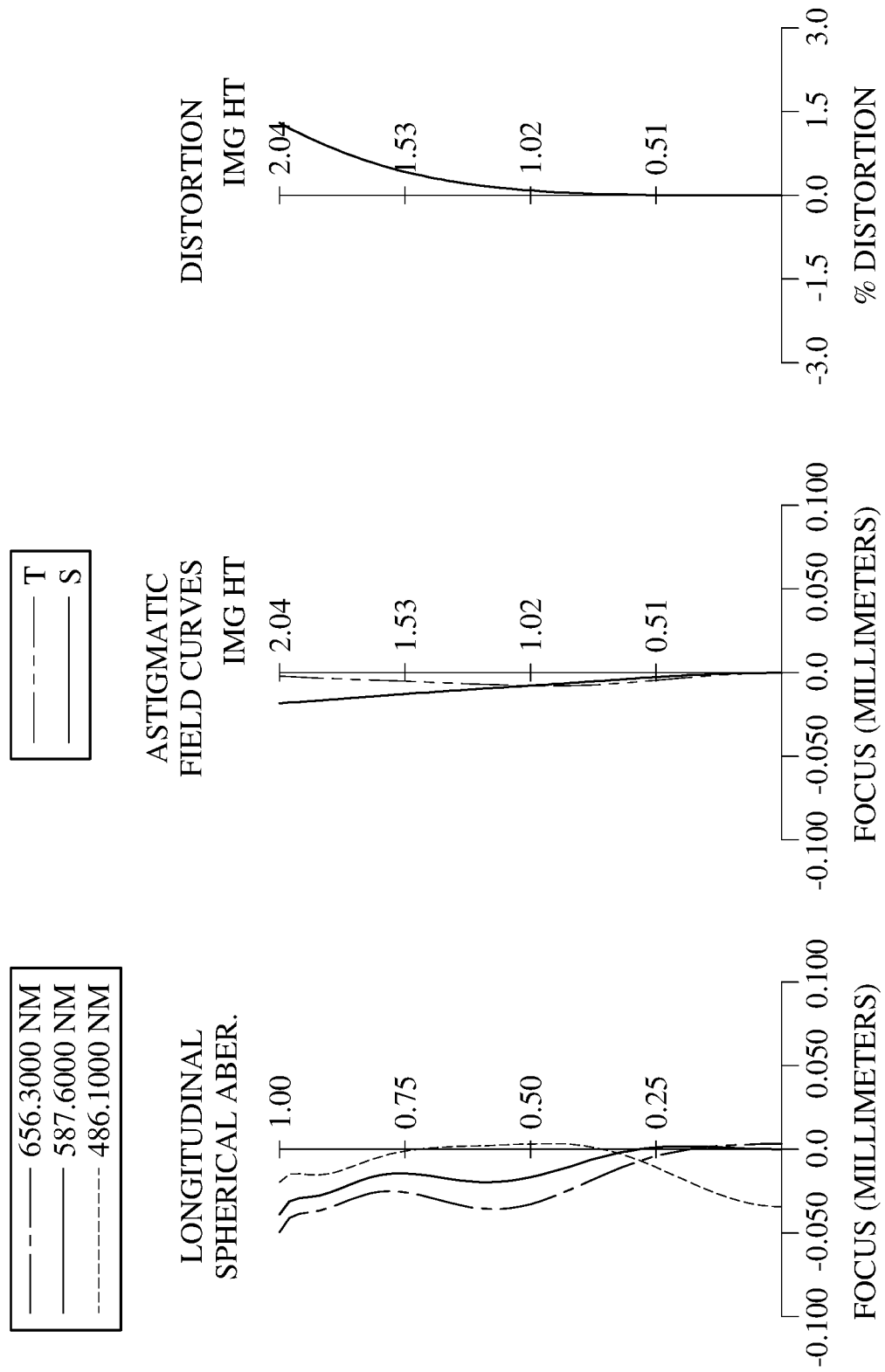
FIG. 46 shows spherical aberration curves, astigmatic field curves and a distortion curve of the zoom image capturing unit in the fourth zooming state according to the 4th embodiment.
Figure 47:
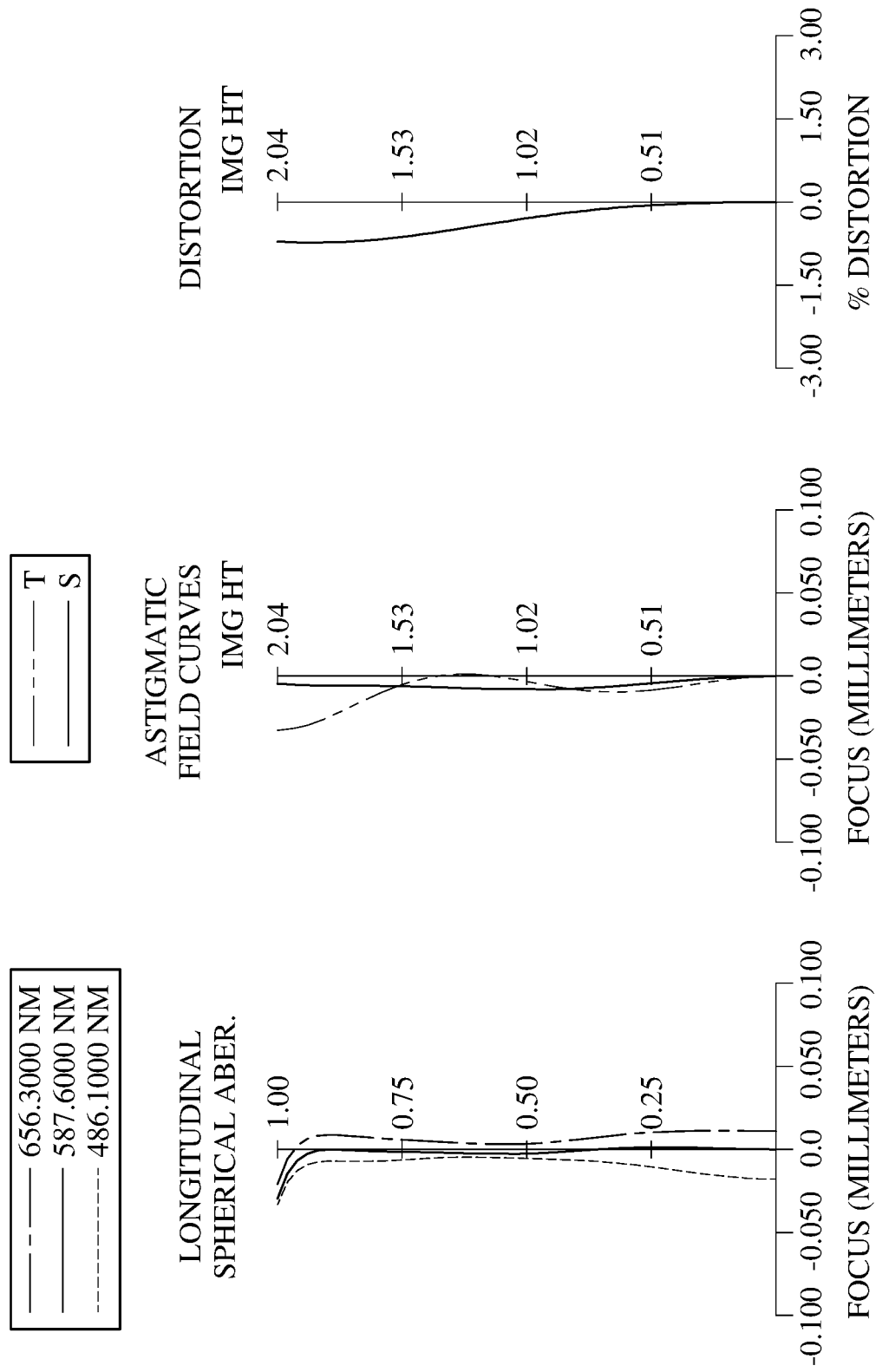
FIG. 47 shows spherical aberration curves, astigmatic field curves and a distortion curve of the zoom image capturing unit in the fifth zooming state according to the 4th embodiment.
Figure 48:
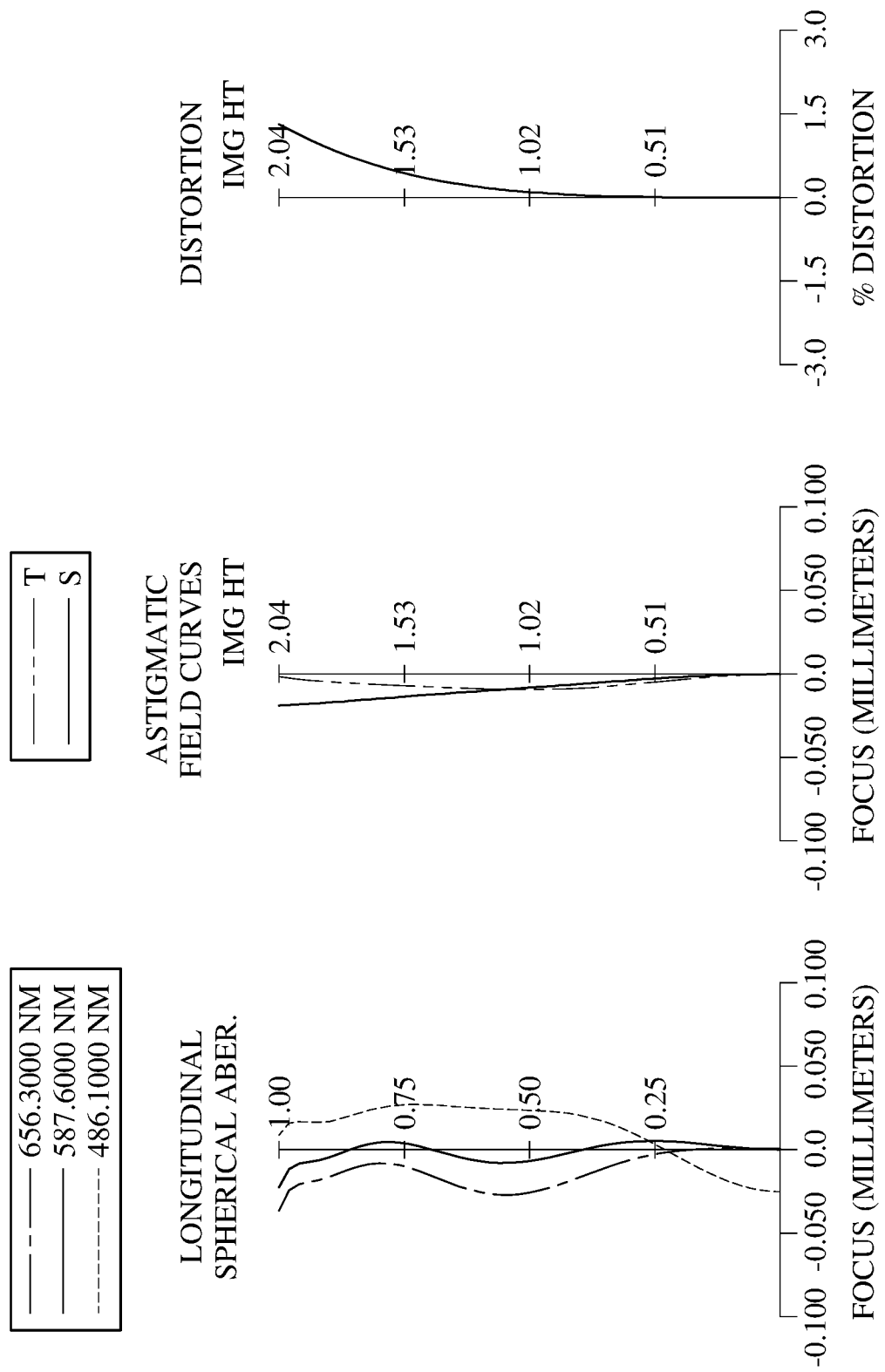
FIG. 48 shows spherical aberration curves, astigmatic field curves and a distortion curve of the zoom image capturing unit in the sixth zooming state according to the 4th embodiment.
Figure 49:
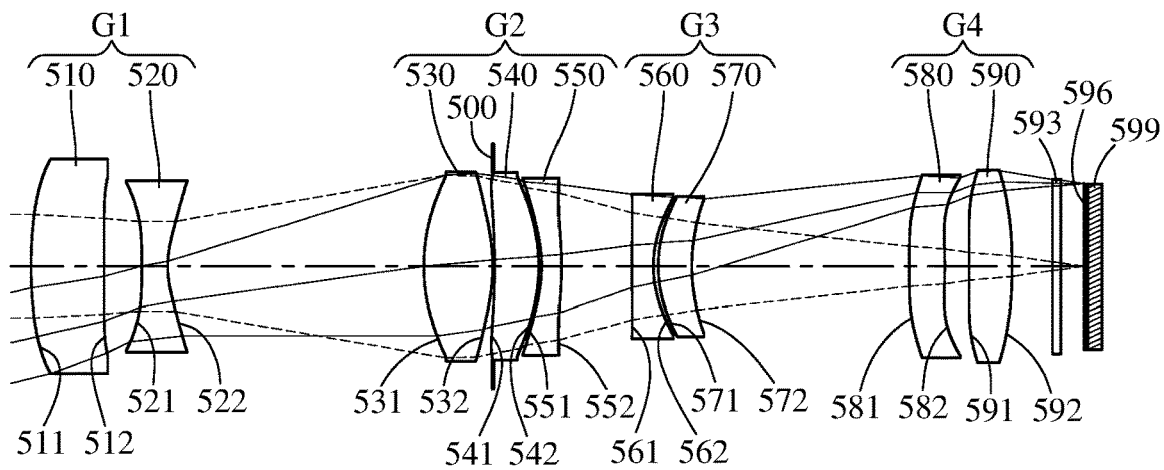
FIG. 49 is a schematic view of a zoom image capturing unit in the first zooming state according to the 5th embodiment of the present disclosure.
Figure 50:
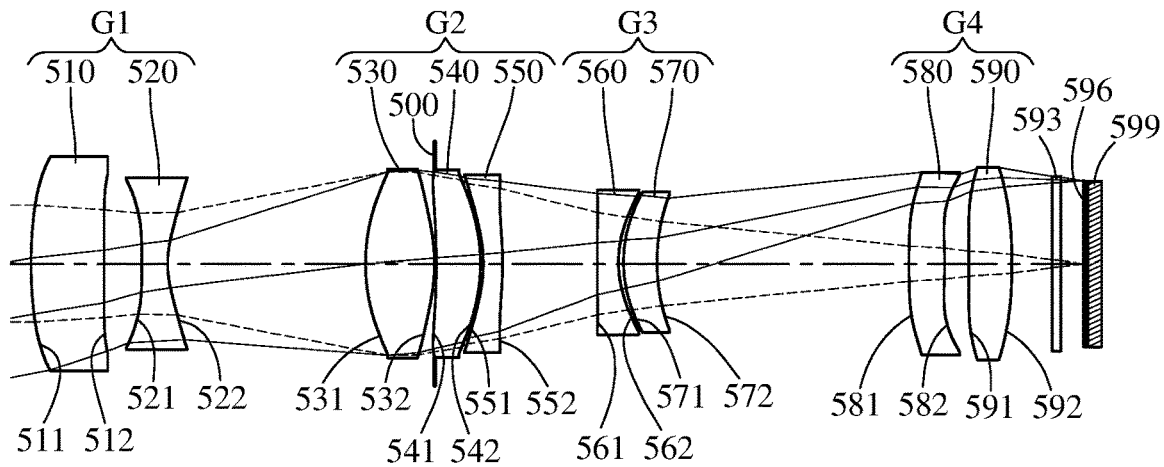
FIG. 50 is a schematic view of the zoom image capturing unit in the second zooming state according to the 5th embodiment of the present disclosure.
Figure 51:
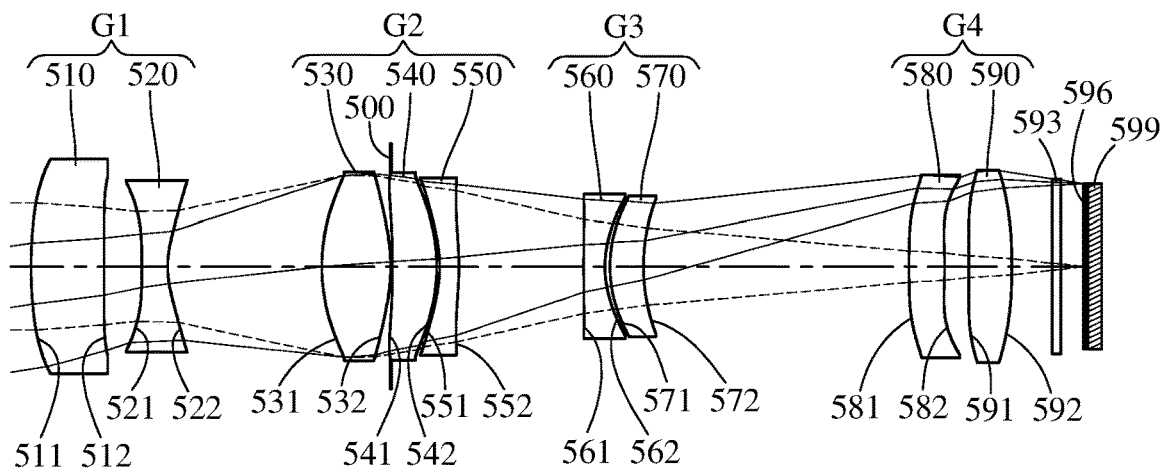
FIG. 51 is a schematic view of the zoom image capturing unit in the third zooming state according to the 5th embodiment of the present disclosure.
Figure 52:
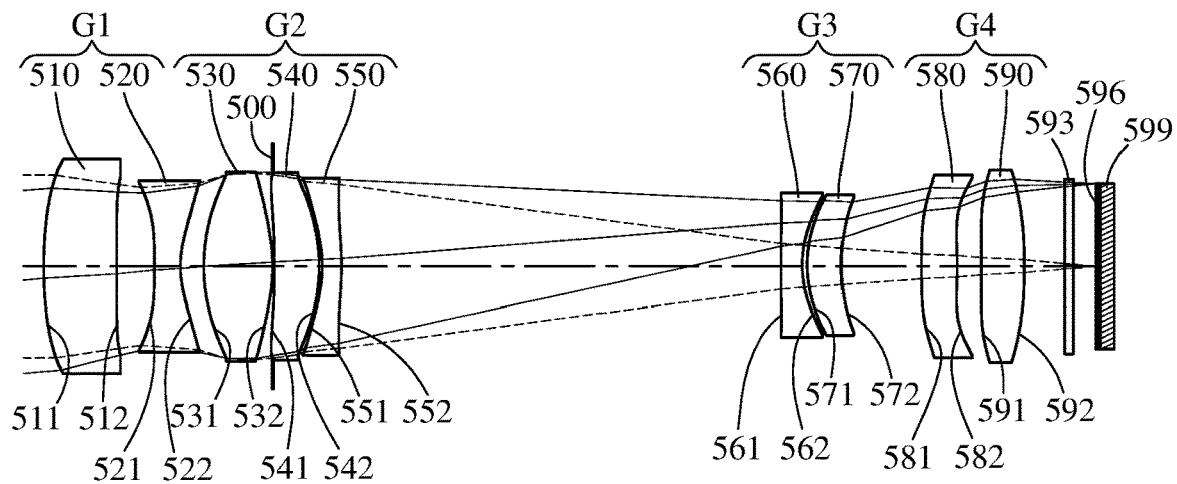
FIG. 52 is a schematic view of the zoom image capturing unit in the fourth zooming state according to the 5th embodiment of the present disclosure.
Figure 53:
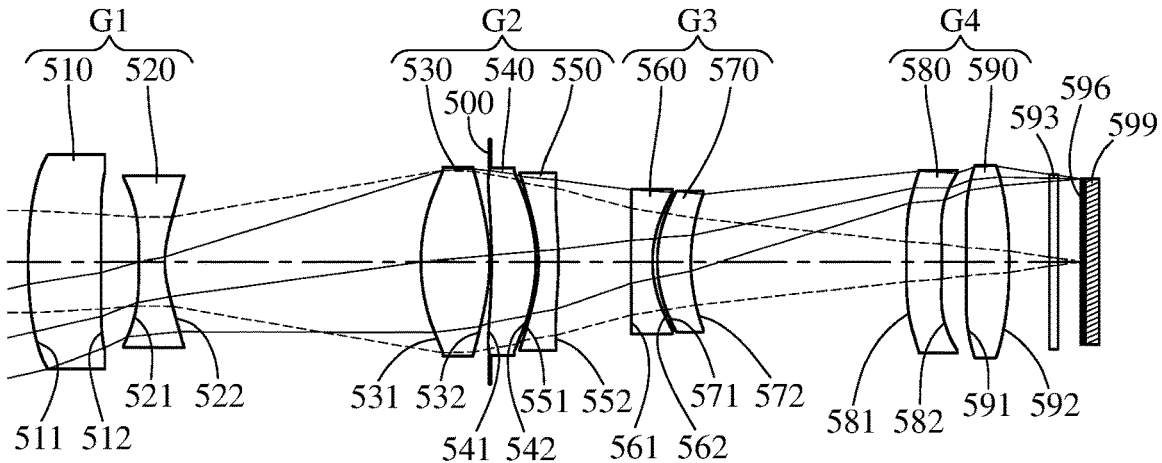
FIG. 53 is a schematic view of the zoom image capturing unit in the fifth zooming state according to the 5th embodiment of the present disclosure.
Figure 54:
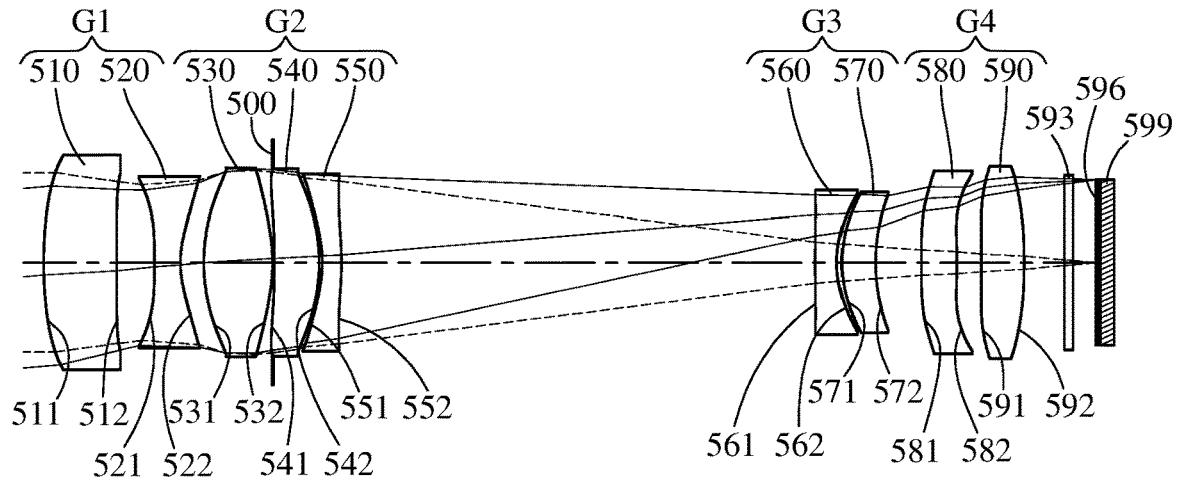
FIG. 54 is a schematic view of the zoom image capturing unit in the sixth zooming state according to the 5th embodiment of the present disclosure.
Figure 55:
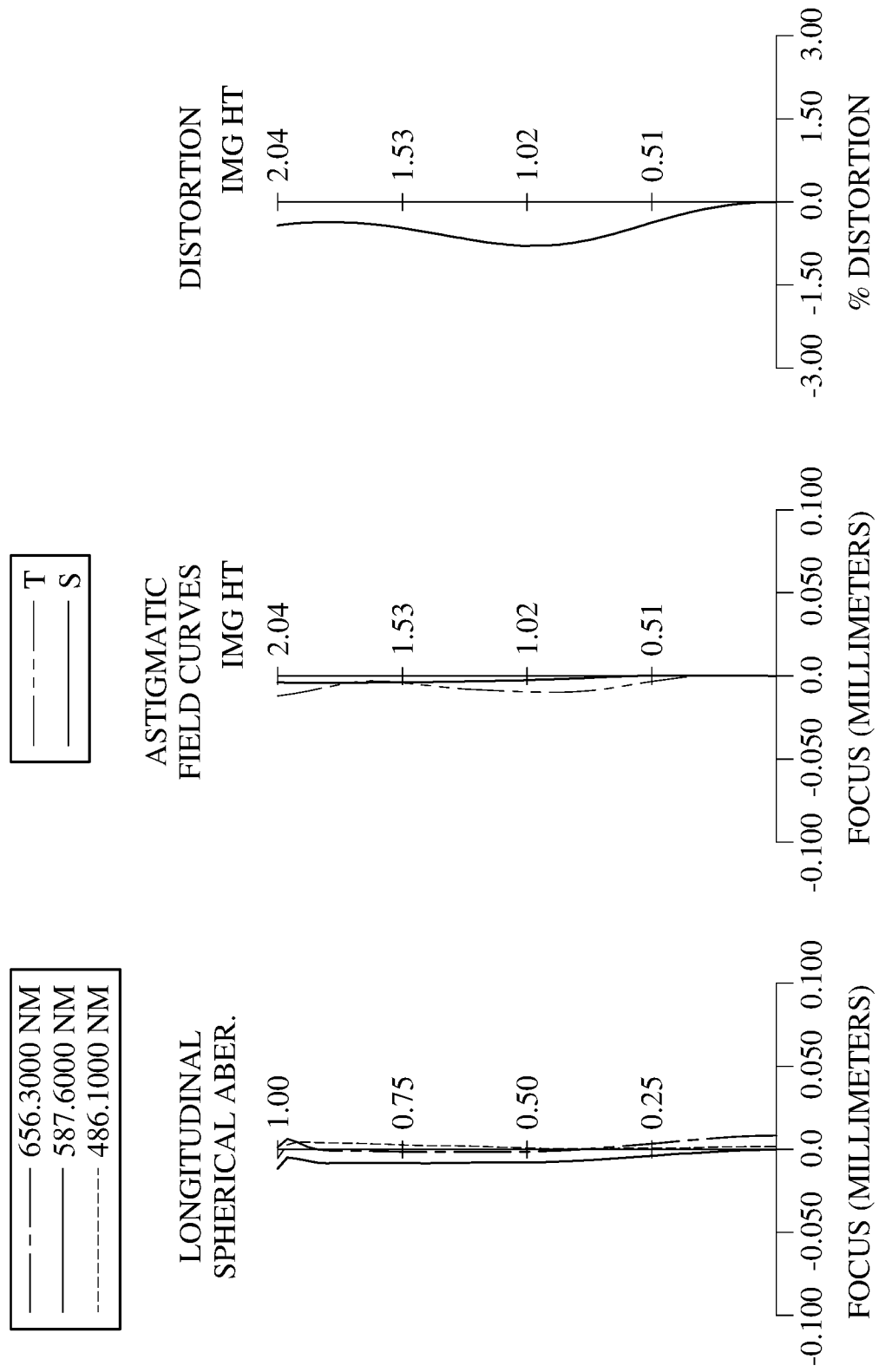
FIG. 55 shows spherical aberration curves, astigmatic field curves and a distortion curve of the zoom image capturing unit in the first zooming state according to the 5th embodiment.
Figure 56:
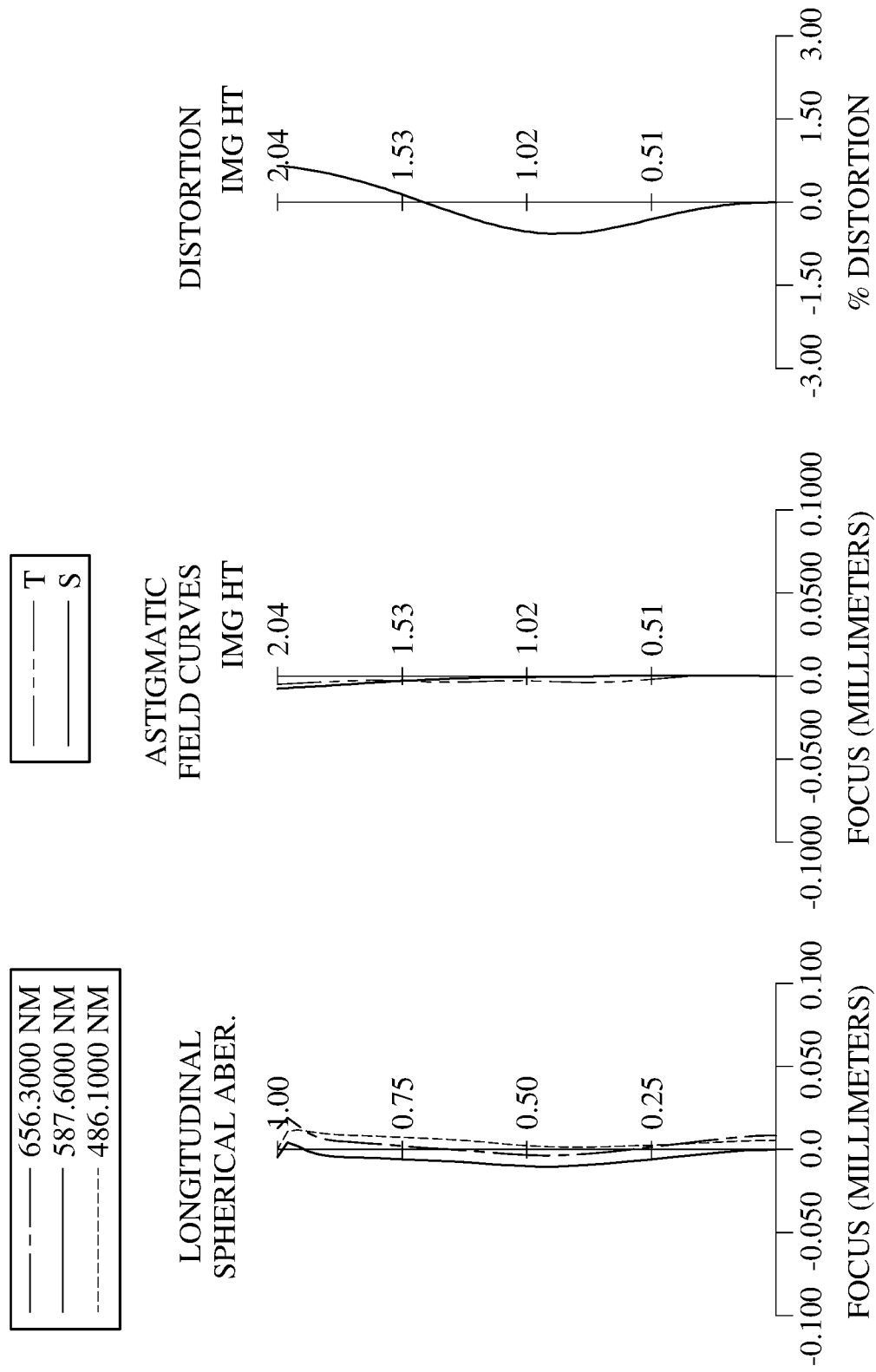
FIG. 56 shows spherical aberration curves, astigmatic field curves and a distortion curve of the zoom image capturing unit in the second zooming state according to the 5th embodiment.
Figure 57:
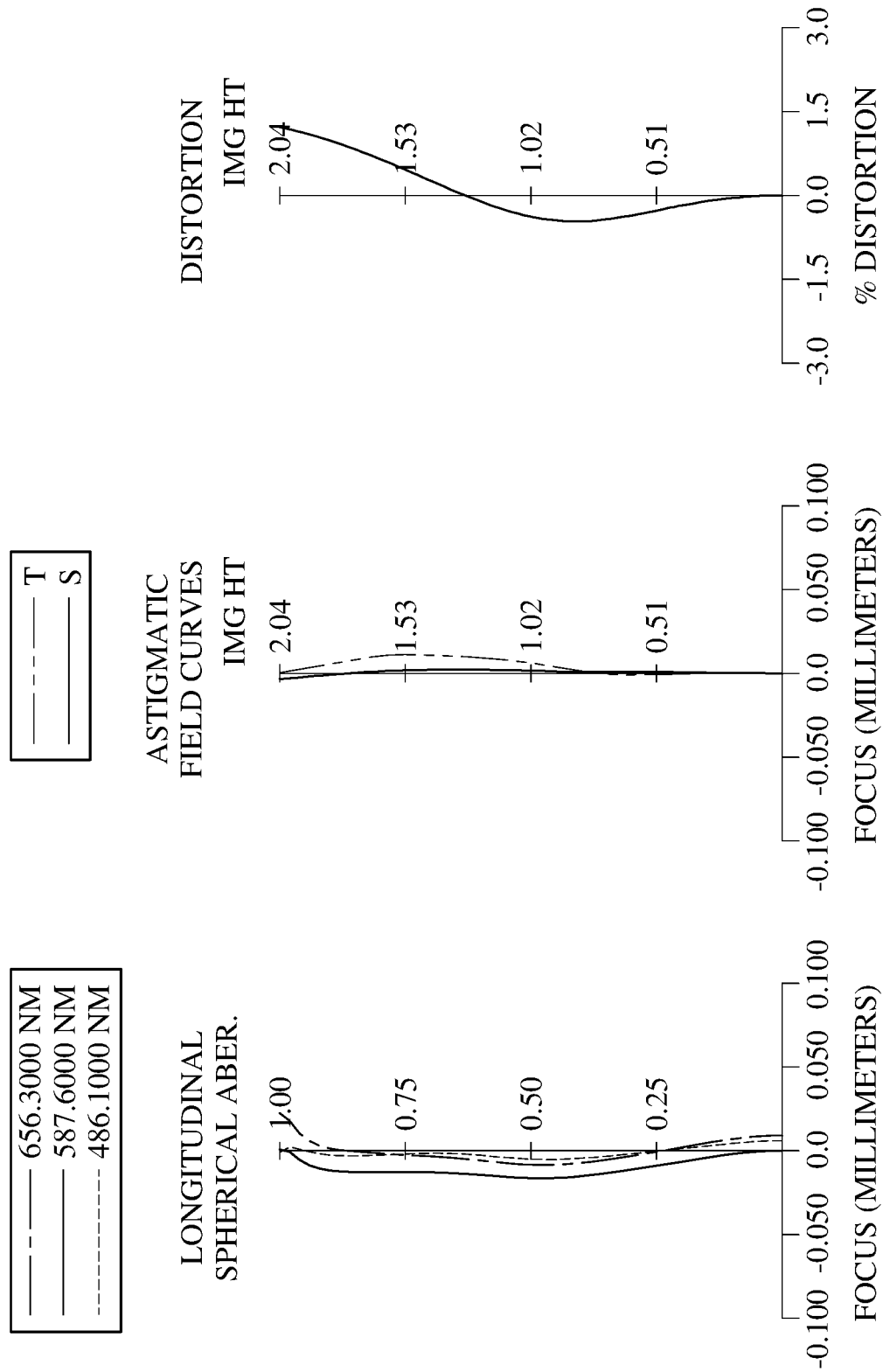
FIG. 57 shows spherical aberration curves, astigmatic field curves and a distortion curve of the zoom image capturing unit in the third zooming state according to the 5th embodiment.
Figure 58:
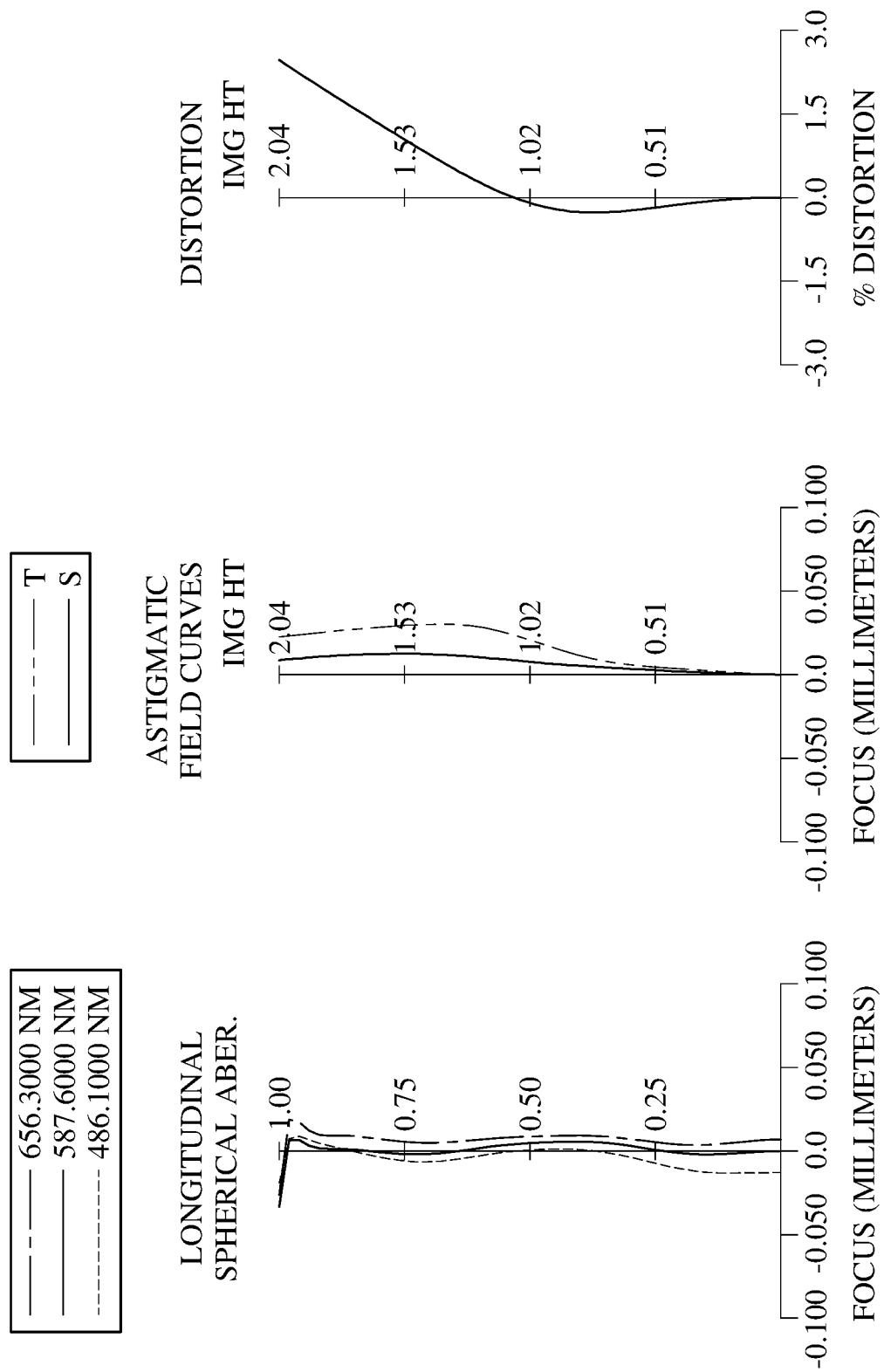
FIG. 58 shows spherical aberration curves, astigmatic field curves and a distortion curve of the zoom image capturing unit in the fourth zooming state according to the 5th embodiment.
Figure 59:
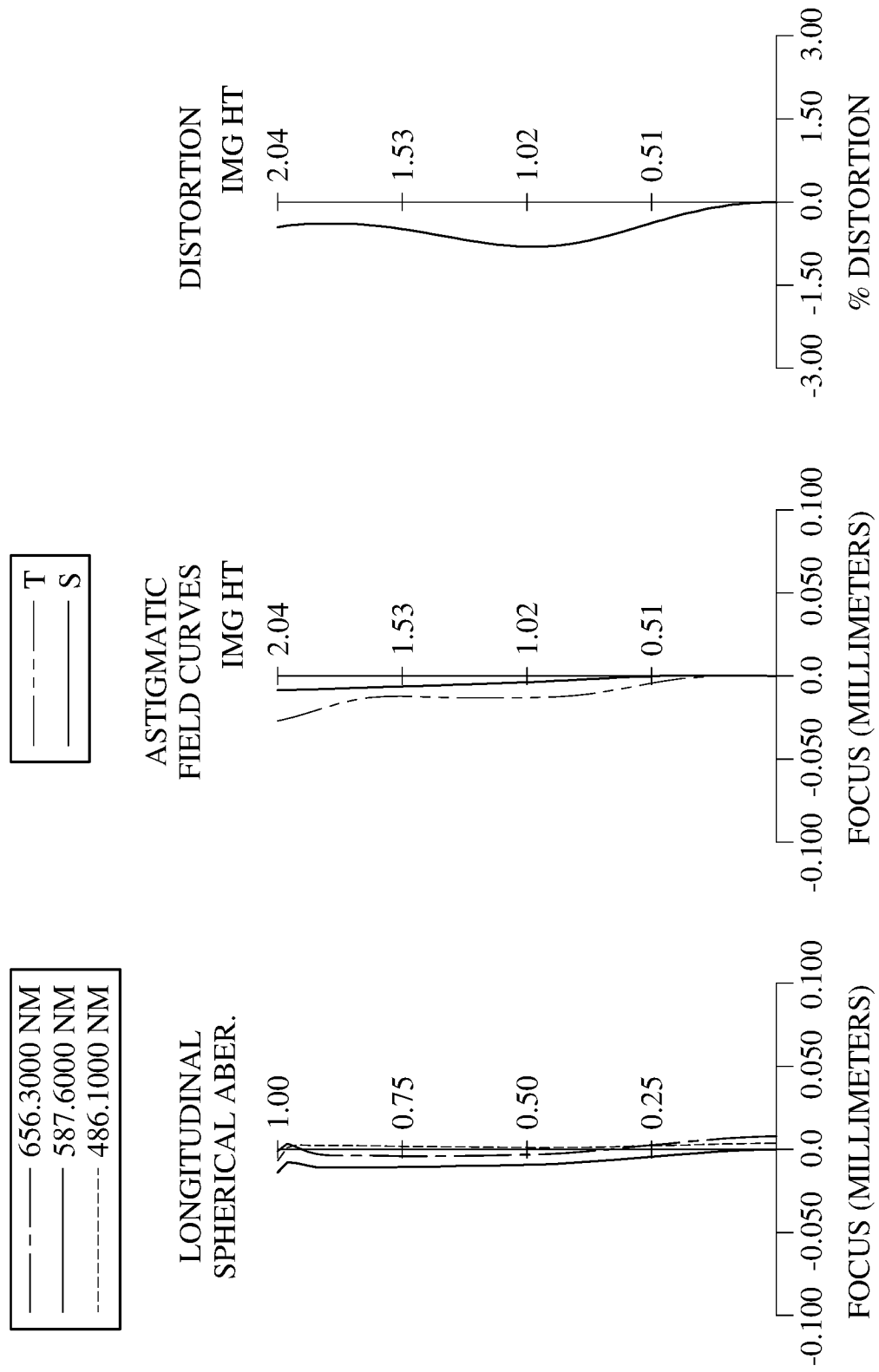
FIG. 59 shows spherical aberration curves, astigmatic field curves and a distortion curve of the zoom image capturing unit in the fifth zooming state according to the 5th embodiment.
Figure 60:
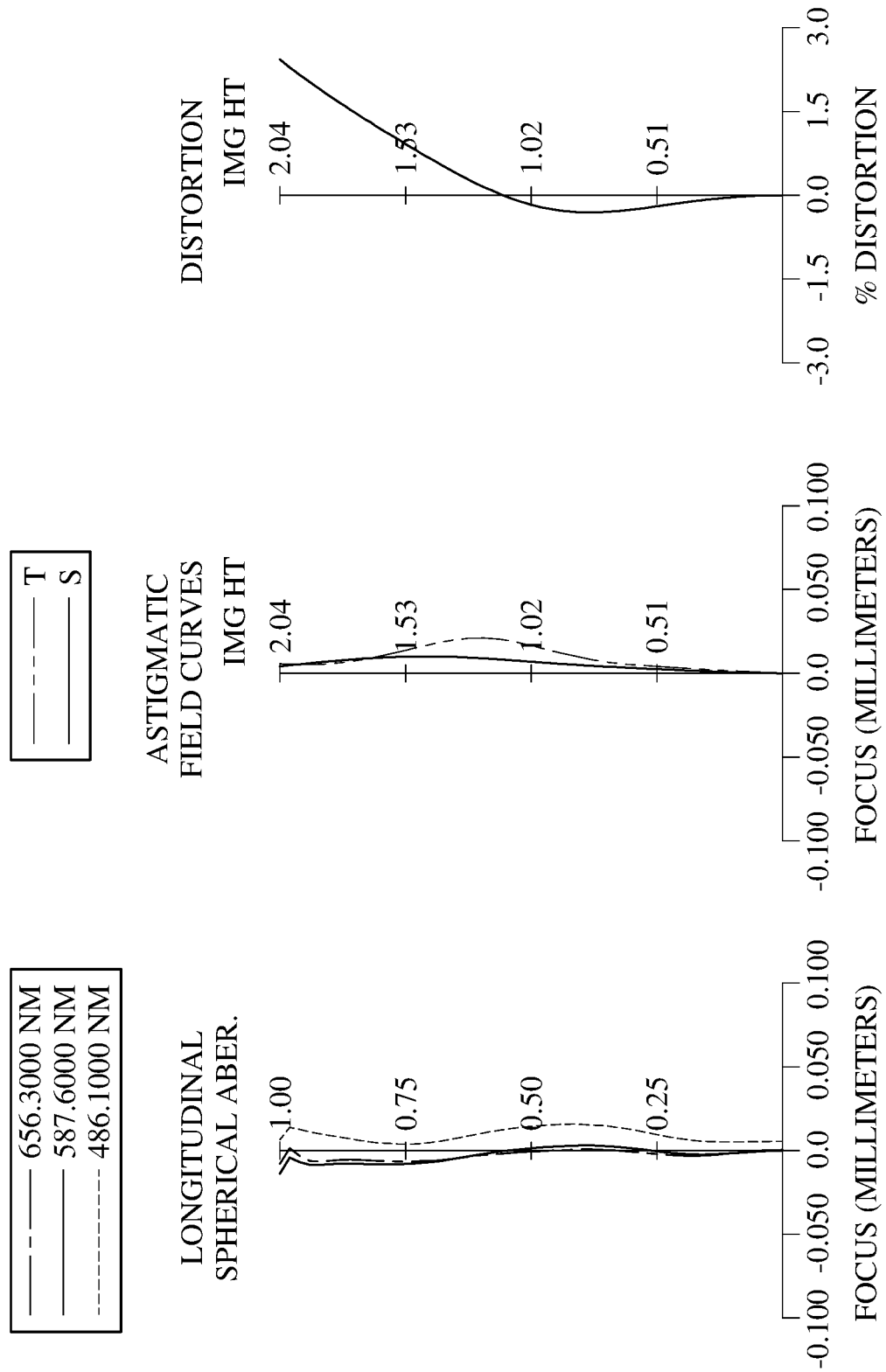
FIG. 60 shows spherical aberration curves, astigmatic field curves and a distortion curve of the zoom image capturing unit in the sixth zooming state according to the 5th embodiment.
Figure 61:
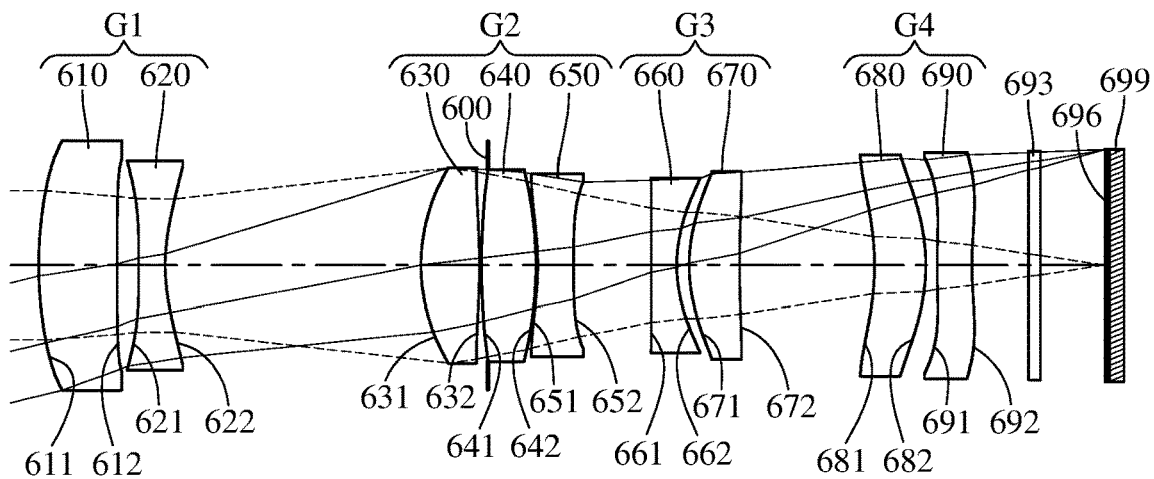
FIG. 61 is a schematic view of a zoom image capturing unit in the first zooming state according to the 6th embodiment of the present disclosure.
Figure 62:
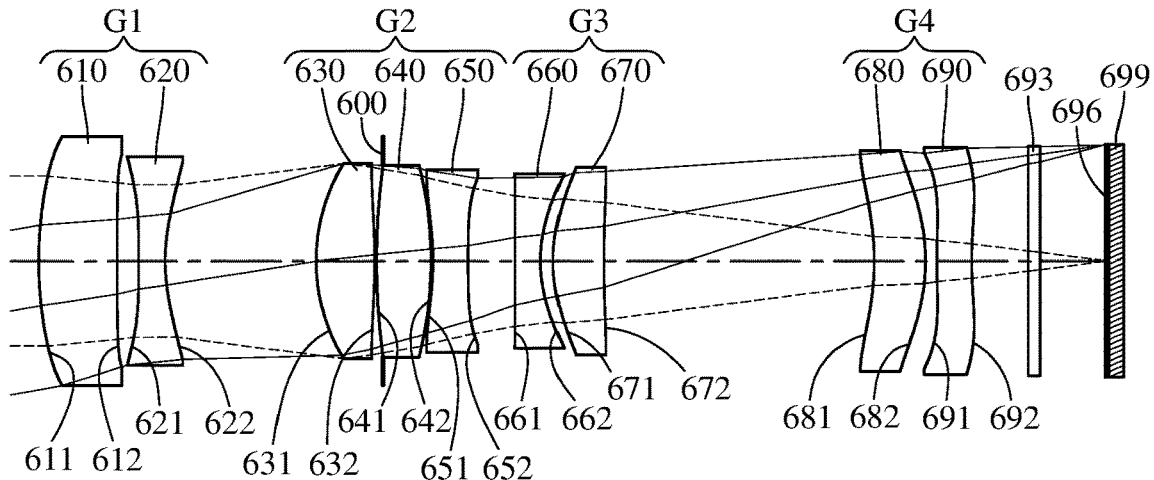
FIG. 62 is a schematic view of the zoom image capturing unit in the second zooming state according to the 6th embodiment of the present disclosure.
Figure 63:
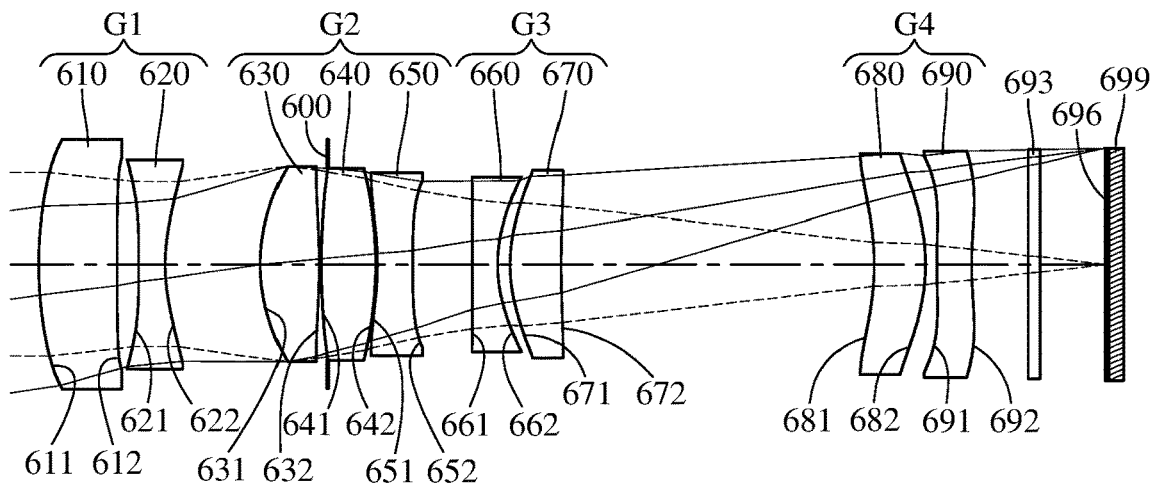
FIG. 63 is a schematic view of the zoom image capturing unit in the third zooming state according to the 6th embodiment of the present disclosure.
Figure 64:
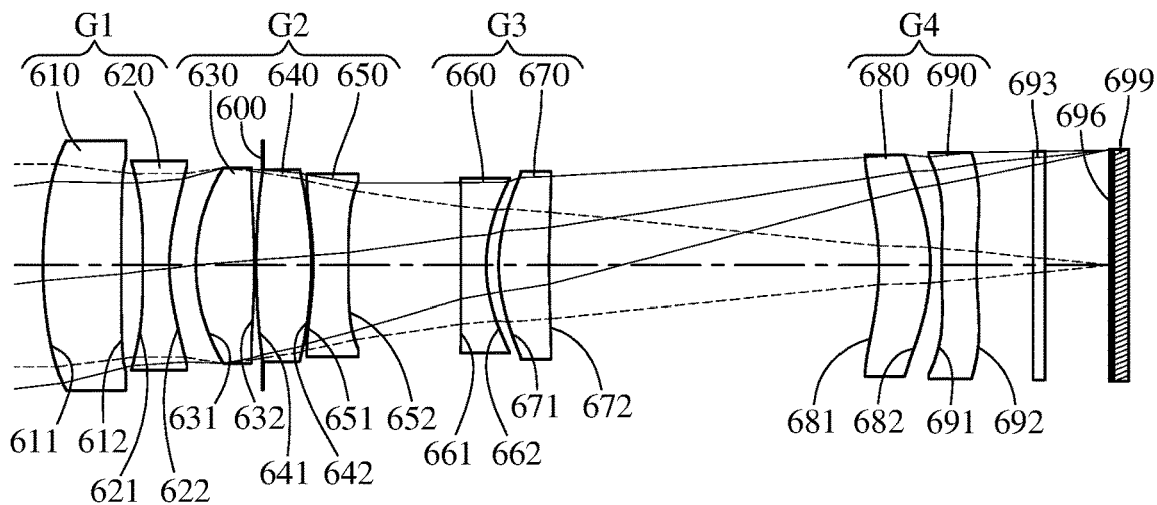
FIG. 64 is a schematic view of the zoom image capturing unit in the fourth zooming state according to the 6th embodiment of the present disclosure.
Figure 65:
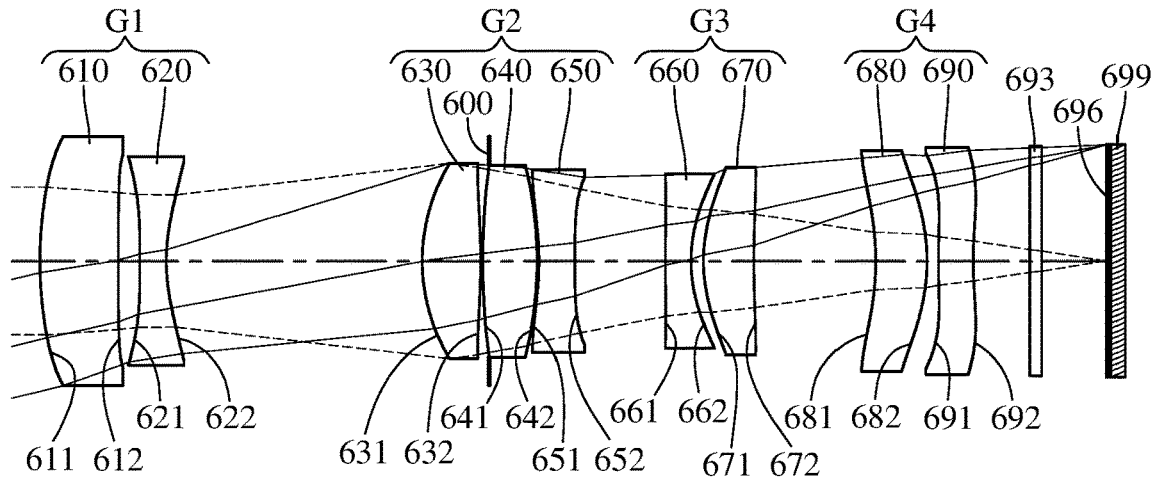
FIG. 65 is a schematic view of the zoom image capturing unit in the fifth zooming state according to the 6th embodiment of the present disclosure.
Figure 66:
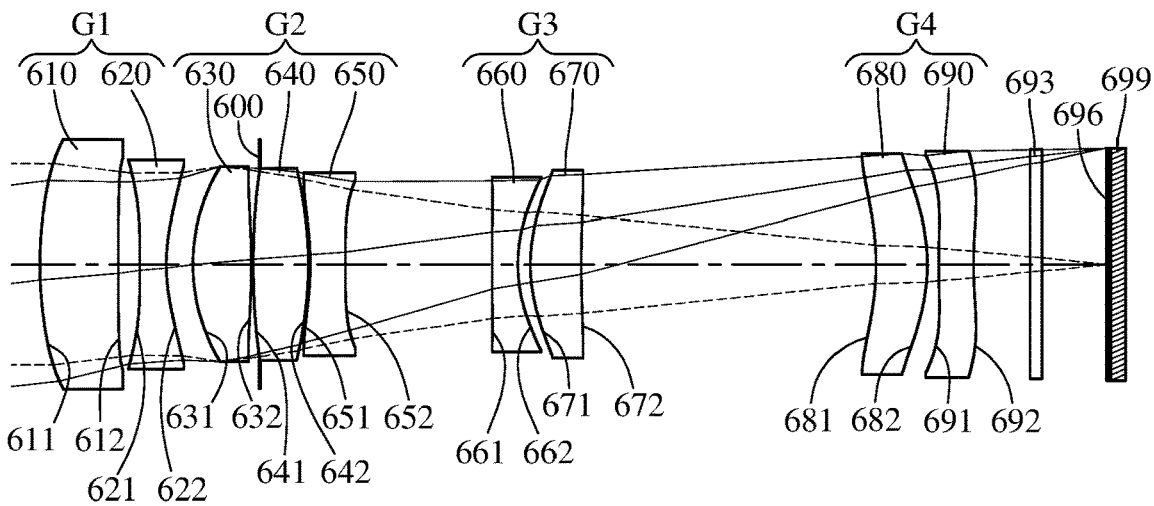
FIG. 66 is a schematic view of the zoom image capturing unit in the sixth zooming state according to the 6th embodiment of the present disclosure.
Figure 67:
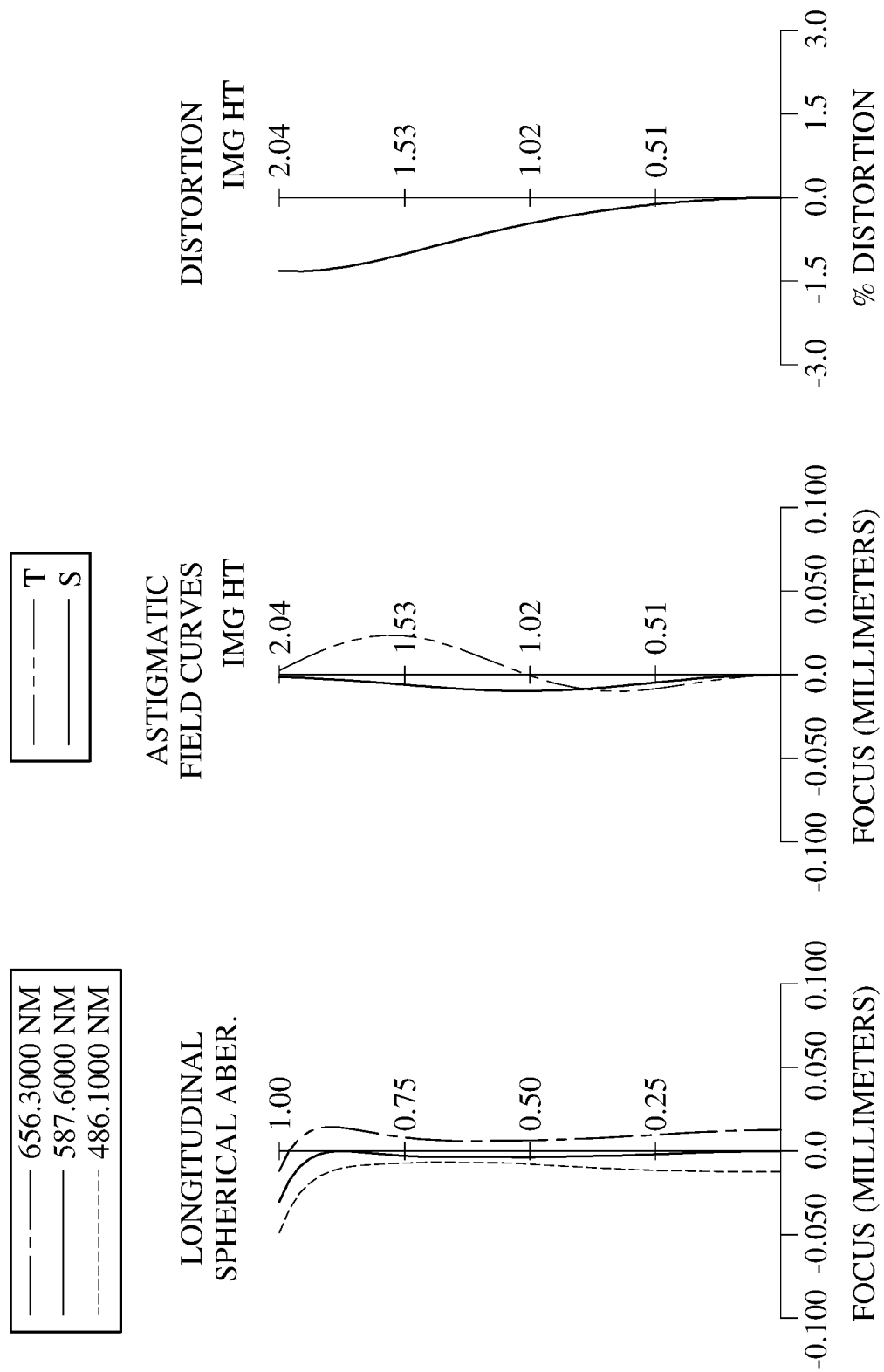
FIG. 67 shows spherical aberration curves, astigmatic field curves and a distortion curve of the zoom image capturing unit in the first zooming state according to the 6th embodiment.
Figure 68:
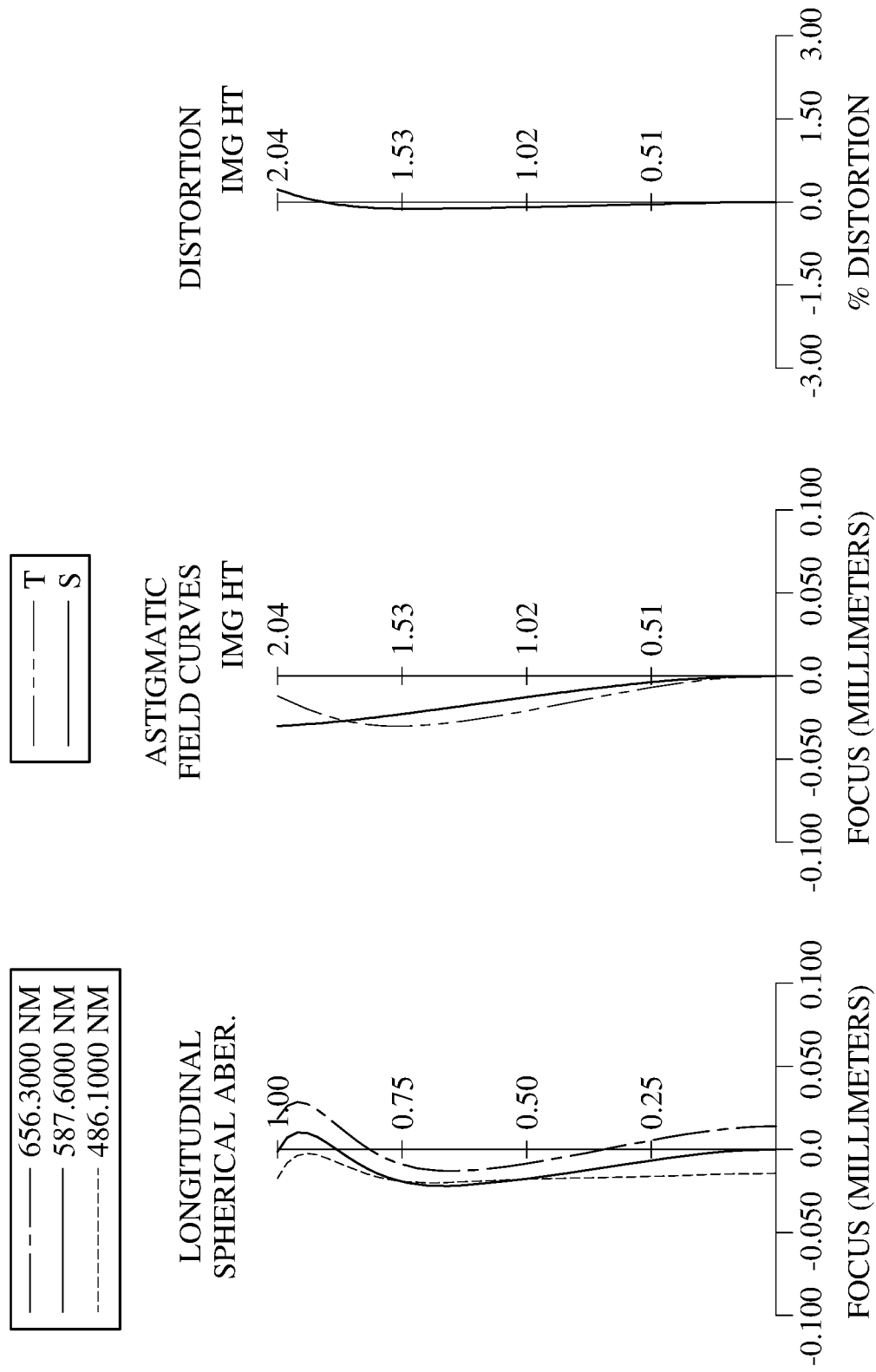
FIG. 68 shows spherical aberration curves, astigmatic field curves and a distortion curve of the zoom image capturing unit in the second zooming state according to the 6th embodiment.
Figure 69:
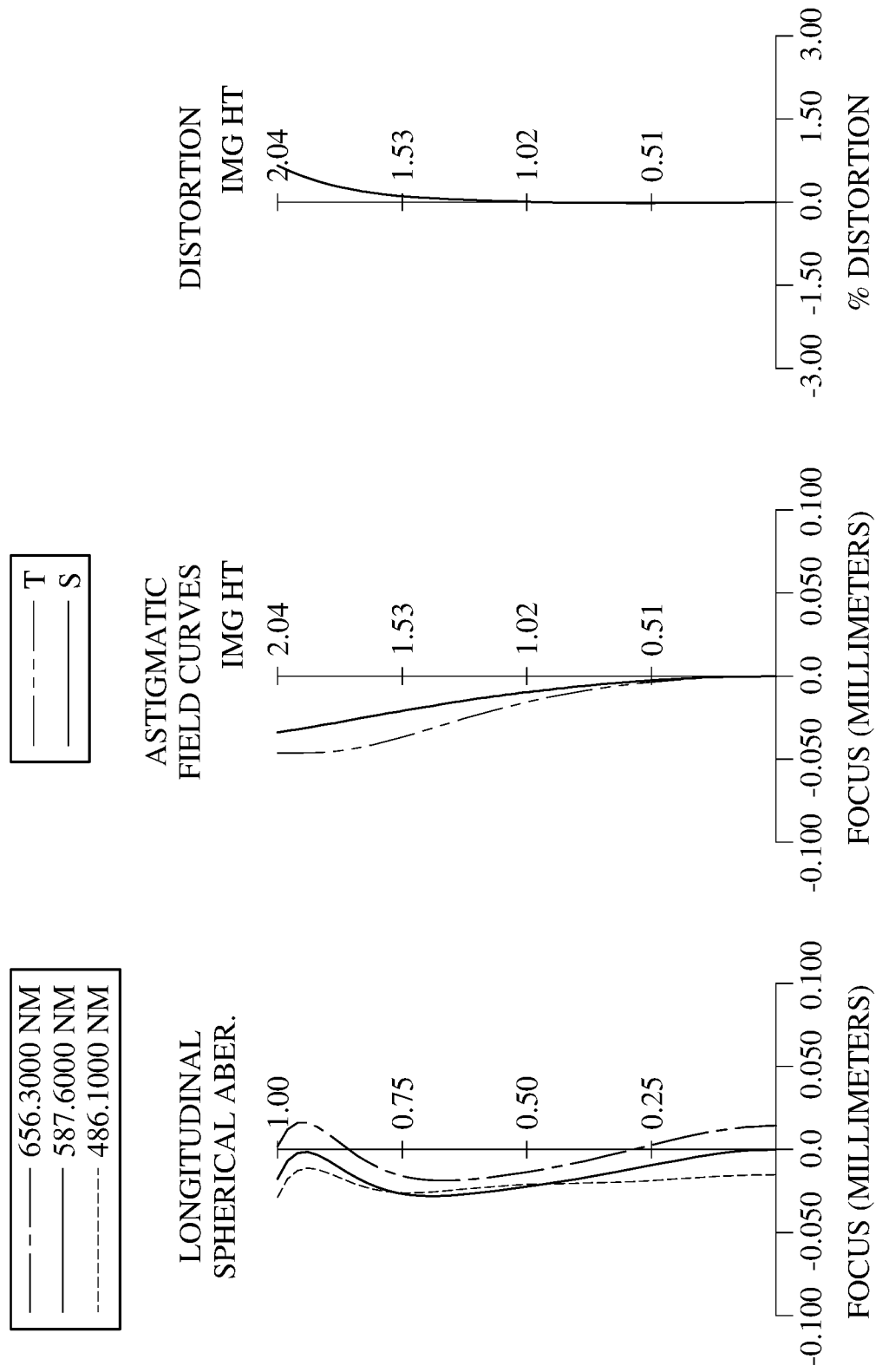
FIG. 69 shows spherical aberration curves, astigmatic field curves and a distortion curve of the zoom image capturing unit in the third zooming state according to the 6th embodiment.
Figure 70:
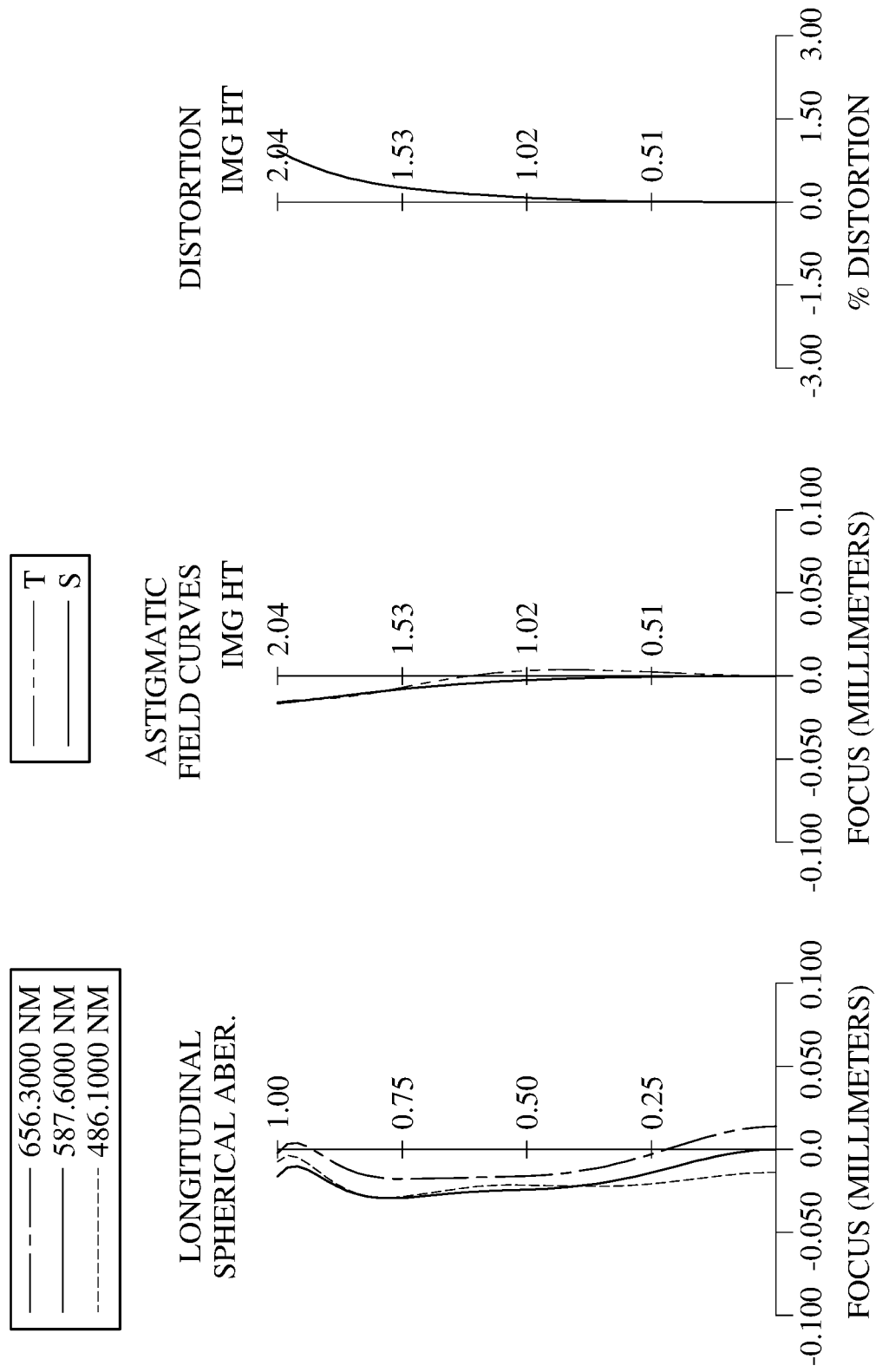
FIG. 70 shows spherical aberration curves, astigmatic field curves and a distortion curve of the zoom image capturing unit in the fourth zooming state according to the 6th embodiment.
Figure 71:
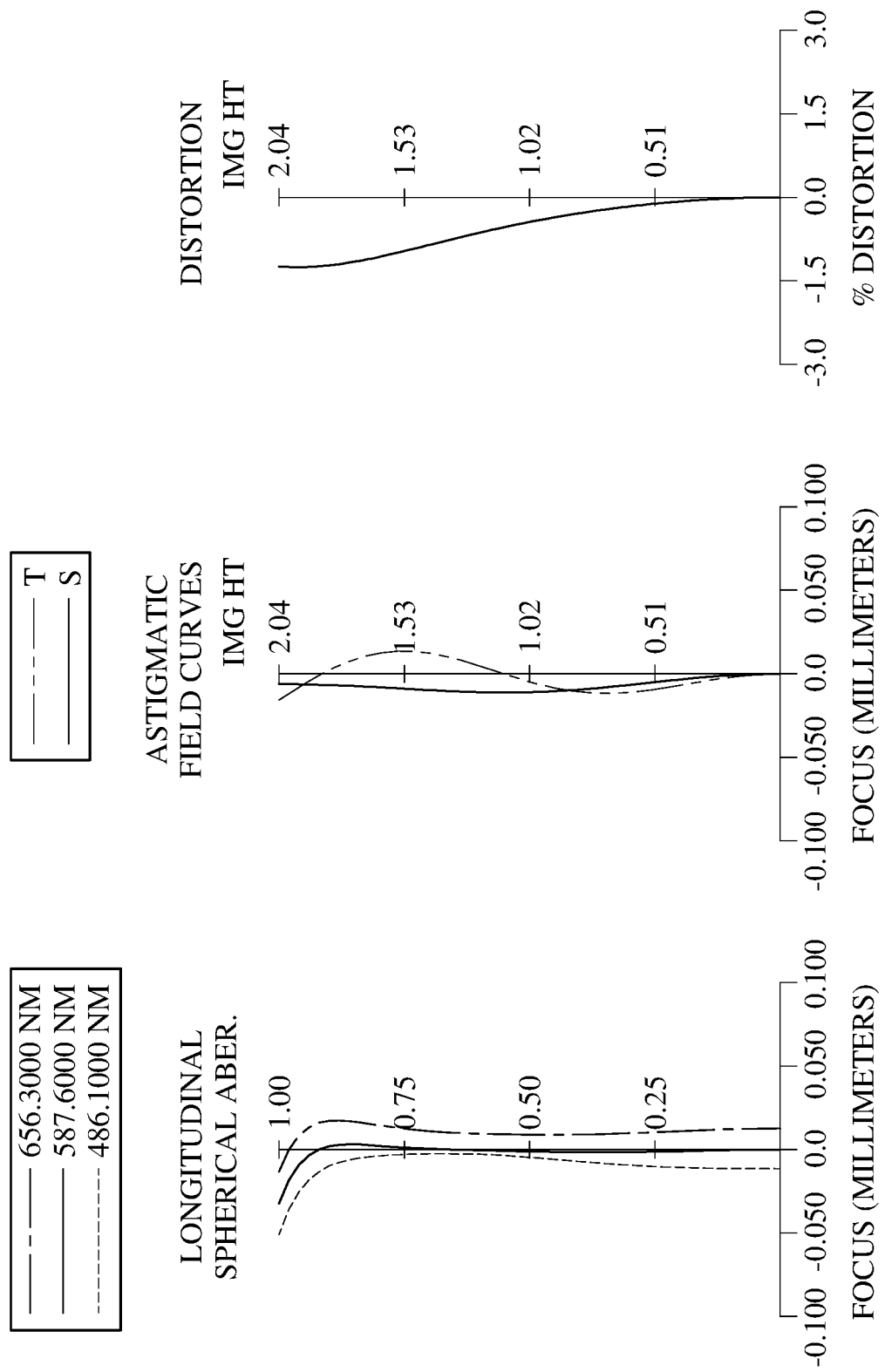
FIG. 71 shows spherical aberration curves, astigmatic field curves and a distortion curve of the zoom image capturing unit in the fifth zooming state according to the 6th embodiment.
Figure 72:
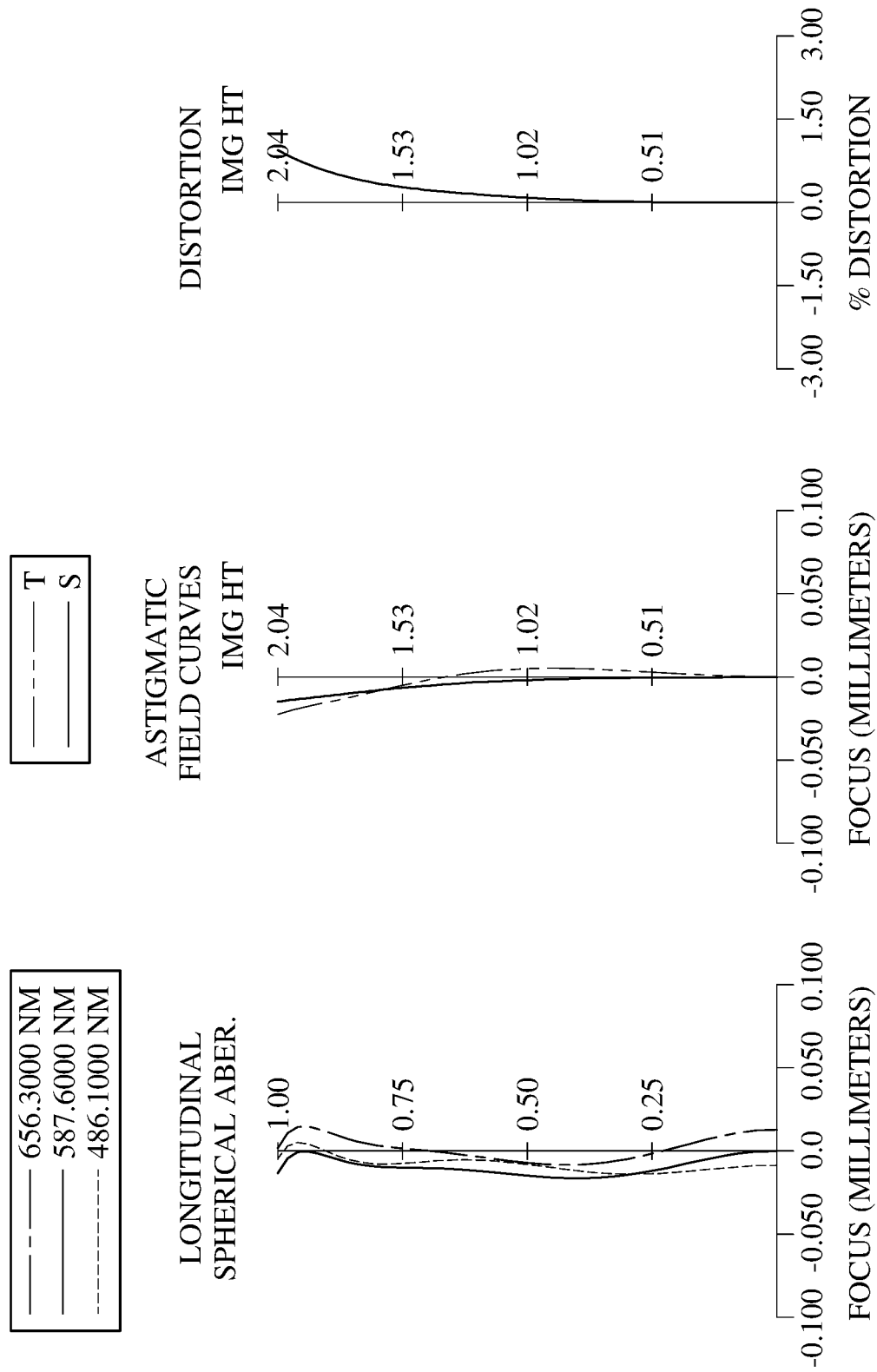
FIG. 72 shows spherical aberration curves, astigmatic field curves and a distortion curve of the zoom image capturing unit in the sixth zooming state according to the 6th embodiment.

An image lens assembly includes four lens groups. The four lens groups are, in order from an object side to an image side along an optical path, a first lens group, a second lens group, a third lens group and a fourth lens group. The four lens groups include nine lens elements. The nine lens elements are, in order from the object side to the image side along the optical path, a first lens element, a second lens element, a third lens element, a fourth lens element, a fifth lens element, a sixth lens element, a seventh lens element, an eighth lens element and a ninth lens element. The first lens group includes the first lens element and the second lens element, the second lens group includes at least one lens element, the third lens group includes at least one lens element, and the fourth lens group includes the eighth lens element and the ninth lens element. Moreover, the first lens group includes the first lens element and the second lens element, the second lens group includes at least two lens elements, the third lens group includes at least two lens elements, and the fourth lens group includes the eighth lens element and the ninth lens element. Specifically, the first lens group includes the first lens element and the second lens element, the second lens group can include the third lens element, the fourth lens element and the fifth lens element, the third lens group can include the sixth lens element and the seventh lens element, and the fourth lens group includes the eighth lens element and the ninth lens element.

According to the present disclosure, when the image lens assembly is focusing or zooming, an axial distance between the first lens group and the fourth lens group remains a constant, an axial distance between the fourth lens group and an image surface remains a constant, while the second lens group and the third lens group move along an optical axis. Therefore, it is favorable for featuring movable lens elements and a small field of view so as to achieve optical zoom with a small field of view, thereby increasing the zoom range and enhancing focus accuracy; it is also favorable for the movable lens elements to compensate for the effect generated by temperature changes. Please refer to FIG. 1 to FIG. 6, which show schematic views of the zoom image capturing unit in the first through the sixth zooming states according to the 1st embodiment of the present disclosure. Among them, the positions of the first lens group G1 and the fourth lens group G4 with respect to the image surface 196 do not change, while the positions of the second lens group G2 and the third lens group G3 change with respect to the image surface 196. In this specification, the "zooming state" refers to a unique position state where the lens elements are distributed through translating motion along the optical axis; the "zoom range" refers to a distance where the lens elements are movable. The movable lens elements can be driven by, for example, a screw, or a voice coil motor (VCM) of spring type or ball type, but the present disclosure is not limited thereto.

The first lens element has positive refractive power. Therefore, it is favorable for providing significant light convergence so as to effectively reduce the size of the image lens assembly for the requirement of miniaturization.

The second lens element has negative refractive power. Therefore, it is favorable for correcting aberrations generated by the first lens element so as to correct spherical aberration and chromatic aberration.

According to the present disclosure, there can be two lens elements with positive refractive power and one lens element with negative refractive power in the second lens group; and there can be one lens element with positive refractive power and one lens element with negative refractive power in the third lens group. Therefore, it is favorable for reducing size, correcting aberrations such as spherical aberration generated during size reduction, and adjusting the back focal length to a proper range.

Figure 79:
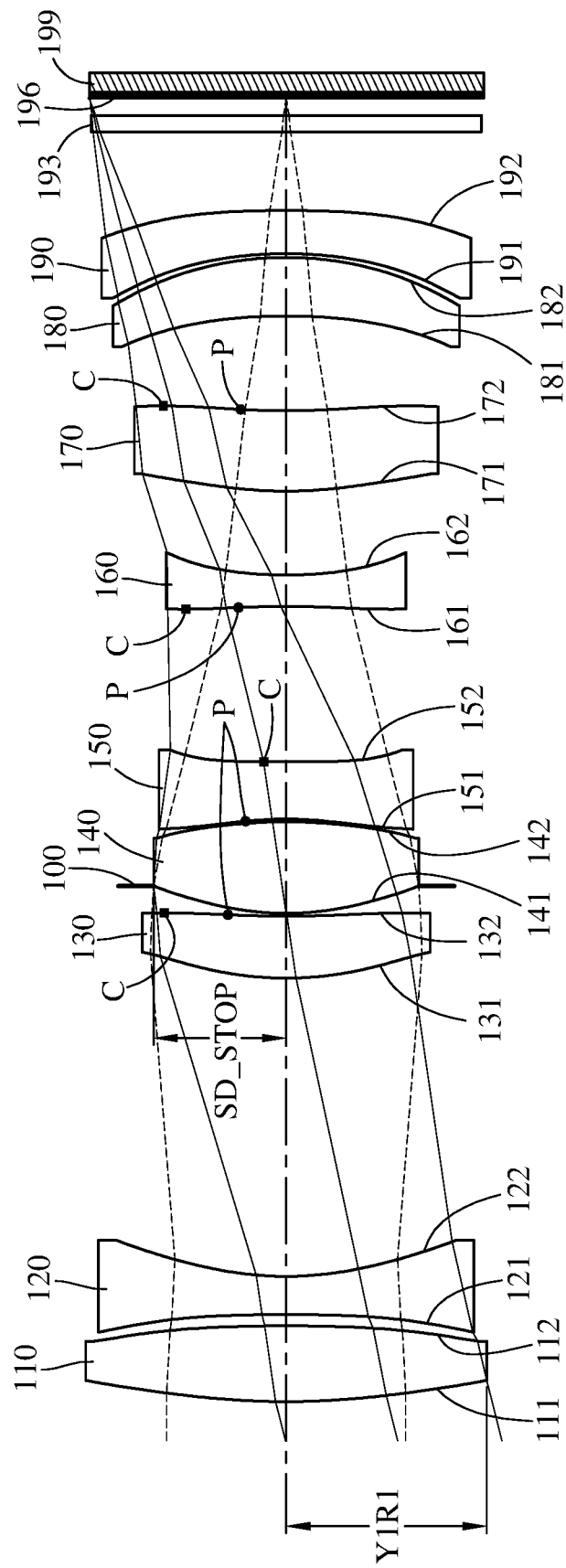
FIG. 79 shows a schematic view of Y1R1, SD_Stop, several inflection points and critical points of the lens elements of the zoom image capturing unit in the first zooming state according to the 1st embodiment of the present disclosure.

According to the present disclosure, at least one of an object-side surface and an image-side surface of at least one lens element of the image lens assembly has at least one inflection point in an off-axis region thereof. Therefore, it is favorable for correcting field curvature so as to meet the requirement of miniaturization. Please refer to FIG. 79, which shows a schematic view of several inflection points P of the lens elements of the zoom image capturing unit in the first zooming state according to the 1st embodiment of the present disclosure. The inflection points on the image-side surface of the third lens element, the object-side surface of the fifth lens element, the object-side surface of the sixth lens element and the image-side surface of the seventh lens element in FIG. 79 are only exemplary. The other lens elements may also have one or more inflection points.

According to the present disclosure, at least one of an object-side surface and an image-side surface of at least one lens element of the image lens assembly can have at least one critical point in an off-axis region thereof. Therefore, it is favorable for improving peripheral image quality. Please refer to FIG. 79, which shows a schematic view of several critical points C of the lens elements of the zoom image capturing unit in the first zooming state according to the 1st embodiment of the present disclosure. The critical points on the image-side surface of the third lens element, the image-side surface of the fifth lens element, the object-side surface of the sixth lens element and the image-side surface of the seventh lens element in FIG. 79 are only exemplary. The other lens elements may also have one or more critical points.

According to the present disclosure, at least five lens elements of the image lens assembly are made of plastic material. Therefore, it is favorable for effectively reducing manufacturing costs and increasing shape design flexibility of lens elements so as to correct off-axis aberrations.

According to the present disclosure, at least one lens element of the image lens assembly can be made of glass material and can have both an object-side surface and an image-side surface being spherical. Therefore, it is favorable for reducing an influence caused by temperature changes, thereby ensuring good image quality in various usage environments.

When a maximum value among maximum fields of view of the image lens assembly within a zoom range is FOV_max, and a minimum value among maximum fields of view of the image lens assembly within the zoom range is FOV_min, the following condition is satisfied: 1.25<FOV_max/FOV_min<6.0. Therefore, it is favorable for featuring a zoom function. Moreover, the following condition can also be satisfied: 1.25<FOV_max/FOV_min<5.0. Moreover, the following condition can also be satisfied: 1.5<FOV_max/FOV_min<5.0. Moreover, the following condition can also be satisfied: 1.5<FOV_max/FOV_min<4.0.

When the maximum value among maximum fields of view of the image lens assembly within the zoom range is FOV_max, the following condition can be satisfied: FOV_max<50 [deg.]. Therefore, it is favorable for controlling the field of view and image quality in various zoom states.

When an axial distance between an image-side surface of the ninth lens element and the image surface is BL, and a maximum image height of the image lens assembly (half of a diagonal length of an effective photosensitive area of an image sensor) is ImgH, the following condition can be satisfied: BL/ImgH<2.0. Therefore, it is favorable for preventing overly high sensitivity or poor space utilization due to an overlay long back focal length.

When a focal length of the first lens element is f1, and a focal length of the second lens element is f2, the following condition can be satisfied: 1.5<f1/|f2|. Therefore, it is favorable for preventing a limited field of view due to overly strong refractive power of the first lens element, thereby preventing the zoom feature with a small field of view from being difficult to achieve. Moreover, the following condition can also be satisfied: 2.0<f1/|f2|. Moreover, the following condition can also be satisfied: 2.5<f1/|f2|.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, and a refractive index of the i-th lens element is Ni, at least two lens elements of the image lens assembly can satisfy the following condition: 6.0<Vi/Ni<12.5, wherein i=1, 2, 3, 4, 5, 6, 7, 8, or 9. Therefore, it is favorable for enhancing aberration corrections. Moreover, at least three lens elements of the image lens assembly can also satisfy the following condition: 6.0<Vi/Ni<12.5, wherein i=1, 2, 3, 4, 5, 6, 7, 8, or 9. Moreover, at least four lens elements of the image lens assembly can also satisfy the following condition: 6.0<Vi/Ni<12.5, wherein i=1, 2, 3, 4, 5, 6, 7, 8, or 9.

When the Abbe number of the first lens element is V1, and the Abbe number of the second lens element is V2, the following condition can be satisfied: V1+V2<60. Therefore, it is favorable for enhancing chromatic aberration corrections. Moreover, the following condition can also be satisfied: V1+V2<50.

When a maximum effective radius of an object-side surface of the first lens element within the zoom range is Y1R1, and the maximum image height of the image lens assembly is ImgH, the following condition can be satisfied: Y1R1/ImgH<1.5. Therefore, it is favorable for preventing the image lens assembly from being inapplicable to a small electronic device due to an overly large lens element thereof. Please refer to FIG. 79, which shows a schematic view of Y1R1 according to the 1st embodiment of the present disclosure.

According to the present disclosure, the image lens assembly can further include an aperture stop located in the second lens group. When the maximum effective radius of the object-side surface of the first lens element within the zoom range is Y1R1, and an aperture radius of the aperture stop is SD_Stop, the following condition can be satisfied: Y1R1/SD_Stop<2.0. Therefore, it is favorable for balancing the size of the first lens element and light incident amount of the image lens assembly so as to meet the requirement of miniaturization and provide a good image quality. Please refer to FIG. 79, which shows a schematic view of Y1R1 and SD_Stop according to the 1st embodiment of the present disclosure.

When a total number of lens elements having an Abbe number smaller than 40 in the image lens assembly is V40, the following condition can be satisfied: 5 V40. Therefore, it is favorable for enhancing chromatic aberration corrections. Moreover, the following condition can also be satisfied: 6 V40.

When a sum of central thicknesses of all lens elements of the image lens assembly is ΣCT, and a sum of axial distances between each of all adjacent lens elements of the image lens assembly is ΣAT, the following condition can be satisfied: ΣCT/ΣAT<1.0. Therefore, it is favorable for providing the movable lens groups with sufficient space for the functions such as zooming and focusing.

When an axial distance between the object-side surface of the first lens element and an image-side surface of the second lens element is Dr1r4, an axial distance between the second lens element and the third lens element while the image lens assembly is at a maximum field of view with an object distance at infinity is T23_frmax, an axial distance between the second lens element and the third lens element while the image lens assembly is at a minimum field of view with an object distance at infinity is T23_frmin, and a difference between T23_frmax and T23_frmin is ΔT23, the following condition can be satisfied: Dr1r4/ΔT23<1.5. Therefore, it is favorable for ensuring that the second lens group has sufficient movement space, which facilitates a high zoom ratio. Moreover, the following condition can also be satisfied: 0.25<Dr1r4/ΔT23<1.0.

When the axial distance between the object-side surface of the first lens element and the image-side surface of the second lens element is Dr1r4, and an axial distance between an object-side surface of the eighth lens element and the image-side surface of the ninth lens element is Dr15r18, the following condition can be satisfied: 0.90<Dr1r4/Dr15r18<2.75. Therefore, it is favorable for the lens elements in the first lens group and the fourth lens group to have sufficient thicknesses so as to increase manufacturability. Moreover, the following condition can also be satisfied: 1.0<Dr1r4/Dr15r18<2.25.

According to the present disclosure, the aforementioned features and conditions can be utilized in numerous combinations so as to achieve corresponding effects.

According to the present disclosure, the lens elements of the image lens assembly can be made of either glass or plastic material. When the lens elements are made of glass material, the refractive power distribution of the image lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the image lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the image lens assembly, based on the corresponding image sensor, can be flat or curved, especially a curved surface being concave facing towards the object side of the image lens assembly.

According to the present disclosure, an image correction unit, such as a field flattener, can be optionally disposed between the lens element closest to the image side of the image lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 80:
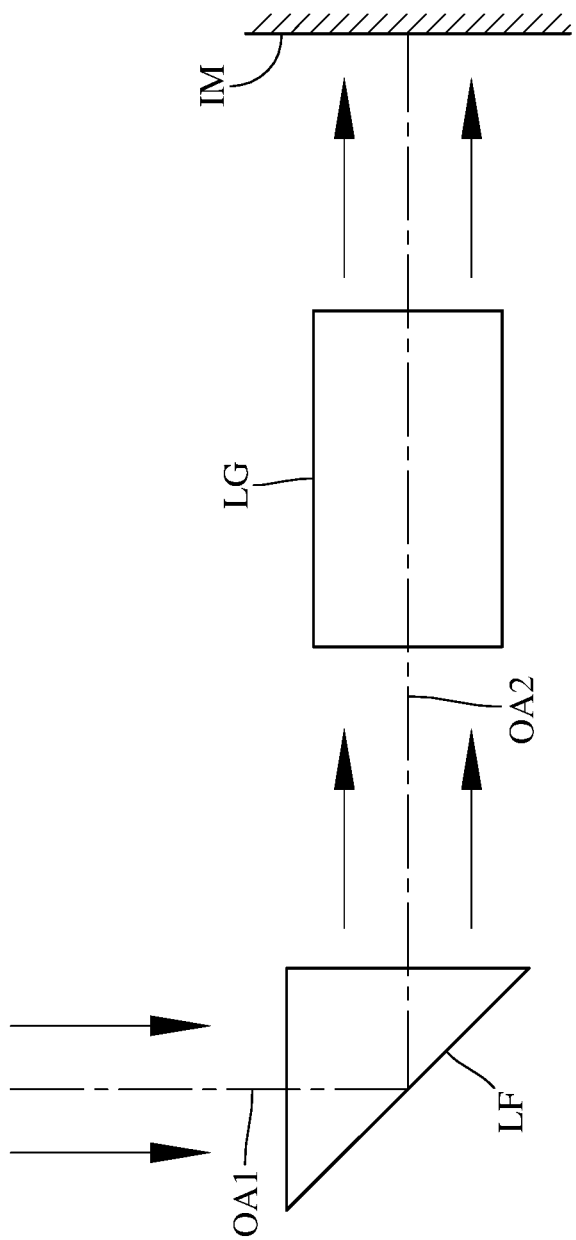
FIG. 80 shows a schematic view of a configuration of a reflective element in an image lens assembly according to one embodiment of the present disclosure.
Figure 81:
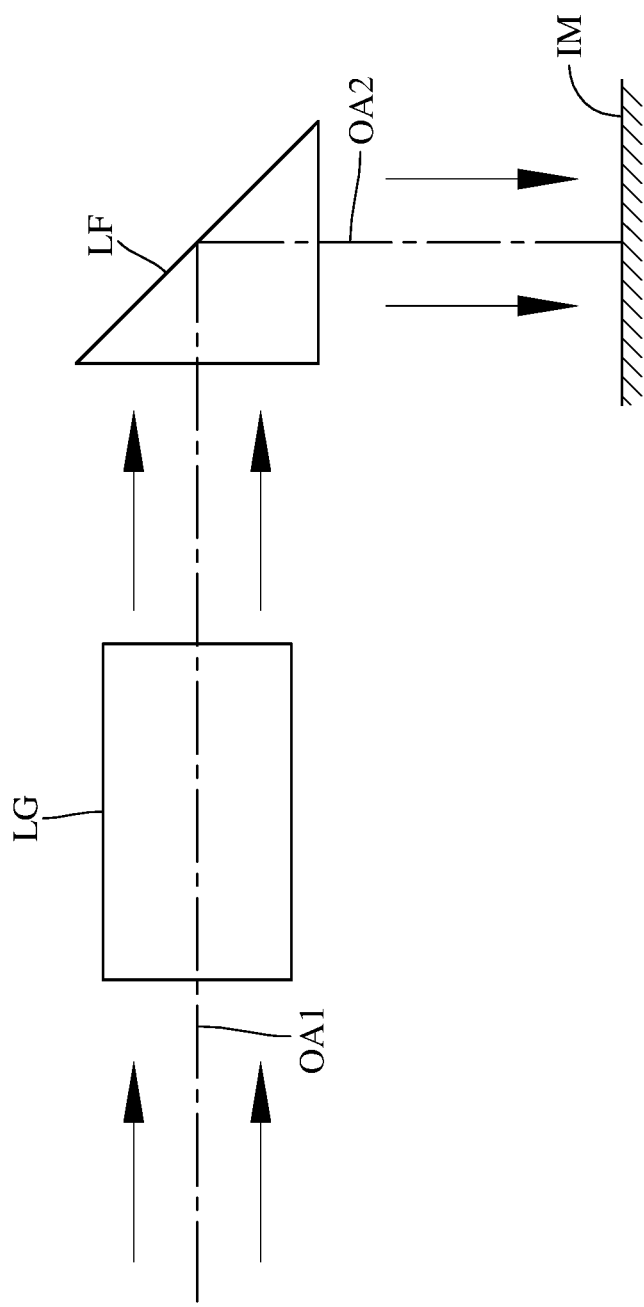
FIG. 81 shows a schematic view of another configuration of a reflective element in an image lens assembly according to one embodiment of the present disclosure.
Figure 82:
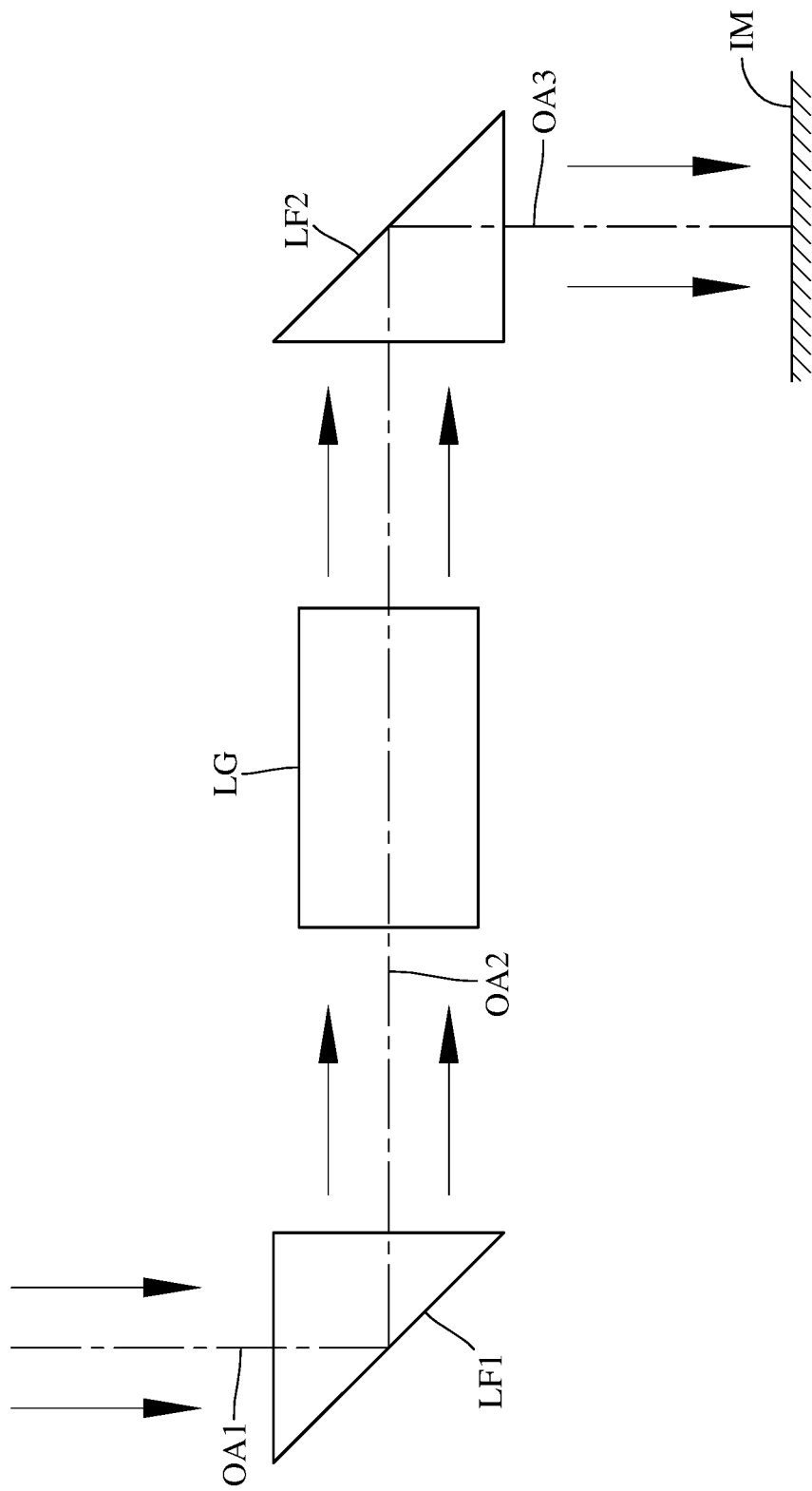
FIG. 82 shows a schematic view of a configuration of two reflective elements in an image lens assembly according to one embodiment of the present disclosure.

According to the present disclosure, at least one reflective element, such as a prism or a mirror, can be optionally disposed between an imaged object and the image surface on the imaging optical path, such that the image lens assembly can be more flexible in space arrangement, and therefore the dimensions of an electronic device is not restricted by the total track length of the image lens assembly. Specifically, please refer to FIG. 80 and FIG. 81. FIG. 80 shows a schematic view of a configuration of a reflective element in an image lens assembly according to one embodiment of the present disclosure, and FIG. 81 shows a schematic view of another configuration of a reflective element in an image lens assembly according to one embodiment of the present disclosure. In FIG. 80 and FIG. 81, the image lens assembly can have, in order from an imaged object (not shown in the figures) to an image surface IM along an optical path, a first optical axis OA1, a reflective element LF and a second optical axis OA2. The reflective element LF can be disposed between the imaged object and a lens group LG of the image lens assembly as shown in FIG. 80 or disposed between a lens group LG of the image lens assembly and the image surface IM as shown in FIG. 81. Furthermore, please refer to FIG. 82, which shows a schematic view of a configuration of two reflective elements in an image lens assembly according to one embodiment of the present disclosure. In FIG. 82, the image lens assembly can have, in order from an imaged object (not shown in the figure) to an image surface IM along an optical path, a first optical axis OA1, a first reflective element LF1, a second optical axis OA2, a second reflective element LF2 and a third optical axis OA3. The first reflective element LF1 is disposed between the imaged object and a lens group LG of the image lens assembly, the second reflective element LF2 is disposed between the lens group LG of the image lens assembly and the image surface IM, and the travelling direction of light on the first optical axis OA1 can be the same direction as the travelling direction of light on the third optical axis OA3 as shown in FIG. 82. There can be three or more reflective elements in the image lens assembly, and the present disclosure is not limited to the type, amount and position of the reflective elements of the embodiments disclosed in the aforementioned figures.

According to the present disclosure, the image lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the image lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the image lens assembly and thereby provides a wider field of view for the same.

According to the present disclosure, the image lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

FIG. 1 to FIG. 6 are schematic views of a zoom image capturing unit respectively in the first through the sixth zooming states according to the 1st embodiment of the present disclosure. FIG. 7 to FIG. 12 respectively show, in order from left to right, spherical aberration curves, astigmatic field curves and distortion curves of the zoom image capturing unit in the first through the sixth zooming states according to the 1st embodiment. In FIG. 1 to FIG. 6, the zoom image capturing unit includes the image lens assembly (its reference numeral is omitted) of the present disclosure and an image sensor 199. The image lens assembly includes, in order from an object side to an image side along an optical path, a first lens element 110, a second lens element 120, a third lens element 130, an aperture stop 100, a fourth lens element 140, a fifth lens element 150, a sixth lens element 160, a seventh lens element 170, an eighth lens element 180, a ninth lens element 190, a IR-cut filter 193 and an image surface 196, wherein the aperture stop 100 is located on an object-side surface 141 of the fourth lens element 140. In addition, the image lens assembly has a configuration of a first lens group G1 (the first lens element 110 and the second lens element 120), a second lens group G2 (the third lens element 130, the fourth lens element 140 and the fifth lens element 150), a third lens group G3 (the sixth lens element 160 and the seventh lens element 170) and a fourth lens group G4 (the eighth lens element 180 and the ninth lens element 190). As shown in FIG. 1 to FIG. 6, in the first through the sixth zooming states, the first lens group G1 and the fourth lens group G4 stay stationary, while the second lens group G2 and the third lens group G3 are movable along an optical axis. The image lens assembly includes nine lens elements (110, 120, 130, 140, 150, 160, 170, 180 and 190) with no additional lens element disposed between each of the adjacent nine lens elements.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric. The object-side surface 111 of the first lens element 110 has at least one inflection point in an off-axis region thereof. The image-side surface 112 of the first lens element 110 has at least one inflection point in an off-axis region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has at least one inflection point in an off-axis region thereof.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has at least one inflection point in an off-axis region thereof. The image-side surface 132 of the third lens element 130 has at least one inflection point in an off-axis region thereof. The image-side surface 132 of the third lens element 130 has at least one critical point in an off-axis region thereof.

The fourth lens element 140 with positive refractive power has the object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point in an off-axis region thereof. The image-side surface 152 of the fifth lens element 150 has at least one inflection point in an off-axis region thereof. The image-side surface 152 of the fifth lens element 150 has at least one critical point in an off-axis region thereof.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point in an off-axis region thereof. The object-side surface 161 of the sixth lens element 160 has at least one critical point in an off-axis region thereof.

The seventh lens element 170 with positive refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has at least one inflection point in an off-axis region thereof. The image-side surface 172 of the seventh lens element 170 has at least one inflection point in an off-axis region thereof. The image-side surface 172 of the seventh lens element 170 has at least one critical point in an off-axis region thereof.

The eighth lens element 180 with positive refractive power has an object-side surface 181 being concave in a paraxial region thereof and an image-side surface 182 being convex in a paraxial region thereof. The eighth lens element 180 is made of plastic material and has the object-side surface 181 and the image-side surface 182 being both aspheric.

The ninth lens element 190 with negative refractive power has an object-side surface 191 being concave in a paraxial region thereof and an image-side surface 192 being convex in a paraxial region thereof. The ninth lens element 190 is made of plastic material and has the object-side surface 191 and the image-side surface 192 being both aspheric.

The IR-cut filter 193 is made of glass material and located between the ninth lens element 190 and the image surface 196, and will not affect the focal length of the image lens assembly. The image sensor 199 is disposed on or near the image surface 196 of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8 and 10.

In the image lens assembly of the zoom image capturing unit according to the 1st embodiment, when a focal length of the image lens assembly is f, an f-number of the image lens assembly is Fno, and half of a maximum field of view of the image lens assembly is HFOV, these parameters would be different in the first through the sixth zooming states and have the following value ranges: f=9.72~15.00 millimeters (mm), Fno=3.30~4.37, HFOV=9.3~14.1 degrees (deg.), wherein each value respectively in the first through the sixth zooming states are shown in Table 3 below.

When a maximum value among maximum fields of view of the image lens assembly within a zoom range is FOV_max, the following condition is satisfied: FOV_max=28.2 [deg.].

When a minimum value among maximum fields of view of the image lens assembly within the zoom range is FOV_min, the following condition is satisfied: FOV_min=18.6 [deg.].

When the maximum value among maximum fields of view of the image lens assembly within the zoom range is FOV_max, and the minimum value among maximum fields of view of the image lens assembly within the zoom range is FOV_min, the following condition is satisfied: FOV_max/FOV_min=1.52.

When a focal length of the first lens element 110 is f1, and a focal length of the second lens element 120 is f2, the following condition is satisfied: f1/|f2|=1.67.

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, an Abbe number of the eighth lens element 180 is V8, an Abbe number of the ninth lens element 190 is V9, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, and a refractive index of the ninth lens element 190 is N9, the following conditions are satisfied: V1/N1=11.7; V2/N2=17.8; V3/N3=36.3; V4/N4=36.5; V5/N5=14.3; V6/N6=23.9; V7/N7=11.7; V8/N8=11.7; and V9/N9=36.3.

When the Abbe number of the first lens element 110 is V1, and the Abbe number of the second lens element 120 is V2, the following condition is satisfied: V1+V2=47.75.

When a total number of lens elements having an Abbe number smaller than 40 in the image lens assembly is V40, the following condition is satisfied: V40=6.

When an axial distance between the object-side surface 111 of the first lens element 110 and the image-side surface 122 of the second lens element 120 is Dr1r4, and an axial distance between the object-side surface 181 of the eighth lens element 180 and the image-side surface 192 of the ninth lens element 190 is Dr15r18, the following condition is satisfied: Dr1r4/Dr15r18=1.19.

When an axial distance between the second lens element 120 and the third lens element 130 while the image lens assembly is at a maximum field of view with an object distance at infinity is T23_frmax, an axial distance between the second lens element 120 and the third lens element 130 while the image lens assembly is at a minimum field of view with an object distance at infinity is T23_frmin, and a difference between T23_frmax and T23_frmin is ΔT23, the following condition is satisfied: ΔT23=2.81 [mm]. In this embodiment, an axial distance between two adjacent lens elements is a distance in a paraxial region between two adjacent lens surfaces of the two adjacent lens elements.

When the axial distance between the object-side surface 111 of the first lens element 110 and the image-side surface 122 of the second lens element 120 is Dr1r4, the axial distance between the second lens element 120 and the third lens element 130 while the image lens assembly is at a maximum field of view with an object distance at infinity is T23_frmax, the axial distance between the second lens element 120 and the third lens element 130 while the image lens assembly is at a minimum field of view with an object distance at infinity is T23_frmin, and the difference between T23_frmax and T23_frmin is ΔT23, the following condition is satisfied: Dr1r4/ΔT23=0.57.

When a sum of central thicknesses of all lens elements of the image lens assembly is ΣCT, and a sum of axial distances between each of all adjacent lens elements of the image lens assembly is ΣAT, the following condition is satisfied: ΣCT/ΣAT=0.83. In this embodiment, ΣCT is a sum of central thicknesses of the first lens element 110, the second lens element 120, the third lens element 130, the fourth lens element 140, the fifth lens element 150, the sixth lens element 160, the seventh lens element 170, the eighth lens element 180 and the ninth lens element 190, and ΣAT is a sum of axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, the sixth lens element 160 and the seventh lens element 170, the seventh lens element 170 and the eighth lens element 180, and the eighth lens element 180 and the ninth lens element 190.

When an axial distance between the image-side surface 192 of the ninth lens element 190 and the image surface 196 is BL, and a maximum image height of the image lens assembly is ImgH, the following condition is satisfied: BL/ImgH=0.57.

When a maximum effective radius of the object-side surface 111 of the first lens element 110 within the zoom range is Y1R1, and the maximum image height of the image lens assembly is ImgH, the following condition is satisfied: Y1R1/ImgH=1.02.

When the maximum effective radius of the object-side surface 111 of the first lens element 110 within the zoom range is Y1R1, and an aperture radius of the aperture stop 100 is SD_Stop, the following condition is satisfied: Y1R1/SD_Stop=1.52.

The detailed optical data of the 1st embodiment are shown in Table 1, the aspheric surface data are shown in Table 2, and changeable values respectively in the first through the sixth zooming states are shown in Table 3 below.

TABLE 1

1st Embodiment

| Surface # | | Curvature Radius | | Thickness | Material | Index | Abbe # | Focal Length |
|---|---|---|---|---|---|---|---|---|
| 0 | Object | Plano | | D1 | | | | |
| 1 | Lens 1 | 9.641 | (ASP) | 0.965 | Plastic | 1.669 | 19.5 | 10.37 |
| 2 | | −23.751 | (ASP) | 0.143 | | | | |
| 3 | Lens 2 | −26.529 | (ASP) | 0.486 | Plastic | 1.587 | 28.3 | −6.20 |
| 4 | | 4.249 | (ASP) | D2 | | | | |
| 5 | Lens 3 | 4.355 | (ASP) | 0.789 | Plastic | 1.544 | 56.0 | 11.04 |
| 6 | | 14.816 | (ASP) | 0.035 | | | | |
| 7 | Lens 4 | 3.647 | (ASP) | 1.166 | Plastic | 1.534 | 56.0 | 4.46 |
| 8 | | −6.114 | (ASP) | 0.035 | | | | |
| 9 | Lens 5 | −4.222 | (ASP) | 0.731 | Plastic | 1.639 | 23.5 | −6.98 |
| 10 | | −84.881 | (ASP) | D3 | | | | |
| 11 | Lens 6 | −10.233 | (ASP) | 0.400 | Plastic | 1.566 | 37.4 | −6.54 |
| 12 | | 5.879 | (ASP) | 1.067 | | | | |
| 13 | Lens 7 | 5.308 | (ASP) | 1.024 | Plastic | 1.669 | 19.5 | 16.84 |
| 14 | | 9.261 | (ASP) | D4 | | | | |
| 15 | Lens 8 | −7.517 | (ASP) | 0.745 | Plastic | 1.669 | 19.5 | 14.62 |
| 16 | | −4.419 | (ASP) | 0.049 | | | | |
| 17 | Lens 9 | −5.305 | (ASP) | 0.550 | Plastic | 1.544 | 56.0 | −14.63 |
| 18 | | −16.491 | (ASP) | 1.000 | | | | |
| 19 | IR-cut filter | Plano | | 0.210 | Glass | 1.517 | 64.2 | — |
| 20 | | Plano | | 0.219 | | | | |
| 21 | Image | Plano | | — | | | | |

Note:
Reference wavelength is 587.6 nm (d-line).
An effective radius of the object-side surface 111 (Surface 1) is 2.550 mm.
The aperture stop 100 is located on the object-side surface 141 (Surface 7).
An axial distance between the object and the object-side surface 111 is shown by D1 in Table 3 below.
An axial distance between the image-side surface 122 and the object-side surface 131 is shown by D2 in Table 3 below.
An axial distance between the image-side surface 152 and the object-side surface 161 is shown by D3 in Table 3 below.
An axial distance between the image-side surface 172 and the object-side surface 181 is shown by D4 in Table 3 below.

TABLE 2

Aspheric Coefficients

| Surface # | 1 | 2 | 3 | 4 | 5 | 6 |
|---|---|---|---|---|---|---|
| k= | −3.0604E+00 | 0.0000E+00 | 0.0000E+00 | −8.4068E−01 | 0.0000E+00 | 0.0000E+00 |
| A4= | −1.9471E−03 | −2.9621E−03 | −6.3385E−03 | −6.6806E−03 | −1.3985E−03 | −5.3639E−03 |
| A6= | 9.7984E−05 | −8.4663E−05 | 3.8696E−04 | 7.0432E−04 | −2.9367E−04 | −9.3638E−04 |
| A8= | −1.2439E−05 | 4.2046E−05 | 1.5739E−05 | −7.2315E−05 | −3.7075E−04 | 1.2876E−04 |
| A10= | 1.8916E−06 | −1.1803E−07 | — | 5.8402E−06 | — | — |

TABLE 2-continued

Aspheric Coefficients

| Surface # | 7 | 8 | 9 | 10 | 11 | 12 |
|---|---|---|---|---|---|---|
| k= | 0.0000E+00 | 0.0000E+00 | 0.0000E+00 | 0.0000E+00 | 0.0000E+00 | 3.9262E+00 |
| A4= | −5.1220E−03 | 1.6693E−02 | 4.4825E−02 | 3.5669E−02 | 2.2850E−02 | 1.6055E−02 |
| A6= | −3.2142E−03 | −8.1478E−03 | −7.5346E−03 | −1.2521E−04 | −4.1513E−03 | −1.4910E−03 |
| A8= | 7.6924E−04 | 1.0293E−03 | 4.2206E−04 | −2.8037E−04 | 3.2207E−04 | 3.6378E−05 |

| Surface # | 13 | 14 | 15 | 16 | 17 | 18 |
|---|---|---|---|---|---|---|
| k= | 0.0000E+00 | 0.0000E+00 | 0.0000E+00 | 0.0000E+00 | 0.0000E+00 | 0.0000E+00 |
| A4= | −1.4084E−02 | −1.3732E−02 | −5.6194E−03 | −7.5601E−04 | −2.8733E−03 | −8.4102E−03 |
| A6= | 1.3625E−03 | 7.4053E−04 | 1.4846E−04 | −4.9700E−04 | −9.0442E−04 | 2.6297E−04 |
| A8= | — | — | 1.8943E−06 | 8.3627E−05 | 1.5506E−04 | 2.8393E−05 |

TABLE 3

Changeable Values

| Zooming State # | f [mm] | Fno | HFOV [deg.] | D1 [mm] | D2 [mm] | D3 [mm] | D4 [mm] |
|---|---|---|---|---|---|---|---|
| 1 | 10.01 | 3.30 | 14.1 | Infinite | 3.798 | 1.977 | 1.206 |
| 2 | 11.80 | 3.70 | 12.0 | Infinite | 2.720 | 1.415 | 2.850 |
| 3 | 13.20 | 3.98 | 10.7 | Infinite | 1.922 | 1.141 | 3.912 |
| 4 | 15.00 | 4.31 | 9.4 | Infinite | 0.987 | 0.911 | 5.088 |
| 5 | 9.72 | 3.31 | 14.0 | 350.000 | 3.798 | 2.194 | 0.989 |
| 6 | 14.37 | 4.37 | 9.3 | 350.000 | 0.987 | 1.166 | 4.833 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-10 represent the aspheric coefficients ranging from the 4th order to the 10th order. In Table 3, zooming state 1-6 represent the first through the sixth zooming states. The tables presented below for each embodiment are the corresponding schematic parameter and aberration curves, and the definitions of the tables are the same as Table 1, Table 2 and Table 3 of the 1st embodiment. Therefore, an explanation in this regard will not be provided again.

2nd Embodiment

FIG. 13 to FIG. 18 are schematic views of a zoom image capturing unit respectively in the first through the sixth zooming states according to the 2nd embodiment of the present disclosure. FIG. 19 to FIG. 24 respectively show, in order from left to right, spherical aberration curves, astigmatic field curves and distortion curves of the zoom image capturing unit in the first through the sixth zooming states according to the 2nd embodiment. In FIG. 13 to FIG. 18, the zoom image capturing unit includes the image lens assembly (its reference numeral is omitted) of the present disclosure and an image sensor 299. The image lens assembly includes, in order from an object side to an image side along an optical path, a first lens element 210, a second lens element 220, a third lens element 230, an aperture stop 200, a fourth lens element 240, a fifth lens element 250, a sixth lens element 260, a seventh lens element 270, an eighth lens element 280, a ninth lens element 290, a IR-cut filter 293 and an image surface 296, wherein the aperture stop 200 is located on an object-side surface 241 of the fourth lens element 240. In addition, the image lens assembly has a configuration of a first lens group G1 (the first lens element 210 and the second lens element 220), a second lens group G2 (the third lens element 230, the fourth lens element 240 and the fifth lens element 250), a third lens group G3 (the sixth lens element 260 and the seventh lens element 270) and a fourth lens group G4 (the eighth lens element 280 and the ninth lens element 290). As shown in FIG. 13 to FIG. 18, in the first through the sixth zooming states, the first lens group G1 and the fourth lens group G4 stay stationary, while the second lens group G2 and the third lens group G3 are movable along an optical axis. The image lens assembly includes nine lens elements (210, 220, 230, 240, 250, 260, 270, 280 and 290) with no additional lens element disposed between each of the adjacent nine lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point in an off-axis region thereof. The image-side surface 222 of the second lens element 220 has at least one inflection point in an off-axis region thereof. The object-side surface 221 of the second lens element 220 has at least one critical point in an off-axis region thereof.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The image-side surface 232 of the third lens element 230 has at least one inflection point in an off-axis region thereof.

The fourth lens element 240 with positive refractive power has the object-side surface 241 being convex in a paraxial region thereof and an image-side surface 242 being convex in a paraxial region thereof. The fourth lens element 240 is made of glass material and has the object-side surface 241 and the image-side surface 242 being both spherical.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point in an off-axis region thereof. The image-side surface 252 of the fifth lens element 250 has at least one inflection point in an off-axis region thereof. The image-side surface 252 of the fifth lens element 250 has at least one critical point in an off-axis region thereof.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric.

The seventh lens element 270 with positive refractive power has an object-side surface 271 being convex in a paraxial region thereof and an image-side surface 272 being convex in a paraxial region thereof. The seventh lens element 270 is made of plastic material and has the object-side surface 271 and the image-side surface 272 being both aspheric. The object-side surface 271 of the seventh lens element 270 has at least one inflection point in an off-axis region thereof.

The eighth lens element 280 with positive refractive power has an object-side surface 281 being concave in a paraxial region thereof and an image-side surface 282 being convex in a paraxial region thereof. The eighth lens element 280 is made of plastic material and has the object-side surface 281 and the image-side surface 282 being both aspheric. The object-side surface 281 of the eighth lens element 280 has at least one inflection point in an off-axis region thereof. The image-side surface 282 of the eighth lens element 280 has at least one inflection point in an off-axis region thereof.

The ninth lens element 290 with negative refractive power has an object-side surface 291 being convex in a paraxial region thereof and an image-side surface 292 being concave in a paraxial region thereof. The ninth lens element 290 is made of plastic material and has the object-side surface 291 and the image-side surface 292 being both aspheric. The object-side surface 291 of the ninth lens element 290 has at least one inflection point in an off-axis region thereof. The image-side surface 292 of the ninth lens element 290 has at least one inflection point in an off-axis region thereof. The object-side surface 291 of the ninth lens element 290 has at least one critical point in an off-axis region thereof. The image-side surface 292 of the ninth lens element 290 has at least one critical point in an off-axis region thereof.

The IR-cut filter 293 is made of glass material and located between the ninth lens element 290 and the image surface 296, and will not affect the focal length of the image lens assembly. The image sensor 299 is disposed on or near the image surface 296 of the image lens assembly.

The detailed optical data of the 2nd embodiment are shown in Table 4, the aspheric surface data are shown in Table 5, and changeable values respectively in the first through the sixth zooming states are shown in Table 6 below.

TABLE 4

2nd Embodiment

| Surface # | | Curvature Radius | | Thickness | Material | Index | Abbe # | Focal Length |
|---|---|---|---|---|---|---|---|---|
| 0 | Object | Plano | | D1 | | | | |
| 1 | Lens 1 | 7.131 | (ASP) | 1.954 | Plastic | 1.660 | 20.4 | 14.95 |
| 2 | | 22.924 | (ASP) | 0.488 | | | | |
| 3 | Lens 2 | 74.869 | (ASP) | 0.614 | Plastic | 1.566 | 37.4 | −5.47 |
| 4 | | 2.965 | (ASP) | D2 | | | | |
| 5 | Lens 3 | 3.611 | (ASP) | 0.969 | Plastic | 1.534 | 55.9 | 5.26 |
| 6 | | −11.438 | (ASP) | 0.035 | | | | |
| 7 | Lens 4 | 16.294 | (SPH) | 1.071 | Glass | 1.517 | 64.2 | 6.69 |
| 8 | | −4.288 | (SPH) | 0.035 | | | | |
| 9 | Lens 5 | −3.554 | (ASP) | 0.444 | Plastic | 1.607 | 26.6 | −6.07 |
| 10 | | −106.225 | (ASP) | D3 | | | | |
| 11 | Lens 6 | −46.846 | (ASP) | 1.162 | Plastic | 1.566 | 37.4 | −6.14 |
| 12 | | 3.789 | (ASP) | 0.575 | | | | |
| 13 | Lens 7 | 6.124 | (ASP) | 1.424 | Plastic | 1.614 | 26.0 | 9.62 |
| 14 | | −151.073 | (ASP) | D4 | | | | |
| 15 | Lens 8 | −5.584 | (ASP) | 0.890 | Plastic | 1.705 | 14.0 | 27.06 |
| 16 | | −4.604 | (ASP) | 0.036 | | | | |
| 17 | Lens 9 | 4.613 | (ASP) | 0.670 | Plastic | 1.583 | 30.2 | −78.41 |
| 18 | | 3.966 | (ASP) | 1.000 | | | | |
| 19 | IR-cut filter | Plano | | 0.210 | Glass | 1.517 | 64.2 | — |
| 20 | | Plano | | 1.063 | | | | |
| 21 | Image | Plano | | — | | | | |

Note:
Reference wavelength is 587.6 nm (d-line).
An effective radius of the object-side surface 211 (Surface 1) is 2.250 mm.
The aperture stop 200 is located on the object-side surface 241 (Surface 7).
An axial distance between the object and the object-side surface 211 is shown by D1 in Table 6 below.
An axial distance between the image-side surface 222 and the object-side surface 231 is shown by D2 in Table 6 below.
An axial distance between the image-side surface 252 and the object-side surface 261 is shown by D3 in Table 6 below.
An axial distance between the image-side surface 272 and the object-side surface 281 is shown by D4 in Table 6 below.

TABLE 5

Aspheric Coefficients

| Surface # | 1 | 2 | 3 | 4 | 5 | 6 |
|---|---|---|---|---|---|---|
| k= | 1.6851E+00 | 0.0000E+00 | 0.0000E+00 | −4.3030E+00 | 0.0000E+00 | 0.0000E+00 |
| A4= | 1.3584E−03 | 1.1342E−03 | −4.0927E−02 | −2.8407E−02 | −1.1057E−03 | 5.1797E−03 |
| A6= | 1.2484E−04 | 1.1985E−03 | 1.2071E−02 | 1.0969E−02 | 1.9007E−04 | 1.6403E−03 |
| A8= | 1.2938E−06 | −1.1591E−04 | −2.0928E−03 | −2.3784E−03 | 1.3383E−04 | −2.4639E−04 |
| A10= | 1.4359E−06 | 2.8983E−05 | 1.6365E−04 | 2.1398E−04 | −5.7917E−05 | −9.1610E−06 |

| Surface # | 9 | 10 | 11 | 12 | 13 | 14 |
|---|---|---|---|---|---|---|
| k= | 0.0000E+00 | 0.0000E+00 | 0.0000E+00 | −2.1507E+00 | 0.0000E+00 | 0.0000E+00 |
| A4= | 4.4792E−02 | 4.4009E−02 | −3.9687E−03 | −1.5636E−02 | −1.6951E−02 | −6.8375E−03 |
| A6= | −1.1084E−02 | −9.0646E−03 | 3.6266E−03 | 8.4227E−03 | 2.0471E−03 | −1.4135E−04 |
| A8= | 1.8250E−03 | 1.0913E−03 | −1.0571E−03 | −1.5471E−03 | 1.0167E−04 | 5.4022E−05 |
| A10= | −1.0410E−04 | 7.3911E−05 | 1.4075E−04 | 8.5725E−05 | −9.3817E−05 | −1.8564E−05 |

| Surface # | 15 | 16 | 17 | 18 |
|---|---|---|---|---|
| k= | 0.0000E+00 | 0.0000E+00 | 0.0000E+00 | 0.0000E+00 |
| A4= | 1.9439E−02 | 8.5870E−03 | −3.5520E−02 | −3.5635E−02 |
| A6= | −2.5007E−03 | −6.6747E−05 | 1.4141E−03 | 2.9824E−03 |
| A8= | 3.9420E−04 | 1.6271E−04 | 3.6144E−04 | −9.5002E−05 |
| A10= | −3.5583E−05 | −2.3934E−05 | −2.1106E−05 | 1.4665E−05 |

TABLE 6

Changeable Values

| Zooming State # | f [mm] | Fno | HFOV [deg.] | D1 [mm] | D2 [mm] | D3 [mm] | D4 [mm] |
|---|---|---|---|---|---|---|---|
| 1 | 8.61 | 3.35 | 13.5 | Infinite | 5.090 | 1.692 | 1.551 |
| 2 | 11.51 | 3.92 | 10.0 | Infinite | 3.240 | 1.371 | 3.721 |
| 3 | 15.53 | 4.65 | 7.4 | Infinite | 1.477 | 2.019 | 4.843 |
| 4 | 18.49 | 5.05 | 6.2 | Infinite | 0.538 | 2.988 | 4.797 |
| 5 | 8.54 | 3.37 | 13.4 | 500.000 | 5.090 | 1.876 | 1.362 |
| 6 | 18.03 | 5.10 | 6.1 | 500.000 | 0.538 | 3.598 | 4.183 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 4, Table 5 and Table 6 as the following values and satisfy the following conditions:

| 2nd Embodiment | | | |
|---|---|---|---|
| f [mm] | 8.54-18.49 | V7/N7 | 16.1 |
| Fno | 3.35-5.10 | V8/N8 | 8.2 |
| HFOV [deg.] | 6.1-13.5 | V9/N9 | 19.1 |
| FOV_max [deg.] | 27.0 | V1 + V2 | 57.84 |
| FOV_min [deg.] | 12.2 | V40 | 7 |
| FOV_max/FOV_min | 2.21 | Dr1r4/Dr15r18 | 1.91 |
| \|f1/f2\| | 2.73 | ΔT23 [mm] | 4.55 |
| V1/N1 | 12.3 | Dr1r4/ΔT23 | 0.67 |
| V2/N2 | 23.9 | ΣCT/ΣAT | 0.97 |
| V3/N3 | 36.5 | BL/ImgH | 1.11 |
| V4/N4 | 42.3 | Y1R1/ImgH | 1.10 |
| V5/N5 | 16.6 | Y1R1/SD_Stop | 1.35 |
| V6/N6 | 23.9 | — | — |

3rd Embodiment

FIG. 25 to FIG. 30 are schematic views of a zoom image capturing unit respectively in the first through the sixth zooming states according to the 3rd embodiment of the present disclosure. FIG. 31 to FIG. 36 respectively show, in order from left to right, spherical aberration curves, astigmatic field curves and distortion curves of the zoom image capturing unit in the first through the sixth zooming states according to the 3rd embodiment. In FIG. 25 to FIG. 30, the zoom image capturing unit includes the image lens assembly (its reference numeral is omitted) of the present disclosure and an image sensor 399. The image lens assembly includes, in order from an object side to an image side along an optical path, a first lens element 310, a second lens element 320, a third lens element 330, an aperture stop 300, a fourth lens element 340, a fifth lens element 350, a sixth lens element 360, a seventh lens element 370, an eighth lens element 380, a ninth lens element 390, a IR-cut filter 393 and an image surface 396, wherein the aperture stop 300 is located on an object-side surface 341 of the fourth lens element 340. In addition, the image lens assembly has a configuration of a first lens group G1 (the first lens element 310 and the second lens element 320), a second lens group G2 (the third lens element 330, the fourth lens element 340 and the fifth lens element 350), a third lens group G3 (the sixth lens element 360 and the seventh lens element 370) and a fourth lens group G4 (the eighth lens element 380 and the ninth lens element 390). As shown in FIG. 25 to FIG. 30, in the first through the sixth zooming states, the first lens group G1 and the fourth lens group G4 stay stationary, while the second lens group G2 and the third lens group G3 are movable along an optical axis. The image lens assembly includes nine elements (310, 320, 330, 340, 350, 360, 370, 380 and 390) with no additional lens element disposed between each of the adjacent nine lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The image-side surface 312 of the first lens element 310 has at least one inflection point in an off-axis region thereof. The image-side surface 312 of the first lens element 310 has at least one critical point in an off-axis region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point in an off-axis region thereof. The image-side surface 322 of the second lens element 320 has at least one inflection point in an off-axis region thereof. The object-side surface 321 of the second lens element 320 has at least one critical point in an off-axis region thereof.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has at least one inflection point in an off-axis region thereof. The image-side surface 332 of the third lens element 330 has at least one inflection point in an off-axis region thereof.

The fourth lens element 340 with positive refractive power has the object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point in an off-axis region thereof. The image-side surface 342 of the fourth lens element 340 has at least one inflection point in an off-axis region thereof. The object-side surface 341 of the fourth lens element 340 has at least one critical point in an off-axis region thereof.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has at least one inflection point in an off-axis region thereof. The image-side surface 352 of the fifth lens element 350 has at least one inflection point in an off-axis region thereof. The image-side surface 352 of the fifth lens element 350 has at least one critical point in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric.

The eighth lens element 380 with positive refractive power has an object-side surface 381 being concave in a paraxial region thereof and an image-side surface 382 being convex in a paraxial region thereof. The eighth lens element 380 is made of plastic material and has the object-side surface 381 and the image-side surface 382 being both aspheric. The object-side surface 381 of the eighth lens element 380 has at least one inflection point in an off-axis region thereof. The image-side surface 382 of the eighth lens element 380 has at least one inflection point in an off-axis region thereof. The object-side surface 381 of the eighth lens element 380 has at least one critical point in an off-axis region thereof.

The ninth lens element 390 with negative refractive power has an object-side surface 391 being convex in a paraxial region thereof and an image-side surface 392 being concave in a paraxial region thereof. The ninth lens element 390 is made of plastic material and has the object-side surface 391 and the image-side surface 392 being both aspheric. The object-side surface 391 of the ninth lens element 390 has at least one inflection point in an off-axis region thereof. The image-side surface 392 of the ninth lens element 390 has at least one inflection point in an off-axis region thereof. The object-side surface 391 of the ninth lens element 390 has at least one critical point in an off-axis region thereof. The image-side surface 392 of the ninth lens element 390 has at least one critical point in an off-axis region thereof.

The IR-cut filter 393 is made of glass material and located between the ninth lens element 390 and the image surface 396, and will not affect the focal length of the image lens assembly. The image sensor 399 is disposed on or near the image surface 396 of the image lens assembly.

The detailed optical data of the 3rd embodiment are shown in Table 7, the aspheric surface data are shown in Table 8, and changeable values respectively in the first through the sixth zooming states are shown in Table 9 below.

TABLE 7

| | 3rd Embodiment | | | | | | |
|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 13.745 | (ASP) | 1.926 | Plastic | 1.705 | 14.0 | 17.57 |
| 2 | | −118.296 | (ASP) | 0.835 | | | | |
| 3 | Lens 2 | 15.000 | (ASP) | 0.958 | Plastic | 1.559 | 40.4 | −4.98 |

TABLE 7-continued

3rd Embodiment

| Surface # | | Curvature Radius | | Thickness | Material | Index | Abbe # | Focal Length |
|---|---|---|---|---|---|---|---|---|
| 4 | | 2.293 | (ASP) | D2 | | | | |
| 5 | Lens 3 | 4.470 | (ASP) | 1.303 | Plastic | 1.534 | 55.9 | 4.93 |
| 6 | | −5.738 | (ASP) | 0.040 | | | | |
| 7 | Lens 4 | −103.706 | (ASP) | 1.061 | Plastic | 1.534 | 55.9 | 11.32 |
| 8 | | −5.731 | (ASP) | 0.067 | | | | |
| 9 | Lens 5 | −3.874 | (ASP) | 0.450 | Plastic | 1.657 | 17.0 | −9.55 |
| 10 | | −10.592 | (ASP) | D3 | | | | |
| 11 | Lens 6 | 18.396 | (ASP) | 1.175 | Plastic | 1.650 | 21.8 | −4.87 |
| 12 | | 2.630 | (ASP) | 0.082 | | | | |
| 13 | Lens 7 | 2.602 | (ASP) | 1.233 | Plastic | 1.705 | 14.0 | 8.34 |
| 14 | | 3.755 | (ASP) | D4 | | | | |
| 15 | Lens 8 | −11.424 | (ASP) | 0.880 | Plastic | 1.705 | 14.0 | 9.66 |
| 16 | | −4.403 | (ASP) | 0.341 | | | | |
| 17 | Lens 9 | 33.293 | (ASP) | 0.787 | Plastic | 1.705 | 14.0 | −63.92 |
| 18 | | 18.960 | (ASP) | 1.000 | | | | |
| 19 | IR-cut filter | Plano | | 0.210 | Glass | 1.517 | 64.2 | — |
| 20 | | Plano | | 0.561 | | | | |
| 21 | Image | Plano | | — | | | | |

Note:
Reference wavelength is 587.6 nm (d-line).
An effective radius of the object-side surface 311 (Surface 1) is 2.650 mm.
The aperture stop 300 is located on the object-side surface 341 (Surface 7).
An axial distance between the object and the object-side surface 311 is shown by D1 in Table 9 below.
An axial distance between the image-side surface 322 and the object-side surface 331 is shown by D2 in Table 9 below.
An axial distance between the image-side surface 352 and the object-side surface 361 is shown by D3 in Table 9 below.
An axial distance between the image-side surface 372 and the object-side surface 381 is shown by D4 in Table 9 below.

TABLE 8

Aspheric Coefficients

| Surface # | 1 | 2 | 3 | 4 | 5 | 6 |
|---|---|---|---|---|---|---|
| k= | 8.5201E+00 | 0.0000E+00 | 0.0000E+00 | −4.0182E+00 | 0.0000E+00 | 0.0000E+00 |
| A4= | 2.6974E−03 | 3.4283E−03 | −3.8693E−02 | −2.0065E−02 | −8.6908E−04 | 9.6815E−03 |
| A6= | −7.1451E−05 | 4.2674E−04 | 8.0240E−03 | 6.0164E−03 | 4.1278E−04 | −2.9429E−03 |
| A8= | 1.5451E−05 | −9.3643E−05 | −1.1312E−04 | −1.1322E−03 | −3.5325E−04 | 2.1512E−03 |
| A10= | 3.1908E−07 | 2.5443E−05 | 1.1224E−04 | 1.0364E−04 | 1.6359E−04 | −8.2432E−04 |
| A12= | −1.1890E−07 | 4.8652E−07 | −1.0040E−05 | 4.6468E−06 | −4.7912E−05 | 1.7755E−04 |
| A14= | 7.2811E−09 | −9.4014E−07 | 1.0535E−06 | −2.1256E−06 | 7.1492E−06 | −2.0364E−05 |
| A16= | 2.8408E−10 | 1.1923E−07 | −4.0796E−08 | 1.5604E−07 | −5.1030E−07 | 8.8136E−07 |

| Surface # | 7 | 8 | 9 | 10 | 11 | 12 |
|---|---|---|---|---|---|---|
| k= | 0.0000E+00 | 8.5394E−02 | 0.0000E+00 | 0.0000E+00 | 0.0000E+00 | −1.6262E+00 |
| A4= | 1.1355E−04 | 4.5014E−03 | 4.6777E−02 | 3.4420E−02 | −4.0239E−04 | 4.6462E−03 |
| A6= | −4.2645E−03 | −5.4258E−03 | −1.3270E−02 | −6.8265E−03 | −2.9007E−04 | −3.5906E−03 |
| A8= | 3.3112E−03 | 2.6786E−03 | 3.7146E−03 | 1.2628E−03 | −3.8960E−05 | −4.7064E−03 |
| A10= | −1.1898E−03 | −7.9170E−04 | −1.0511E−03 | −4.3016E−04 | 1.4723E−04 | 7.7119E−03 |
| A12= | 2.5727E−04 | 1.6656E−04 | 2.4232E−04 | 1.3815E−04 | −7.4562E−05 | −4.2134E−03 |
| A14= | −2.8609E−05 | −2.0478E−05 | −3.4619E−05 | −2.4495E−05 | 1.5690E−05 | 1.0358E−03 |
| A16= | 1.2741E−06 | 1.1697E−06 | 2.1011E−06 | 1.7401E−06 | −1.2815E−06 | −9.7793E−05 |

| Surface # | 13 | 14 | 15 | 16 | 17 | 18 |
|---|---|---|---|---|---|---|
| k= | 0.0000E+00 | 0.0000E+00 | 0.0000E+00 | 0.0000E+00 | 0.0000E+00 | 0.0000E+00 |
| A4= | −6.2658E−03 | −1.0521E−03 | 6.6471E−03 | 8.1469E−04 | −3.5359E−02 | −3.5992E−02 |
| A6= | −2.8944E−03 | 5.8636E−04 | −1.6949E−03 | 8.5072E−04 | 4.1560E−03 | 5.4516E−03 |
| A8= | −4.1632E−03 | −1.4520E−03 | 5.4640E−05 | −4.7458E−05 | 2.7070E−04 | −6.0520E−04 |
| A10= | 6.2425E−03 | 1.6599E−03 | 2.8009E−04 | 1.2733E−04 | −3.4197E−05 | 4.1149E−05 |
| A12= | −3.2695E−03 | −8.6389E−04 | −8.4549E−05 | −1.3955E−05 | −1.9167E−05 | 2.2362E−07 |
| A14= | 7.7496E−04 | 2.2014E−04 | 9.9033E−06 | −1.9004E−06 | 3.4911E−06 | −5.3855E−07 |
| A16= | −7.0526E−05 | −2.1779E−05 | −4.6396E−07 | 2.2288E−07 | −1.5772E−07 | 4.9624E−08 |

TABLE 9

Changeable Values

| Zooming State # | f [mm] | Fno | HFOV [deg.] | D1 [mm] | D2 [mm] | D3 [mm] | D4 [mm] |
|---|---|---|---|---|---|---|---|
| 1 | 9.10 | 3.35 | 12.7 | Infinite | 5.727 | 0.813 | 5.549 |
| 2 | 11.88 | 3.91 | 9.7 | Infinite | 4.169 | 1.442 | 6.474 |
| 3 | 14.36 | 4.30 | 8.0 | Infinite | 3.123 | 2.216 | 6.755 |
| 4 | 22.75 | 5.25 | 5.0 | Infinite | 0.655 | 7.116 | 4.323 |
| 5 | 9.09 | 3.36 | 12.6 | 500.000 | 5.727 | 0.896 | 5.471 |
| 6 | 21.98 | 5.16 | 5.1 | 500.000 | 0.655 | 7.820 | 3.624 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 7, Table 8 and Table 9 as the following values and satisfy the following conditions:

| 3rd Embodiment | | | |
|---|---|---|---|
| f [mm] | 9.09-22.75 | V7/N7 | 8.2 |
| Fno | 3.35-5.25 | V8/N8 | 8.2 |
| HFOV [deg.] | 5.0-12.7 | V9/N9 | 8.2 |
| FOV_max [deg.] | 25.4 | V1 + V2 | 54.44 |
| FOV_min [deg.] | 10.0 | V40 | 6 |
| FOV_max/FOV_min | 2.54 | Dr1r4/Dr15r18 | 1.85 |
| f1/|f2| | 3.53 | ΔT23 [mm] | 5.07 |
| V1/N1 | 8.2 | Dr1r4/ΔT23 | 0.73 |
| V2/N2 | 25.9 | ΣCT/ΣAT | 0.73 |
| V3/N3 | 36.5 | BL/ImgH | 0.87 |
| V4/N4 | 36.5 | Y1R1/ImgH | 1.30 |
| V5/N5 | 10.3 | Y1R1/SD_Stop | 1.25 |
| V6/N6 | 13.2 | — | — |

4th Embodiment

FIG. 37 to FIG. 42 are schematic views of a zoom image capturing unit respectively in the first through the sixth zooming states according to the 4th embodiment of the present disclosure. FIG. 43 to FIG. 48 respectively show, in order from left to right, spherical aberration curves, astigmatic field curves and distortion curves of the zoom image capturing unit in the first through the sixth zooming states according to the 4th embodiment. In FIG. 37 to FIG. 42, the zoom image capturing unit includes the image lens assembly (its reference numeral is omitted) of the present disclosure and an image sensor 499. The image lens assembly includes, in order from an object side to an image side along an optical path, a first lens element 410, a second lens element 420, a third lens element 430, an aperture stop 400, a fourth lens element 440, a fifth lens element 450, a sixth lens element 460, a seventh lens element 470, an eighth lens element 480, a ninth lens element 490, a IR-cut filter 493 and an image surface 496, wherein the aperture stop 400 is located on an object-side surface 441 of the fourth lens element 440. In addition, the image lens assembly has a configuration of a first lens group G1 (the first lens element 410 and the second lens element 420), a second lens group G2 (the third lens element 430, the fourth lens element 440 and the fifth lens element 450), a third lens group G3 (the sixth lens element 460 and the seventh lens element 470) and a fourth lens group G4 (the eighth lens element 480 and the ninth lens element 490). As shown in FIG. 37 to FIG. 42, in the first through the sixth zooming states, the first lens group G1 and the fourth lens group G4 stay stationary, while the second lens group G2 and the third lens group G3 are movable along an optical axis. The image lens assembly includes nine lens elements (410, 420, 430, 440, 450, 460, 470, 480 and 490) with no additional lens element disposed between each of the adjacent nine lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has at least one inflection point in an off-axis region thereof.

The fourth lens element 440 with positive refractive power has the object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has at least one inflection point in an off-axis region thereof. The image-side surface 452 of the fifth lens element 450 has at least one inflection point in an off-axis region thereof. The image-side surface 452 of the fifth lens element 450 has at least one critical point in an off-axis region thereof.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric.

The seventh lens element 470 with positive refractive power has an object-side surface 471 being convex in a paraxial region thereof and an image-side surface 472 being convex in a paraxial region thereof. The seventh lens element 470 is made of plastic material and has the object-side surface 471 and the image-side surface 472 being both aspheric. The object-side surface 471 of the seventh lens element 470 has at least one inflection point in an off-axis region thereof. The object-side surface 471 of the seventh lens element 470 has at least one critical point in an off-axis region thereof.

The eighth lens element 480 with negative refractive power has an object-side surface 481 being convex in a paraxial region thereof and an image-side surface 482 being concave in a paraxial region thereof. The eighth lens element 480 is made of plastic material and has the object-side surface 481 and the image-side surface 482 being both aspheric.

The ninth lens element 490 with positive refractive power has an object-side surface 491 being convex in a paraxial region thereof and an image-side surface 492 being concave in a paraxial region thereof. The ninth lens element 490 is made of plastic material and has the object-side surface 491 and the image-side surface 492 being both aspheric. The object-side surface 491 of the ninth lens element 490 has at least one inflection point in an off-axis region thereof. The image-side surface 492 of the ninth lens element 490 has at least one inflection point in an off-axis region thereof. The object-side surface 491 of the ninth lens element 490 has at least one critical point in an off-axis region thereof. The image-side surface 492 of the ninth lens element 490 has at least one critical point in an off-axis region thereof.

The IR-cut filter 493 is made of glass material and located between the ninth lens element 490 and the image surface 496, and will not affect the focal length of the image lens assembly. The image sensor 499 is disposed on or near the image surface 496 of the image lens assembly.

The detailed optical data of the 4th embodiment are shown in Table 10, the aspheric surface data are shown in Table 11, and changeable values respectively in the first through the sixth zooming states are shown in Table 12 below.

TABLE 10

4th Embodiment

| Surface # |  | Curvature Radius |  | Thickness | Material | Index | Abbe # | Focal Length |
|---|---|---|---|---|---|---|---|---|
| 0 | Object | Plano |  | D1 |  |  |  |  |
| 1 | Lens 1 | 7.364 | (ASP) | 2.719 | Plastic | 1.660 | 20.4 | 12.60 |
| 2 |  | 54.784 | (ASP) | 0.603 |  |  |  |  |
| 3 | Lens 2 | −95.735 | (ASP) | 0.465 | Plastic | 1.583 | 30.2 | −4.86 |
| 4 |  | 2.920 | (ASP) | D2 |  |  |  |  |
| 5 | Lens 3 | 3.563 | (ASP) | 0.811 | Plastic | 1.515 | 56.6 | 8.28 |
| 6 |  | 20.005 | (ASP) | 0.035 |  |  |  |  |
| 7 | Lens 4 | 6.598 | (ASP) | 1.100 | Plastic | 1.544 | 56.0 | 5.68 |
| 8 |  | −5.473 | (ASP) | 0.035 |  |  |  |  |
| 9 | Lens 5 | −4.299 | (ASP) | 0.404 | Plastic | 1.669 | 19.5 | −11.87 |
| 10 |  | −9.729 | (ASP) | D3 |  |  |  |  |
| 11 | Lens 6 | −53.637 | (ASP) | 0.450 | Plastic | 1.595 | 31.2 | −5.66 |
| 12 |  | 3.606 | (ASP) | 0.789 |  |  |  |  |
| 13 | Lens 7 | 45.641 | (ASP) | 1.500 | Plastic | 1.669 | 19.5 | 10.59 |
| 14 |  | −8.281 | (ASP) | D4 |  |  |  |  |
| 15 | Lens 8 | 20.509 | (ASP) | 0.550 | Plastic | 1.583 | 30.2 | −32.86 |
| 16 |  | 9.802 | (ASP) | 0.898 |  |  |  |  |
| 17 | Lens 9 | 10.818 | (ASP) | 0.610 | Plastic | 1.669 | 19.5 | 24.54 |
| 18 |  | 31.007 | (ASP) | 1.000 |  |  |  |  |
| 19 | IR-cut filter | Plano |  | 0.210 | Glass | 1.517 | 64.2 | — |
| 20 |  | Plano |  | 2.255 |  |  |  |  |
| 21 | Image | Plano |  | — |  |  |  |  |

Note:
Reference wavelength is 587.6 nm (d-line).
An effective radius of the object-side surface 411 (Surface 1) is 2.650 mm.
The aperture stop 400 is located on the object-side surface 441 (Surface 7).
An axial distance between the object and the object-side surface 411 is shown by D1 in Table 12 below.
An axial distance between the image-side surface 422 and the object-side surface 431 is shown by D2 in Table 12 below.
An axial distance between the image-side surface 452 and the object-side surface 461 is shown by D3 in Table 12 below.
An axial distance between the image-side surface 472 and the object-side surface 481 is shown by D4 in Table 12 below.

TABLE 11

Aspheric Coefficients

| Surface # | 1 | 2 | 3 | 4 | 5 | 6 |
|---|---|---|---|---|---|---|
| k= | 3.5532E−01 | 0.0000E+00 | 0.0000E+00 | −4.5832E+00 | 0.0000E+00 | 0.0000E+00 |
| A4= | 1.6015E−03 | 5.6798E−03 | −4.1158E−02 | −3.2922E−02 | −2.3689E−05 | −6.2954E−03 |
| A6= | 1.0786E−05 | −8.2508E−04 | 1.1398E−02 | 1.2680E−02 | 1.1237E−03 | 2.0307E−02 |
| A8= | 3.0144E−06 | 1.4987E−04 | −1.5572E−03 | −2.3396E−03 | 1.2598E−04 | −7.7815E−03 |
| A10= | 5.4834E−07 | 1.9368E−05 | 1.0017E−04 | 1.7731E−04 | −1.7250E−04 | 7.1955E−04 |

TABLE 11-continued

| Aspheric Coefficients | | | | | | |
|---|---|---|---|---|---|---|
| Surface # | 7 | 8 | 9 | 10 | 11 | 12 |
| k= | 0.0000E+00 | 0.0000E+00 | 0.0000E+00 | 0.0000E+00 | 0.0000E+00 | −1.1389E+00 |
| A4= | −1.2021E−02 | −4.1487E−03 | 3.6570E−02 | 3.9701E−02 | −3.6327E−03 | −9.0519E−03 |
| A6= | 1.7941E−02 | 7.7595E−03 | −1.9085E−03 | −6.6460E−03 | 4.3634E−03 | 7.5457E−03 |
| A8= | −7.7396E−03 | −3.7513E−03 | −1.1082E−03 | 1.7905E−03 | −1.1977E−03 | −2.6894E−03 |
| A10= | 9.6434E−04 | 6.1719E−04 | 1.2549E−04 | −4.2052E−04 | 1.0540E−04 | 4.3227E−04 |
| Surface # | 13 | 14 | 15 | 16 | 17 | 18 |
| k= | 0.0000E+00 | 0.0000E+00 | 0.0000E+00 | 0.0000E+00 | 0.0000E+00 | 0.0000E+00 |
| A4= | −1.1273E−02 | −6.6532E−03 | 1.6151E−02 | 5.9593E−03 | −4.2010E−02 | −3.6227E−02 |
| A6= | −2.8933E−04 | −6.0996E−04 | 2.6781E−04 | 4.5394E−03 | 4.0037E−03 | 4.4559E−03 |
| A8= | −2.1616E−04 | 3.8349E−06 | −5.0474E−04 | −1.2360E−03 | 2.2218E−04 | −2.6572E−04 |
| A10= | −8.0543E−05 | −1.4723E−05 | 5.1429E−05 | 8.9289E−05 | −5.1828E−05 | 1.1796E−05 |

TABLE 12

| Changeable Values | | | | | | | |
|---|---|---|---|---|---|---|---|
| Zooming State # | f [mm] | Fno | HFOV [deg.] | D1 [mm] | D2 [mm] | D3 [mm] | D4 [mm] |
| 1 | 8.60 | 3.35 | 13.4 | Infinite | 5.680 | 1.612 | 0.273 |
| 2 | 11.50 | 3.92 | 10.0 | Infinite | 3.651 | 1.276 | 2.632 |
| 3 | 16.14 | 4.65 | 7.1 | Infinite | 1.533 | 1.591 | 4.435 |
| 4 | 19.36 | 5.05 | 5.9 | Infinite | 0.525 | 2.120 | 4.914 |
| 5 | 8.54 | 3.37 | 13.4 | 500.000 | 5.680 | 1.711 | 0.174 |
| 6 | 18.85 | 5.10 | 5.9 | 500.000 | 0.525 | 2.469 | 4.565 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 10, Table 11 and Table 12 as the following values and satisfy the following conditions:

| 4th Embodiment | | | |
|---|---|---|---|
| f [mm] | 8.54-19.36 | V7/N7 | 11.7 |
| Fno | 3.35-5.10 | V8/N8 | 19.1 |
| HFOV [deg.] | 5.9-13.4 | V9/N9 | 11.7 |
| FOV_max [deg.] | 26.8 | V1 + V2 | 50.64 |
| FOV_min [deg.] | 11.8 | V40 | 7 |
| FOV_max/FOV_min | 2.27 | Dr1r4/Dr15r18 | 1.84 |
| f1/|f2| | 2.60 | ΔT23 [mm] | 5.16 |
| V1/N1 | 12.3 | Dr1r4/ΔT23 | 0.73 |
| V2/N2 | 19.1 | ΣCT/ΣAT | 0.87 |
| V3/N3 | 37.3 | BL/ImgH | 1.70 |
| V4/N4 | 36.3 | Y1R1/ImgH | 1.30 |
| V5/N5 | 11.7 | Y1R1/SD_Stop | 1.61 |
| V6/N6 | 19.6 | — | — |

5th Embodiment

FIG. 49 to FIG. 54 are schematic views of a zoom image capturing unit respectively in the first through the sixth zooming states according to the 5th embodiment of the present disclosure. FIG. 55 to FIG. 60 respectively show, in order from left to right, spherical aberration curves, astigmatic field curves and distortion curves of the zoom image capturing unit in the first through the sixth zooming states according to the 5th embodiment. In FIG. 49 to FIG. 54, the zoom image capturing unit includes the image lens assembly (its reference numeral is omitted) of the present disclosure and an image sensor 599. The image lens assembly includes, in order from an object side to an image side along an optical path, a first lens element 510, a second lens element 520, a third lens element 530, an aperture stop 500, a fourth lens element 540, a fifth lens element 550, a sixth lens element 560, a seventh lens element 570, an eighth lens element 580, a ninth lens element 590, a IR-cut filter 593 and an image surface 596, wherein the aperture stop 500 is located on an object-side surface 541 of the fourth lens element 540. In addition, the image lens assembly has a configuration of a first lens group G1 (the first lens element 510 and the second lens element 520), a second lens group G2 (the third lens element 530, the fourth lens element 540 and the fifth lens element 550), a third lens group G3 (the sixth lens element 560 and the seventh lens element 570) and a fourth lens group G4 (the eighth lens element 580 and the ninth lens element 590). As shown in FIG. 49 to FIG. 54, in the first through the sixth zooming states, the first lens group G1 and the fourth lens group G4 stay stationary, while the second lens group G2 and the third lens group G3 are movable along an optical axis. The image lens assembly includes nine lens elements (510, 520, 530, 540, 550, 560, 570, 580 and 590) with no additional lens element disposed between each of the adjacent nine lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The image-side surface 512 of the first lens element 510 has at least one inflection point in an off-axis region thereof. The image-side surface 512 of the first lens element 510 has at least one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one inflection point in an off-axis region thereof. The image-side surface 522 of the second lens element 520 has at least one inflection point in an off-axis region thereof. The object-side surface 521 of the second lens element 520 has at least one critical point in an off-axis region thereof.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has at least one inflection point in an off-axis region thereof. The image-side surface 532 of the third lens element 530 has at least one inflection point in an off-axis region thereof.

The fourth lens element 540 with positive refractive power has the object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point in an off-axis region thereof. The image-side surface 542 of the fourth lens element 540 has at least one inflection point in an off-axis region thereof. The object-side surface 541 of the fourth lens element 540 has at least one critical point in an off-axis region thereof.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one inflection point in an off-axis region thereof. The image-side surface 552 of the fifth lens element 550 has at least one critical point in an off-axis region thereof.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one inflection point in an off-axis region thereof. The image-side surface 562 of the sixth lens element 560 has at least one inflection point in an off-axis region thereof. The object-side surface 561 of the sixth lens element 560 has at least one critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has at least one inflection point in an off-axis region thereof. The image-side surface 572 of the seventh lens element 570 has at least one inflection point in an off-axis region thereof.

The eighth lens element 580 with positive refractive power has an object-side surface 581 being convex in a paraxial region thereof and an image-side surface 582 being convex in a paraxial region thereof. The eighth lens element 580 is made of plastic material and has the object-side surface 581 and the image-side surface 582 being both aspheric. The object-side surface 581 of the eighth lens element 580 has at least one inflection point in an off-axis region thereof. The image-side surface 582 of the eighth lens element 580 has at least one inflection point in an off-axis region thereof. The image-side surface 582 of the eighth lens element 580 has at least one critical point in an off-axis region thereof.

The ninth lens element 590 with positive refractive power has an object-side surface 591 being convex in a paraxial region thereof and an image-side surface 592 being convex in a paraxial region thereof. The ninth lens element 590 is made of plastic material and has the object-side surface 591 and the image-side surface 592 being both aspheric. The object-side surface 591 of the ninth lens element 590 has at least one inflection point in an off-axis region thereof. The image-side surface 592 of the ninth lens element 590 has at least one inflection point in an off-axis region thereof. The object-side surface 591 of the ninth lens element 590 has at least one critical point in an off-axis region thereof.

The IR-cut filter 593 is made of glass material and located between the ninth lens element 590 and the image surface 596, and will not affect the focal length of the image lens assembly. The image sensor 599 is disposed on or near the image surface 596 of the image lens assembly.

The detailed optical data of the 5th embodiment are shown in Table 13, the aspheric surface data are shown in Table 14, and changeable values respectively in the first through the sixth zooming states are shown in Table 15 below.

TABLE 13

| 5th Embodiment | | | | | | | |
|---|---|---|---|---|---|---|---|
| Surface # | | Curvature Radius | | Thickness | Material | Index | Abbe # | Focal Length |
| 0 | Object | Plano | | D1 | | | | |
| 1 | Lens 1 | 11.531 | (ASP) | 1.809 | Plastic | 1.705 | 14.0 | 14.91 |
| 2 | | −111.026 | (ASP) | 0.930 | | | | |
| 3 | Lens 2 | 89.372 | (ASP) | 0.644 | Plastic | 1.566 | 37.4 | −4.24 |
| 4 | | 2.329 | (ASP) | D2 | | | | |
| 5 | Lens 3 | 4.529 | (ASP) | 1.703 | Plastic | 1.544 | 56.0 | 4.52 |
| 6 | | −4.668 | (ASP) | 0.047 | | | | |
| 7 | Lens 4 | −20.185 | (ASP) | 1.093 | Plastic | 1.534 | 55.9 | 10.50 |
| 8 | | −4.471 | (ASP) | 0.074 | | | | |

TABLE 13-continued

5th Embodiment

| Surface # | | Curvature Radius | | Thickness | Material | Index | Abbe # | Focal Length |
|---|---|---|---|---|---|---|---|---|
| 9 | Lens 5 | −3.023 | (ASP) | 0.477 | Plastic | 1.669 | 19.4 | −8.26 |
| 10 | | −7.095 | (ASP) | D3 | | | | |
| 11 | Lens 6 | 31.044 | (ASP) | 0.528 | Plastic | 1.614 | 26.0 | −4.70 |
| 12 | | 2.622 | (ASP) | 0.123 | | | | |
| 13 | Lens 7 | 3.109 | (ASP) | 0.831 | Plastic | 1.705 | 14.0 | 11.07 |
| 14 | | 4.598 | (ASP) | D4 | | | | |
| 15 | Lens 8 | 91.313 | (ASP) | 0.877 | Plastic | 1.705 | 14.0 | 14.71 |
| 16 | | −11.656 | (ASP) | 0.604 | | | | |
| 17 | Lens 9 | 349.217 | (ASP) | 1.061 | Plastic | 1.705 | 14.0 | 37.28 |
| 18 | | −28.382 | (ASP) | 1.000 | | | | |
| 19 | IR-cut filter | Plano | | 0.210 | Glass | 1.517 | 64.2 | — |
| 20 | | Plano | | 0.565 | | | | |
| 21 | Image | Plano | | — | | | | |

Note:
Reference wavelength is 587.6 nm (d-line).
An effective radius of the object-side surface 511 (Surface 1) is 2.650 mm.
The aperture stop 500 is located on the object-side surface 541 (Surface 7).
An axial distance between the object and the object-side surface 511 is shown by D1 in Table 15 below.
An axial distance between the image-side surface 522 and the object-side surface 531 is shown by D2 in Table 15 below.
An axial distance between the image-side surface 552 and the object-side surface 561 is shown by D3 in Table 15 below.
An axial distance between the image-side surface 572 and the object-side surface 581 is shown by D4 in Table 15 below.

TABLE 14

Aspheric Coefficients

| Surface # | 1 | 2 | 3 | 4 | 5 | 6 |
|---|---|---|---|---|---|---|
| k= | 6.5791E+00 | 0.0000E+00 | 0.0000E+00 | −6.2536E+00 | 0.0000E+00 | 0.0000E+00 |
| A4= | 1.5712E−03 | 1.1234E−03 | −6.2930E−02 | −2.1185E−02 | −1.0012E−03 | 5.2253E−03 |
| A6= | 2.9583E−04 | 1.6787E−03 | 2.5395E−02 | 1.0437E−02 | 3.4229E−05 | 2.0725E−03 |
| A8= | −8.4036E−05 | −6.4822E−04 | −9.1790E−03 | −3.8681E−03 | −1.0086E−04 | −1.1624E−04 |
| A10= | 1.9437E−05 | 1.6707E−04 | 2.6903E−03 | 1.1248E−03 | 7.5392E−05 | −2.2808E−04 |
| A12= | −2.1142E−06 | −1.8178E−05 | −5.4469E−04 | −2.2815E−04 | −2.7257E−05 | 6.6030E−05 |
| A14= | 1.0798E−07 | 4.2916E−08 | 6.4461E−05 | 2.7194E−05 | 4.2681E−06 | −6.9721E−06 |
| A16= | −9.5477E−10 | 1.2352E−07 | −3.2873E−06 | −1.4017E−06 | −2.7634E−07 | 2.3106E−07 |

| Surface # | 7 | 8 | 9 | 10 | 11 | 12 |
|---|---|---|---|---|---|---|
| k= | 0.0000E+00 | −1.7665E−02 | 0.0000E+00 | 0.0000E+00 | 0.0000E+00 | −1.8634E+00 |
| A4= | −4.8104E−03 | 3.3621E−03 | 4.2884E−02 | 2.8724E−02 | −1.3913E−02 | −1.8136E−02 |
| A6= | 1.8776E−03 | −3.1676E−03 | −1.2245E−02 | −7.0853E−03 | 1.0326E−02 | 2.5056E−02 |
| A8= | 9.7758E−04 | 2.0853E−03 | 3.6009E−03 | 1.4081E−03 | −6.0277E−03 | −1.5650E−02 |
| A10= | −7.5128E−04 | −7.7914E−04 | −8.4921E−04 | −1.7863E−04 | 2.1674E−03 | 4.0827E−03 |
| A12= | 1.8688E−04 | 1.7262E−04 | 1.4960E−04 | 1.0392E−05 | −4.4322E−04 | 7.8883E−05 |
| A14= | −1.9686E−05 | −2.0442E−05 | −1.7186E−05 | −4.5571E−07 | 4.3945E−05 | −2.3637E−04 |
| A16= | 7.7458E−07 | 1.0601E−06 | 9.1913E−07 | 6.9208E−08 | −1.4018E−06 | 3.1146E−05 |

| Surface # | 13 | 14 | 15 | 16 | 17 | 18 |
|---|---|---|---|---|---|---|
| k= | 0.0000E+00 | 0.0000E+00 | 0.0000E+00 | 0.0000E+00 | 0.0000E+00 | 0.0000E+00 |
| A4= | −1.0976E−02 | −1.4697E−02 | 2.2318E−02 | 2.9470E−02 | −1.6032E−02 | −3.4302E−02 |
| A6= | 8.9610E−03 | −1.6832E−03 | −1.9407E−03 | 5.5576E−03 | 1.7984E−02 | 1.6547E−02 |
| A8= | −5.2571E−03 | 9.9841E−04 | −2.3626E−04 | −2.5599E−03 | −6.1357E−03 | −4.5114E−03 |
| A10= | 2.3815E−04 | −6.3960E−04 | 9.4309E−05 | 3.1156E−04 | 1.1311E−03 | 6.6292E−04 |
| A12= | 8.0676E−04 | 3.4194E−04 | −2.1878E−05 | −5.8157E−06 | −1.1620E−04 | −4.5934E−05 |
| A14= | −2.7494E−04 | −8.4031E−05 | 2.8060E−06 | −1.7574E−06 | 6.0371E−06 | 4.9918E−07 |
| A16= | 2.7841E−05 | 8.0749E−06 | −1.4760E−07 | 1.0487E−07 | −1.1358E−07 | 6.9021E−08 |

TABLE 15

Changeable Values

| Zooming State # | f [mm] | Fno | HFOV [deg.] | D1 [mm] | D2 [mm] | D3 [mm] | D4 [mm] |
|---|---|---|---|---|---|---|---|
| 1 | 8.60 | 3.37 | 13.4 | Infinite | 6.323 | 1.742 | 5.367 |
| 2 | 11.00 | 3.83 | 10.4 | Infinite | 4.880 | 2.324 | 6.223 |

TABLE 15-continued

Changeable Values

| Zooming State # | f [mm] | Fno | HFOV [deg.] | D1 [mm] | D2 [mm] | D3 [mm] | D4 [mm] |
|---|---|---|---|---|---|---|---|
| 3 | 13.40 | 4.28 | 8.6 | Infinite | 3.798 | 3.071 | 6.558 |
| 4 | 24.06 | 5.34 | 4.7 | Infinite | 0.578 | 10.863 | 1.986 |
| 5 | 8.60 | 3.38 | 13.4 | 500.000 | 6.323 | 1.795 | 5.319 |
| 6 | 22.25 | 5.24 | 4.9 | 500.000 | 0.578 | 11.711 | 1.133 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 13, Table 14 and Table 15 as the following values and satisfy the following conditions:

| 5th Embodiment | | | |
|---|---|---|---|
| f [mm] | 8.60-24.06 | V7/N7 | 8.2 |
| Fno | 3.37-5.34 | V8/N8 | 8.2 |
| HFOV [deg.] | 4.7-13.4 | V9/N9 | 8.2 |
| FOV_max [deg.] | 26.8 | V1 + V2 | 51.44 |
| FOV_min [deg.] | 9.4 | V40 | 7 |
| FOV_max/FOV_min | 2.85 | Dr1r4/Dr15r18 | 1.33 |
| f1/|f2| | 3.52 | ΔT23 [mm] | 5.75 |
| V1/N1 | 8.2 | Dr1r4/ΔT23 | 0.59 |
| V2/N2 | 23.9 | ΣCT/ΣAT | 0.59 |
| V3/N3 | 36.3 | BL/ImgH | 0.87 |
| V4/N4 | 36.5 | Y1R1/ImgH | 1.30 |
| V5/N5 | 11.6 | Y1R1/SD_Stop | 1.18 |
| V6/N6 | 16.1 | — | — |

6th Embodiment

FIG. 61 to FIG. 66 are schematic views of a zoom image capturing unit respectively in the first through the sixth zooming states according to the 6th embodiment of the present disclosure. FIG. 67 to FIG. 72 respectively show, in order from left to right, spherical aberration curves, astigmatic field curves and distortion curves of the zoom image capturing unit in the first through the sixth zooming states according to the 6th embodiment. In FIG. 61 to FIG. 66, the zoom image capturing unit includes the image lens assembly (its reference numeral is omitted) of the present disclosure and an image sensor 699. The image lens assembly includes, in order from an object side to an image side along an optical path, a first lens element 610, a second lens element 620, a third lens element 630, an aperture stop 600, a fourth lens element 640, a fifth lens element 650, a sixth lens element 660, a seventh lens element 670, an eighth lens element 680, a ninth lens element 690, a IR-cut filter 693 and an image surface 696, wherein the aperture stop 600 is located on an object-side surface 641 of the fourth lens element 640. In addition, the image lens assembly has a configuration of a first lens group G1 (the first lens element 610 and the second lens element 620), a second lens group G2 (the third lens element 630, the fourth lens element 640 and the fifth lens element 650), a third lens group G3 (the sixth lens element 660 and the seventh lens element 670) and a fourth lens group G4 (the eighth lens element 680 and the ninth lens element 690). As shown in FIG. 61 to FIG. 66, in the first through the sixth zooming states, the first lens group G1 and the fourth lens group G4 stay stationary, while the second lens group G2 and the third lens group G3 are movable along an optical axis. The image lens assembly includes nine lens elements (610, 620, 630, 640, 650, 660, 670, 680 and 690) with no additional lens element disposed between each of the adjacent nine lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The image-side surface 622 of the second lens element 620 has at least one inflection point in an off-axis region thereof.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The image-side surface 632 of the third lens element 630 has at least one inflection point in an off-axis region thereof. The image-side surface 632 of the third lens element 630 has at least one critical point in an off-axis region thereof.

The fourth lens element 640 with positive refractive power has the object-side surface 641 being convex in a paraxial region thereof and an image-side surface 642 being convex in a paraxial region thereof. The fourth lens element 640 is made of glass material and has the object-side surface 641 and the image-side surface 642 being both spherical.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has at least one inflection point in an off-axis region thereof.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point in an off-axis region thereof. The object-side surface 661 of the sixth lens element 660 has at least one critical point in an off-axis region thereof.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has at least one inflection point in an off-axis region thereof. The image-side surface 672 of the seventh lens element 670 has at least one inflection point in an off-axis region thereof. The image-side surface 672 of the seventh lens element 670 has at least one critical point in an off-axis region thereof.

The eighth lens element 680 with positive refractive power has an object-side surface 681 being concave in a paraxial region thereof and an image-side surface 682 being convex in a paraxial region thereof. The eighth lens element 680 is made of plastic material and has the object-side surface 681 and the image-side surface 682 being both aspheric. The object-side surface 681 of the eighth lens element 680 has at least one inflection point in an off-axis region thereof. The image-side surface 682 of the eighth lens element 680 has at least one inflection point in an off-axis region thereof.

The ninth lens element 690 with negative refractive power has an object-side surface 691 being convex in a paraxial region thereof and an image-side surface 692 being concave in a paraxial region thereof. The ninth lens element 690 is made of plastic material and has the object-side surface 691 and the image-side surface 692 being both aspheric. The object-side surface 691 of the ninth lens element 690 has at least one inflection point in an off-axis region thereof. The image-side surface 692 of the ninth lens element 690 has at least one inflection point in an off-axis region thereof. The object-side surface 691 of the ninth lens element 690 has at least one critical point in an off-axis region thereof. The image-side surface 692 of the ninth lens element 690 has at least one critical point in an off-axis region thereof.

The IR-cut filter 693 is made of glass material and located between the ninth lens element 690 and the image surface 696, and will not affect the focal length of the image lens assembly. The image sensor 699 is disposed on or near the image surface 696 of the image lens assembly.

The detailed optical data of the 6th embodiment are shown in Table 16, the aspheric surface data are shown in Table 17, and changeable values respectively in the first through the sixth zooming states are shown in Table 18 below.

TABLE 16

6th Embodiment

| Surface # | | Curvature Radius | | Thickness | Material | Index | Abbe # | Focal Length |
|---|---|---|---|---|---|---|---|---|
| 0 | Object | Plano | | D1 | | | | |
| 1 | Lens 1 | 7.616 | (ASP) | 1.380 | Plastic | 1.660 | 20.4 | 12.68 |
| 2 | | 78.824 | (ASP) | 0.384 | | | | |
| 3 | Lens 2 | −199.994 | (ASP) | 0.466 | Plastic | 1.566 | 37.4 | −5.29 |
| 4 | | 3.043 | (ASP) | D2 | | | | |
| 5 | Lens 3 | 3.266 | (ASP) | 1.031 | Plastic | 1.544 | 56.0 | 4.89 |
| 6 | | −12.752 | (ASP) | 0.035 | | | | |
| 7 | Lens 4 | 12.592 | (SPH) | 0.962 | Glass | 1.517 | 64.2 | 8.86 |
| 8 | | −7.008 | (SPH) | 0.035 | | | | |
| 9 | Lens 5 | −4.574 | (ASP) | 0.620 | Plastic | 1.639 | 23.5 | −6.75 |
| 10 | | 77.620 | (ASP) | D3 | | | | |
| 11 | Lens 6 | −1015723.035 | (ASP) | 0.450 | Plastic | 1.639 | 23.5 | −4.07 |
| 12 | | 2.596 | (ASP) | 0.221 | | | | |
| 13 | Lens 7 | 2.868 | (ASP) | 0.889 | Plastic | 1.660 | 20.4 | 5.04 |
| 14 | | 18.164 | (ASP) | D4 | | | | |
| 15 | Lens 8 | −4.468 | (ASP) | 0.905 | Plastic | 1.660 | 20.4 | 17.46 |
| 16 | | −3.479 | (ASP) | 0.202 | | | | |
| 17 | Lens 9 | 11.796 | (ASP) | 0.613 | Plastic | 1.534 | 56.0 | −29.26 |
| 18 | | 6.601 | (ASP) | 1.000 | | | | |
| 19 | IR-cut filter | Plano | | 0.210 | Glass | 1.517 | 64.2 | — |
| 20 | | Plano | | 1.142 | | | | |
| 21 | Image | Plano | | — | | | | |

Note:
Reference wavelength is 587.6 nm (d-line).
An effective radius of the object-side surface 611 (Surface 1) is 2.200 mm.
The aperture stop 600 is located on the object-side surface 641 (Surface 7).
An axial distance between the object and the object-side surface 611 is shown by D1 in Table 18 below.
An axial distance between the image-side surface 622 and the object-side surface 631 is shown by D2 in Table 18 below.
An axial distance between the image-side surface 652 and the object-side surface 661 is shown by D3 in Table 18 below.
An axial distance between the image-side surface 672 and the object-side surface 681 is shown by D4 in Table 18 below.

TABLE 17

Aspheric Coefficients

| Surface # | 1 | 2 | 3 | 4 | 5 | 6 |
|---|---|---|---|---|---|---|
| k= | 2.0981E+00 | 0.0000E+00 | 0.0000E+00 | −4.2687E+00 | 0.0000E+00 | 0.0000E+00 |
| A4= | 1.0819E−03 | 1.0908E−03 | −3.9999E−02 | −2.9130E−02 | −1.6362E−03 | 4.7920E−03 |
| A6= | −6.9314E−05 | −9.4708E−04 | 9.2974E−03 | 1.0860E−02 | 4.4116E−04 | 1.8100E−03 |
| A8= | 1.0066E−04 | 5.3641E−04 | −7.3642E−04 | −1.9713E−03 | −6.8405E−05 | −2.7973E−04 |

TABLE 17-continued

| Aspheric Coefficients | | | | | |
|---|---|---|---|---|---|
| A10= | −1.0098E−06 | 1.2022E−05 | — | 1.2791E−04 | — | — |

| Surface # | 9 | 10 | 11 | 12 | 13 | 14 |
|---|---|---|---|---|---|---|
| k= | 0.0000E+00 | 0.0000E+00 | 0.0000E+00 | −1.7432E+00 | 0.0000E+00 | 0.0000E+00 |
| A4= | 3.3833E−02 | 3.5423E−02 | 4.1714E−03 | 1.9828E−03 | −1.5676E−02 | −4.7437E−03 |
| A6= | −2.7859E−03 | −6.1046E−04 | −2.4381E−03 | −2.7243E−03 | −2.0503E−04 | −3.2715E−04 |
| A8= | −5.8112E−05 | −5.1062E−05 | 1.5116E−04 | 3.9393E−04 | — | — |

| Surface # | 15 | 16 | 17 | 18 |
|---|---|---|---|---|
| k= | 0.0000E+00 | 0.0000E+00 | 0.0000E+00 | 0.0000E+00 |
| A4= | 1.0237E−02 | 2.9673E−03 | −3.8175E−02 | −3.5982E−02 |
| A6= | 1.3445E−03 | 2.4435E−03 | 1.9989E−03 | 2.5527E−03 |
| A8= | −1.2466E−04 | −1.4563E−04 | 1.6342E−04 | 5.8310E−05 |

TABLE 18

| Changeable Values | | | | | | | |
|---|---|---|---|---|---|---|---|
| Zooming State # | f [mm] | Fno | HFOV [deg.] | D1 [mm] | D2 [mm] | D3 [mm] | D4 [mm] |
| 1 | 8.51 | 3.24 | 13.7 | Infinite | 4.509 | 1.371 | 2.372 |
| 2 | 11.51 | 3.85 | 10.0 | Infinite | 2.658 | 0.827 | 4.763 |
| 3 | 13.61 | 4.22 | 8.5 | Infinite | 1.679 | 1.050 | 5.519 |
| 4 | 17.00 | 4.76 | 6.8 | Infinite | 0.470 | 1.983 | 5.805 |
| 5 | 8.43 | 3.25 | 13.6 | 500.000 | 4.509 | 1.602 | 2.142 |
| 6 | 16.62 | 4.82 | 6.7 | 500.000 | 0.470 | 2.594 | 5.194 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 16, Table 17 and Table 18 as the following values and satisfy the following conditions:

| 6th Embodiment | | | |
|---|---|---|---|
| f [mm] | 8.43–17.00 | V7/N7 | 12.3 |
| Fno | 3.24–4.82 | V8/N8 | 12.3 |
| HFOV [deg.] | 6.7–13.7 | V9/N9 | 36.5 |
| FOV_max [deg.] | 27.4 | V1 + V2 | 57.84 |
| FOV_min [deg.] | 13.4 | V40 | 6 |
| FOV_max/FOV_min | 2.04 | Dr1r4/Dr15r18 | 1.30 |
| f1/|f2| | 2.40 | ΔT23 [mm] | 4.04 |
| V1/N1 | 12.3 | Dr1r4/ΔT23 | 0.55 |
| V2/N2 | 23.9 | ΣCT/ΣΔT | 0.80 |
| V3/N3 | 36.3 | BL/ImgH | 1.15 |
| V4/N4 | 42.3 | Y1R1/ImgH | 1.08 |
| V5/N5 | 14.3 | Y1R1/SD_Stop | 1.28 |
| V6/N6 | 14.3 | — | — |

7th Embodiment

Figure 73:
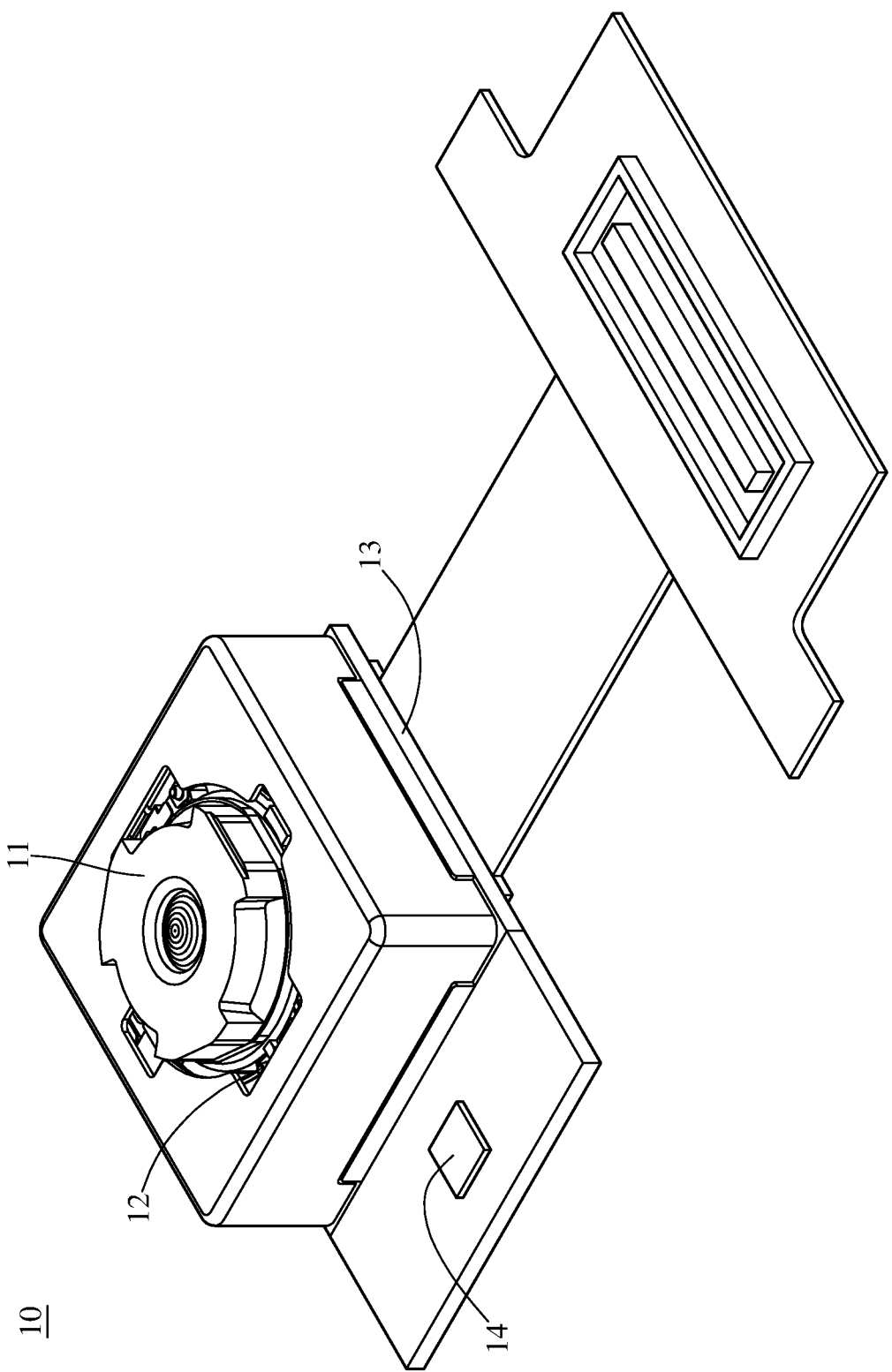
FIG. 73 is a perspective view of a zoom image capturing unit according to the 7th embodiment of the present disclosure.

FIG. 73 is a perspective view of a zoom image capturing unit according to the 7th embodiment of the present disclosure. In this embodiment, a zoom image capturing unit 10 is a camera module including a lens unit 11, a driving device 12, an image sensor 13 and an image stabilizer 14. The lens unit 11 includes the image lens assembly disclosed in the 1st embodiment, a barrel and a holder member (their reference numerals are omitted) for holding the image lens assembly. However, the lens unit 11 may alternatively be provided with the image lens assembly disclosed in other abovementioned embodiments, and the present disclosure is not limited thereto. The imaging light converges in the lens unit 11 of the zoom image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors, micro electromechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the image lens assembly to provide higher image quality.

The image stabilizer 14, such as an accelerometer, a gyro sensor and a Hall Effect sensor, is configured to work with the driving device 12 to provide optical image stabilization (01S). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

8th Embodiment

Figure 74:
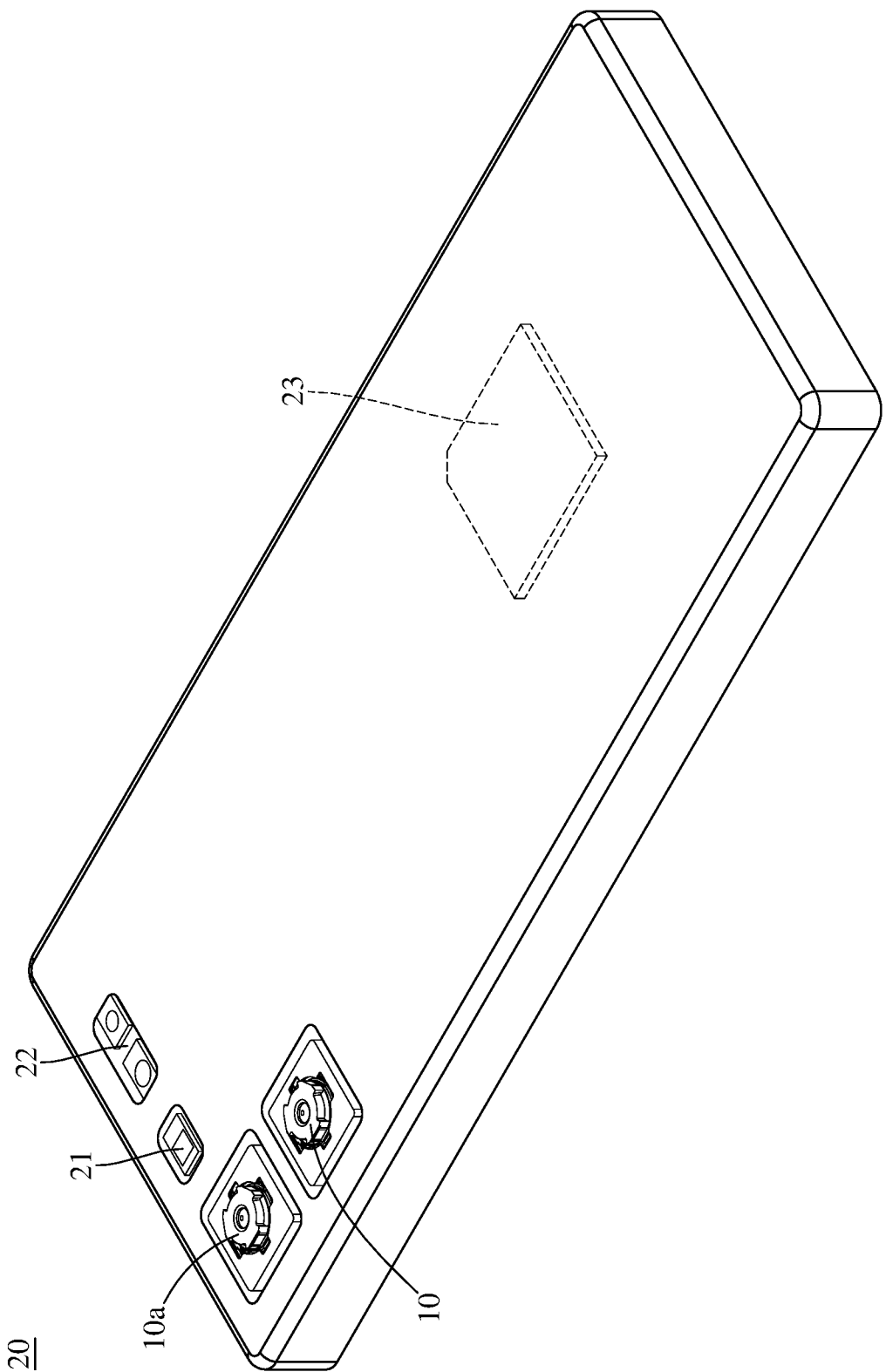
FIG. 74 is one perspective view of an electronic device according to the 8th embodiment of the present disclosure.

FIG. 74 is one perspective view of an electronic device according to the 8th embodiment of the present disclosure.

Figure 75:
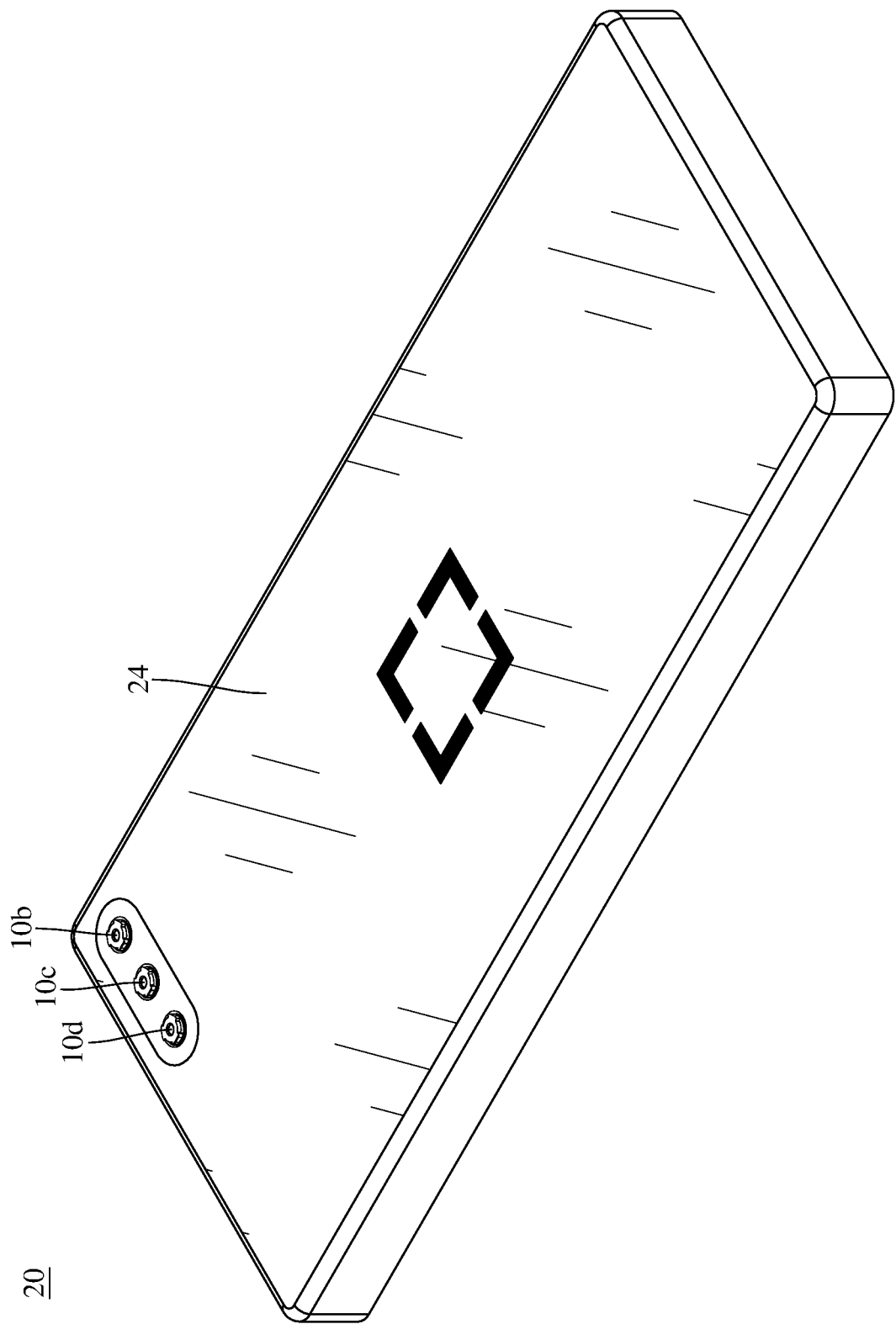
FIG. 75 is another perspective view of the electronic device in FIG. 74.
Figure 76:
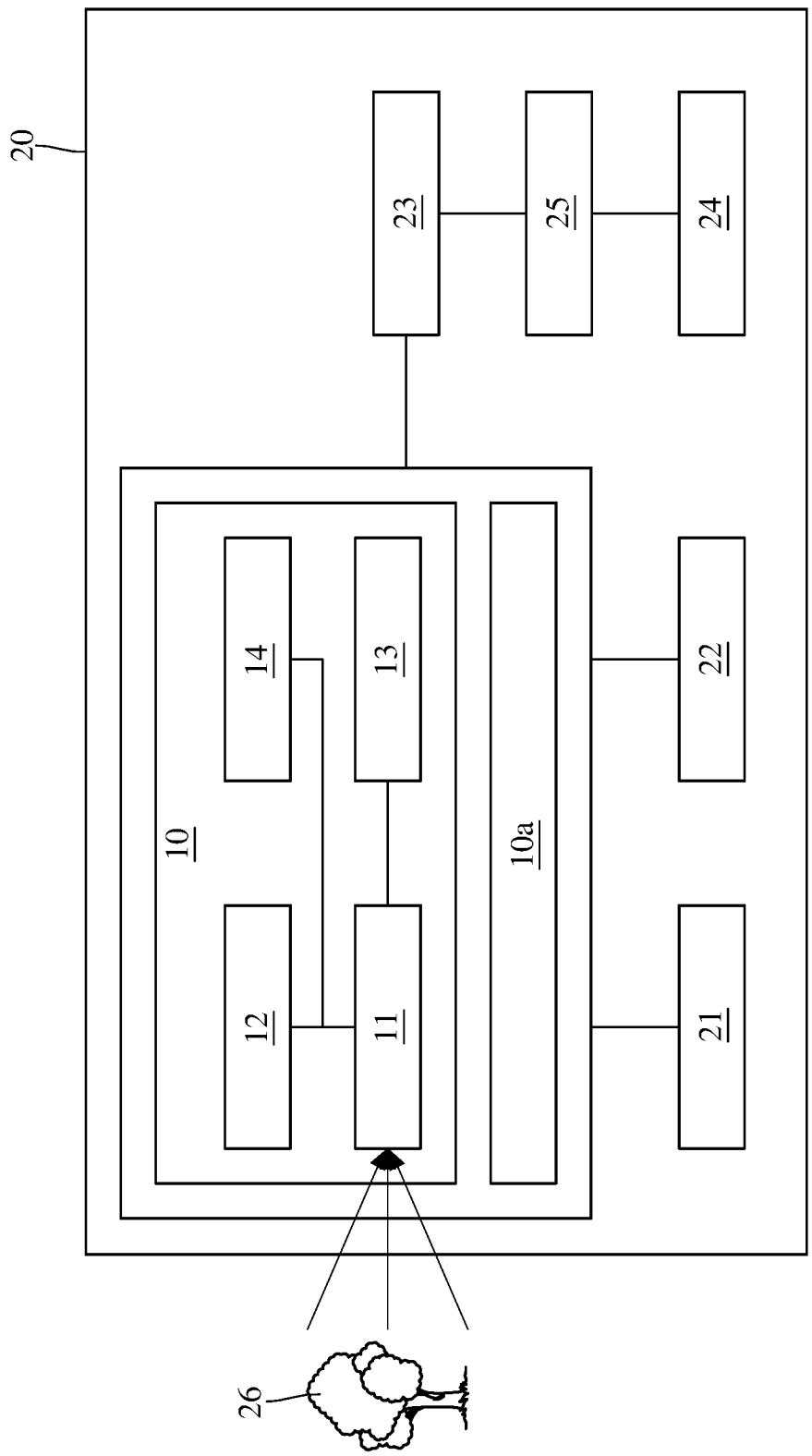
FIG. 76 is a block diagram of the electronic device in FIG. 74.

FIG. 75 is another perspective view of the electronic device in FIG. 74. FIG. 76 is a block diagram of the electronic device in FIG. 74.

In this embodiment, an electronic device 20 is a smartphone including the zoom image capturing unit 10 disclosed in the 7th embodiment, a fixed-focus image capturing unit 10a, a fixed-focus image capturing unit 10b, a fixed-focus image capturing unit 10c, a fixed-focus image capturing unit 10d, a flash module 21, a focus assist module 22, an image signal processor 23, a user interface 24 and an image software processor 25. The zoom image capturing unit 10 and the fixed-focus image capturing unit 10a face the same side of the electronic device 20. The optical axis of the zoom image capturing unit 10 is perpendicular to the optical axis of the fixed-focus image capturing unit 10a. The fixed-focus image capturing unit 10b, the fixed-focus image capturing unit 10c, the fixed-focus image capturing unit 10d and the user interface 24 are disposed on the opposite side of the electronic device 20 and the user interface 24 is a display unit, such that the fixed-focus image capturing units 10b, 10c, 10d can be front-facing cameras of the electronic device 20 for taking selfies, but the present disclosure is not limited thereto. Furthermore, each of the fixed-focus image capturing units 10a, 10b, 10c and 10d can include a lens unit, a driving device, an image sensor and an image stabilizer, and each of the lens unit can include a fixed-focus optical lens assembly, a barrel and a holder member for holding the fixed-focus optical lens assembly.

The zoom image capturing unit 10 is a telephoto image capturing unit, the fixed-focus image capturing unit 10a is a wide-angle image capturing unit, the fixed-focus image capturing unit 10b is a wide-angle image capturing unit, the fixed-focus image capturing unit 10c is an ultra-wide-angle image capturing unit, and the fixed-focus image capturing unit 10d is a ToF (time of flight) image capturing unit. In this embodiment, the image capturing units 10, 10a have different fields of view, such that the electronic device 20 can have various magnification ratios so as to meet the requirement of optical zoom functionality. When a maximum value among maximum fields of view of the fixed-focus image capturing unit 10a is DFOV, and the maximum value among maximum fields of view of the image lens assembly of the zoom image capturing unit 10 within the zoom range is FOV_max, the following condition is satisfied: 40 [deg.]<DFOV−FOV_max. Therefore, it is favorable for integrating functions of a large field of view and zoom so as to increase application breadth thereof. In addition, the fixed-focus image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the zoom image capturing unit 10 or the fixed-focus image capturing unit 10a to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the fixed-focus image capturing unit 10b, 10c or 10d to generate an image(s). The user interface 24 can be a touch screen or a physical button. The user is able to interact with the user interface 24 and the image software processor 25 having multiple functions to capture images and complete image processing. The image processed by the image software processor 25 can be displayed on the user interface 24.

9th Embodiment

Figure 77:
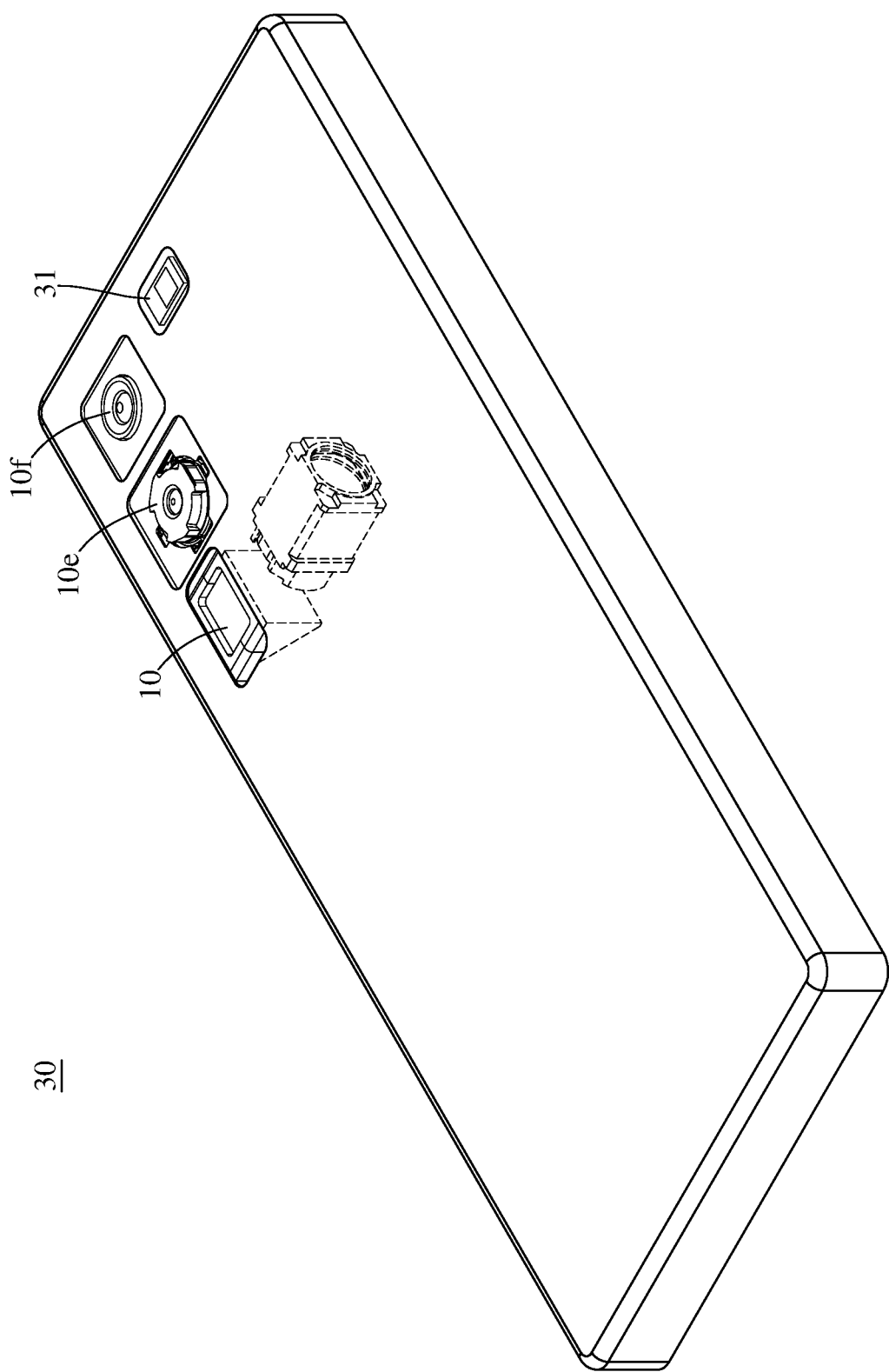
FIG. 77 is one perspective view of an electronic device according to the 9th embodiment of the present disclosure.

FIG. 77 is one perspective view of an electronic device according to the 9th embodiment of the present disclosure.

In this embodiment, an electronic device 30 is a smartphone including the zoom image capturing unit 10 disclosed in the 7th embodiment, a fixed-focus image capturing unit 10e, a fixed-focus image capturing unit 10f, a flash module 31, a focus assist module, an image signal processor, a display unit and an image software processor (not shown). The zoom image capturing unit 10, the fixed-focus image capturing unit 10e and the fixed-focus image capturing unit 10f face the same side of the electronic device 30, while the display unit is disposed on the opposite side of the electronic device 30. The optical axis of the zoom image capturing unit 10 is perpendicular to the optical axis of the fixed-focus image capturing unit 10e and the optical axis of the fixed-focus image capturing unit 10f. Furthermore, each of the fixed-focus image capturing units 10e and 10f can include a lens unit, a driving device, an image sensor and an image stabilizer, and each of the lens unit can include a fixed-focus optical lens assembly, a barrel and a holder member for holding the fixed-focus optical lens assembly.

The zoom image capturing unit 10 is a telephoto image capturing unit, the fixed-focus image capturing unit 10e is a wide-angle image capturing unit, and the fixed-focus image capturing unit 10f is an ultra-wide-angle image capturing unit. In this embodiment, the image capturing units 10, 10e and 10f have different fields of view, such that the electronic device 30 can have various magnification ratios so as to meet the requirement of optical zoom functionality. When a maximum value among maximum fields of view of the fixed-focus image capturing unit 10e and the fixed-focus image capturing unit 10f is DFOV, and the maximum value among maximum fields of view of the image lens assembly of the zoom image capturing unit 10 within the zoom range is FOV_max, the following condition is satisfied: 60 [deg.]<DFOV−FOV_max. Therefore, it is favorable for featuring the zoom function with a large field of view. Moreover, the zoom image capturing unit 10 can be a telephoto image capturing unit having a reflective element configuration, such that the total track length of the zoom image capturing unit 10 is not limited by the thickness of the electronic device 30. Moreover, the reflective element configuration of the zoom image capturing unit 10 can be similar to, for example, one of the structures shown in FIG. 80 to FIG. 82 which can be referred to foregoing descriptions corresponding to FIG. 80 to FIG. 82 so the details in this regard will not be provided again. In this embodiment, the electronic device 30 includes multiple image capturing units 10, 10e and 10f, but the present disclosure is not limited to the number and arrangement of image capturing units. When a user captures images of an object, light rays converge in the image capturing unit 10, 10e or 10f to generate image(s), and the flash module is activated for light supplement. Further, the subsequent processes are performed in a manner similar to the abovementioned embodiment, so the details in this regard will not be provided again.

10th Embodiment

Figure 78:
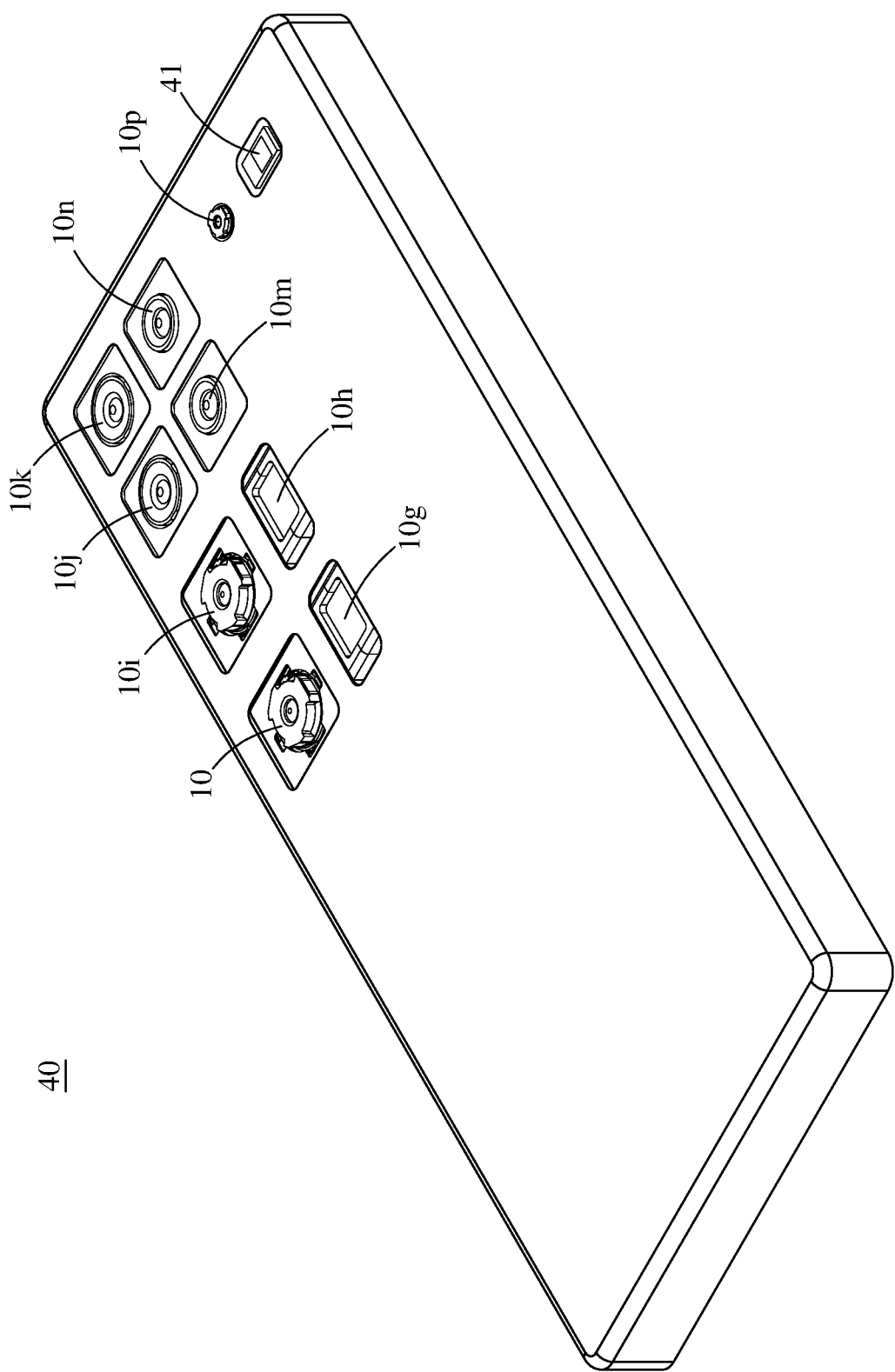
FIG. 78 is one perspective view of an electronic device according to the 10th embodiment of the present disclosure.

FIG. 78 is one perspective view of an electronic device according to the 10th embodiment of the present disclosure.

In this embodiment, an electronic device 40 is a smartphone including the zoom image capturing unit 10 disclosed in the 7th embodiment, a fixed-focus image capturing unit 10g, a fixed-focus image capturing unit 10h, a fixed-focus image capturing unit 10i, a fixed-focus image capturing unit 10j, a fixed-focus image capturing unit 10k, a fixed-focus image capturing unit 10m, a fixed-focus image capturing unit 10n, a fixed-focus image capturing unit 10p, a flash module 41, a focus assist module, an image signal processor, a display unit and an image software processor (not shown). The image capturing units 10, 10g, 10h, 10i, 10j, 10k, 10m, 10n and 10p face the same side of the electronic device 40, while the display unit faces the opposite side of the electronic device 40. The optical axis of the zoom image capturing unit 10 is perpendicular to the optical axes of the fixed-focus image capturing units 10g, 10h, 10i, 10j, 10k, 10m, 10n and 10p. Furthermore, each of the fixed-focus image capturing units 10g, 10h, 10i, 10j, 10k, 10m, 10n and 10p can include a lens unit, a driving device, an image sensor and an image stabilizer, and each of the lens unit can include a fixed-focus optical lens assembly, a barrel and a holder member for holding the fixed-focus optical lens assembly.

The zoom image capturing unit 10 is a telephoto image capturing unit, the fixed-focus image capturing unit 10g is a telephoto image capturing unit, the fixed-focus image capturing unit 10h is a telephoto image capturing unit, the fixed-focus image capturing unit 10i is a wide-angle image capturing unit, the fixed-focus image capturing unit 10j is an ultra-wide-angle image capturing unit, the fixed-focus image capturing unit 10k is an ultra-wide-angle image capturing unit, the fixed-focus image capturing unit 10m is a telephoto image capturing unit, the fixed-focus image capturing unit 10n is a telephoto image capturing unit, and the fixed-focus image capturing unit 10p is a ToF image capturing unit. In this embodiment, the image capturing units 10, 10g, 10h, 10i, 10j, 10k, 10m and 10n have different fields of view, such that the electronic device 40 can have various magnification ratios so as to meet the requirement of optical zoom functionality. When a maximum value among maximum fields of view of the fixed-focus image capturing unit 10g, fixed-focus image capturing unit 10h, fixed-focus image capturing unit 10i, fixed-focus image capturing unit 10j, fixed-focus image capturing unit 10k, fixed-focus image capturing unit 10m and the fixed-focus image capturing unit 10n is DFOV, and the maximum value among maximum fields of view of the image lens assembly of the zoom image capturing unit 10 within the zoom range is FOV_max, the following condition is satisfied: 60 [deg.]<DFOV−FOV_max. Therefore, it is favorable for featuring the zoom function with a large field of view. Moreover, each of the image capturing units 10, 10g and 10h can be a telephoto image capturing unit having a reflective element configuration. Moreover, the reflective element configuration of each of the image capturing units 10, 10g and 10h can be similar to, for example, one of the structures shown in FIG. 80 to FIG. 82 which can be referred to foregoing descriptions corresponding to FIG. 80 to FIG. 82 so the details in this regard will not be provided again. In addition, the fixed-focus image capturing unit 10p can determine depth information of the imaged object. In this embodiment, the electronic device 40 includes multiple image capturing units 10, 10g, 10h, 10i, 10j, 10k, 10m, 10n and 10p, but the present disclosure is not limited to the number and arrangement of image capturing units. When a user captures images of an object, light rays converge in the zoom image capturing unit 10, 10g, 10h, 10i, 10j, 10k, 10m, 10n or 10p to generate image(s), and the flash module 41 is activated for light supplement. Further, the subsequent processes are performed in a manner similar to the abovementioned embodiments, so the details in this regard will not be provided again.

The smartphone in this embodiment is only exemplary for showing the zoom image capturing unit 10 of the present disclosure installed in an electronic device, and the present disclosure is not limited thereto. The zoom image capturing unit 10 can be optionally applied to optical systems with a movable focus. Furthermore, the image lens assembly of the zoom image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising four lens groups, the four lens groups being, in order from an object side to an image side along an optical path, a first lens group, a second lens group, a third lens group and a fourth lens group; the four lens groups comprising a total number of nine lens elements, the nine lens elements being, in order from the object side to the image side along the optical path, a first lens element, a second lens element, a third lens element, a fourth lens element, a fifth lens element, a sixth lens element, a seventh lens element, an eighth lens element and a ninth lens element; the first lens group comprising the first lens element and the second lens element, the second lens group comprising the third lens element, the fourth lens element and the fifth lens element, the third lens group comprising the sixth lens element and the seventh lens element, and the fourth lens group comprising the eighth lens element and the ninth lens element;

wherein the first lens element has positive refractive power, the second lens element has negative refractive power, at least one of an object-side surface and an image-side surface of at least one lens element of the image lens assembly has at least one inflection point in an off-axis region thereof, and at least five lens elements of the image lens assembly are made of plastic material;

wherein when the image lens assembly is focusing or zooming, an axial distance between the first lens group and the fourth lens group remains a constant, an axial distance between the fourth lens group and an image surface remains a constant, while the second lens group and the third lens group move along an optical axis;

wherein when the image lens assembly is focusing or zooming, the third lens element counted from the object side moves with respect to each of two fixed lens elements that are the first lens element counted from the object side and the ninth lens element counted from the object side;

wherein a maximum value among fields of view of the image lens assembly within a zoom range is FOV_max, a minimum value among fields of view of the image lens assembly within the zoom range is FOV_min, and the following conditions are satisfied:

FOV_max<50[deg.]; and 1.25<FOV_max/FOV_min<6.0.

2. The image lens assembly of claim 1, wherein an axial distance between an image-side surface of the ninth lens element and the image surface is BL, a maximum image height of the image lens assembly is ImgH, and the following condition is satisfied:

$BL/\mathrm{ImgH}<2.0$.

3. The image lens assembly of claim 1, wherein a focal length of the first lens element is f1, a focal length of the second lens element is f2, and the following condition is satisfied:

$1.5<f1/|f2|$.

4. The image lens assembly of claim 1, wherein the maximum value among fields of view of the image lens assembly within the zoom range is FOV_max, the minimum value among fields of view of the image lens assembly within the zoom range is FOV_min, and the following condition is satisfied:

1.5<FOV_max/FOV_min<5.0.

5. The image lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the ninth lens element is V9, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the ninth lens element is N9, a refractive index of the i-th lens element is Ni, and at least two lens elements of the image lens assembly satisfy the following condition:

$6.0<Vi/Ni<12.5$, wherein $i=1, 2, 3, 4, 5, 6, 7, 8$, or 9.

6. The image lens assembly of claim 1, wherein an Abbe number of the first lens element is V1, an Abbe number of the second lens element is V2, and the following condition is satisfied:

$V1+V2<60$.

7. The image lens assembly of claim 1, wherein a maximum effective radius of an object-side surface of the first lens element within the zoom range is Y1R1, a maximum image height of the image lens assembly is ImgH, and the following condition is satisfied:

$Y1R1/\mathrm{ImgH}<1.5$.

8. The image lens assembly of claim 1, further comprising an aperture stop, wherein a maximum effective radius of an object-side surface of the first lens element within the zoom range is Y1R1, an aperture radius of the aperture stop is SD_Stop, and the following condition is satisfied:

$Y1R1/SD\_Stop<2.0$.

9. The image lens assembly of claim 1, wherein a total number of lens elements having an Abbe number smaller than 40 in the image lens assembly is V40, and the following condition is satisfied:

$5 \leq V40$.

10. The image lens assembly of claim 1, wherein at least one of an object-side surface and an image-side surface of at least one lens element of the image lens assembly has at least one critical point in an off-axis region thereof.

11. The image lens assembly of claim 1, further comprising an aperture stop located in the second lens group.

12. The image lens assembly of claim 1, wherein at least one lens element of the image lens assembly is made of glass material and has both an object-side surface and an image-side surface being spherical.

13. The image lens assembly of claim 1, wherein there are two lens elements with positive refractive power and one lens element with negative refractive power in the second lens group; and there are one lens element with positive refractive power and one lens element with negative refractive power in the third lens group.

14. The image lens assembly of claim 1, wherein a sum of central thicknesses of all lens elements of the image lens assembly is ΣCT, a sum of axial distances between each of all adjacent lens elements of the image lens assembly is ΣAT, and the following condition is satisfied:

$\Sigma CT/\Sigma AT<1.0$.

15. The image lens assembly of claim 1, wherein an axial distance between an object-side surface of the first lens element and an image-side surface of the second lens element is Dr1r4, an axial distance between the second lens element and the third lens element while the image lens assembly is at a maximum field of view with an object distance at infinity is T23_frmax, an axial distance between the second lens element and the third lens element while the image lens assembly is at a minimum field of view with an object distance at infinity is T23_frmin, a difference between T23_frmax and T23_frmin is ΔT23, and the following condition is satisfied:

$Dr1r4/\Delta T23<1.5$.

16. The image lens assembly of claim 1, wherein an axial distance between an object-side surface of the first lens element and an image-side surface of the second lens element is Dr1r4, an axial distance between an object-side surface of the eighth lens element and an image-side surface of the ninth lens element is Dr15r18, and the following condition is satisfied:

$0.90<Dr1r4/Dr15r18<2.75$.

17. A zoom image capturing unit, comprising:
the image lens assembly of claim 1; and
an image sensor disposed on the image surface of the image lens assembly.

18. An electronic device, comprising:
the zoom image capturing unit of claim 17; and
at least one fixed-focus image capturing unit;
wherein the zoom image capturing unit and the at least one fixed-focus image capturing unit face a same side of the electronic device; the at least one fixed-focus image capturing unit comprises an optical axis perpendicular to the optical axis of the zoom image capturing unit;
wherein a maximum value among fields of view of the at least one fixed-focus image capturing unit is DFOV, the maximum value among fields of view of the image lens assembly within the zoom range is FOV_max, and the following condition is satisfied:

40[deg.]<DFOV-FOV_max.

19. The electronic device of claim 18, wherein the zoom image capturing unit comprises at least one reflective element disposed between an imaged object and the four lens groups of the image lens assembly.

20. The electronic device of claim 18, wherein there are at least two of the at least one fixed-focus image capturing unit;
wherein the maximum value among fields of view of the at least two fixed-focus image capturing units is DFOV, the maximum value among fields of view of the image lens assembly within the zoom range is FOV_max, and the following condition is satisfied:

60[deg.]<DFOV-FOV_max.

21. An electronic device comprising a zoom image capturing unit and at least one fixed-focus image capturing unit;
wherein the zoom image capturing unit and the at least one fixed-focus image capturing unit face a same side of the electronic device; the zoom image capturing unit comprises an image lens assembly, the zoom image capturing unit comprises an optical axis perpendicular to an optical axis of the at least one fixed-focus image capturing unit;
wherein the image lens assembly comprises four lens groups, the four lens groups being, in order from an object side to an image side along an optical path, a first lens group, a second lens group, a third lens group and a fourth lens group; the four lens groups comprises a total number of nine lens elements, the nine lens elements being, in order from the object side to the image side along the optical path, a first lens element, a second lens element, a third lens element, a fourth lens element, a fifth lens element, a sixth lens element, a seventh lens element, an eighth lens element and a ninth lens element; the first lens group comprises the first lens element and the second lens element, the second lens group comprises at least one lens element, the third lens group comprises at least one lens element, and the fourth lens group comprises the eighth lens element and the ninth lens element;
wherein the first lens element has positive refractive power, the second lens element has negative refractive power, at least one of an object-side surface and an image-side surface of at least one lens element of the image lens assembly has at least one inflection point in an off-axis region thereof, and at least five lens elements of the image lens assembly are made of plastic material;
wherein when the image lens assembly is focusing or zooming, an axial distance between the first lens group and the fourth lens group remains a constant, an axial distance between the fourth lens group and an image surface remains a constant, while the second lens group and the third lens group move along the optical axis;
wherein when the image lens assembly is focusing or zooming, the third lens element counted from the object side moves with respect to each of two fixed lens elements that are the first lens element counted from the object side and the ninth lens element counted from the object side;
wherein a maximum value among fields of view of the image lens assembly within a zoom range is FOV_max, a minimum value among fields of view of the image lens assembly within the zoom range is FOV_min, a maximum value among fields of view of the at least one fixed-focus image capturing unit is DFOV, and the following conditions are satisfied:

1.25<FOV_max/FOV_min<5.0; and

40[deg.]<DFOV-FOV_max.

22. The electronic device of claim 21, wherein the second lens group comprises at least two lens elements, and the third lens group comprises at least two lens elements.

23. The electronic device of claim 22, wherein the second lens group comprises the third lens element, the fourth lens element and the fifth lens element, and the third lens group comprises the sixth lens element and the seventh lens element.

24. The electronic device of claim 23, wherein there are two lens elements with positive refractive power and one lens element with negative refractive power in the second lens group; and there are one lens element with positive refractive power and one lens element with negative refractive power in the third lens group.

25. The electronic device of claim 21, wherein a maximum effective radius of an object-side surface of the first lens element within the zoom range is Y1R1, a maximum image height of the image lens assembly is ImgH, and the following condition is satisfied:

$Y1R1/ImgH<1.5$.

26. The electronic device of claim 21, wherein an axial distance between an object-side surface of the first lens element and an image-side surface of the second lens element is Dr1r4, an axial distance between the second lens element and the third lens element while the image lens assembly is at a maximum field of view with an object distance at infinity is T23_frmax, an axial distance between the second lens element and the third lens element while the image lens assembly is at a minimum field of view with an object distance at infinity is T23_frmin, a difference between T23_frmax and T23_frmin is ΔT23, and the following condition is satisfied:

$Dr1r4/\Delta T23<1.5$.

27. The electronic device of claim 21, further comprising an aperture stop, wherein a maximum effective radius of an object-side surface of the first lens element within the zoom range is Y1R1, an aperture radius of the aperture stop is SD_Stop, and the following condition is satisfied:

$Y1R1/SD\_Stop<2.0$.

28. The electronic device of claim 21, wherein an axial distance between an image-side surface of the ninth lens element and the image surface is BL, a maximum image height of the image lens assembly is ImgH, and the following condition is satisfied:

$BL/\text{ImgH} < 2.0.$

29. The electronic device of claim 21, wherein an axial distance between an object-side surface of the first lens element and an image-side surface of the second lens element is Dr1r4, an axial distance between an object-side surface of the eighth lens element and an image-side surface of the ninth lens element is Dr15r18, and the following condition is satisfied:

$0.90 < Dr1r4/Dr15r18 < 2.75.$

30. The electronic device of claim 21, wherein there are at least two of the at least one fixed-focus image capturing unit;
- wherein the maximum value among fields of view of the at least two fixed-focus image capturing units is DFOV, the maximum value among fields of view of the image lens assembly within the zoom range is FOV_max, and the following condition is satisfied:

$60[\deg.] < \text{DFOV} - \text{FOV\_max}.$

* * * * *